US007627616B2

(12) United States Patent
Hershkovich et al.

(10) Patent No.: US 7,627,616 B2
(45) Date of Patent: *Dec. 1, 2009

(54) DATABASE STORAGE AND MAINTENANCE USING ROW INDEX ORDERING

(75) Inventors: Moshe Hershkovich, Tel-Aviv (IL); Moshe Stark, Even Yehuda (IL); Ronen Reznik, Yehud (IL); Shay Kastoriano, Moshav Rinatia (IL); Nira Shezaf, Tel-Aviv (IL)

(73) Assignee: Hywire Ltd., Netanya (IL)

( * ) Notice: Subject to any disclaimer, the term of this patent is extended or adjusted under 35 U.S.C. 154(b) by 822 days.

This patent is subject to a terminal disclaimer.

(21) Appl. No.: 10/928,257

(22) Filed: Aug. 30, 2004

(65) Prior Publication Data

US 2006/0047719 A1 Mar. 2, 2006

(51) Int. Cl.
*G06F 17/30* (2006.01)
(52) U.S. Cl. .................. 707/204; 711/161; 711/162
(58) Field of Classification Search .................. None
See application file for complete search history.

(56) References Cited

U.S. PATENT DOCUMENTS

| 4,967,341 | A | * | 10/1990 | Yamamoto et al. ............ 707/2 |
| 5,551,024 | A | * | 8/1996 | Waters ........................ 707/3 |
| 5,611,076 | A | * | 3/1997 | Durflinger et al. .......... 707/102 |
| 5,920,886 | A | * | 7/1999 | Feldmeier .................... 711/108 |
| 6,237,061 | B1 | * | 5/2001 | Srinivasan et al. .......... 711/108 |
| 6,389,507 | B1 | * | 5/2002 | Sherman ...................... 711/108 |
| 6,415,279 | B1 | * | 7/2002 | Gard et al. .................... 707/2 |
| 6,438,562 | B1 | * | 8/2002 | Gupta et al. ................ 707/201 |
| 6,571,231 | B2 | * | 5/2003 | Sedlar .......................... 707/1 |
| 6,606,681 | B1 | * | 8/2003 | Uzun .......................... 711/108 |
| 6,629,102 | B1 | * | 9/2003 | Malloy et al. ............... 707/102 |
| 7,017,005 | B2 | * | 3/2006 | Stark .......................... 711/108 |
| 7,054,994 | B2 | * | 5/2006 | Kastoriano et al. .......... 711/108 |
| 2003/0093646 | A1 | | 5/2003 | Stark | |
| 2004/0019737 | A1 | | 1/2004 | Kastoriano | |
| 2004/0049630 | A1 | * | 3/2004 | Stark .......................... 711/108 |
| 2004/0083336 | A1 | | 4/2004 | Stark | |

* cited by examiner

*Primary Examiner*—Hosain T Alam
*Assistant Examiner*—Johnese Johnson
(74) *Attorney, Agent, or Firm*—Mark M. Friedman

(57) ABSTRACT

A computer-implemented method for flexibly storing data in a database so as to allow facile updating and maintenance of the database, including the steps of: (a) providing a first array having rows and columns for storing a first plurality of key entries; (b) arranging the key entries within each of the rows in a monotonic order; (c) providing a second array for storing a second plurality of key entries having rows and at least one column, such that the first and second arrays form a hierarchical structure, wherein the second plurality of entries represents a higher level of the hierarchical structure with respect to the first plurality of entries; (d) identifying an update position for performing a database update operation, and (e) performing the update operation by rearranging a portion of the first plurality of entries.

60 Claims, 29 Drawing Sheets

FC-Register　　　　　　　　　TDA

Key entries

Before Repositioning

| 1 |
| 20 |
| 37 |
| 49 |
| 62 |
| 77 |
| 88 |

| 1 | 4 | 5 | 9 | 12 | 14 | 17 |
| 20 | 23 | 25 | 28 | 31 | 34 | |
| 37 | 39 | 41 | 43 | 45 | 47 | |
| 49 | 51 | 53 | 56 | 58 | 60 | |
| 62 | 64 | 66 | 69 | 71 | 75 | |
| 77 | 79 | 81 | 83 | 86 | | |
| 88 | 90 | 92 | 95 | 97 | 99 | |

After Repositioning

| 1 |
| 17 |
| 34 |
| 47 |
| 60 |
| 75 |
| 88 |

| 1 | 4 | 5 | 9 | 12 | 14 |
| 17 | 20 | 23 | 25 | 28 | 31 |
| 34 | 37 | 39 | 41 | 43 | 45 |
| 47 | 49 | 51 | 53 | 56 | 58 |
| 60 | 62 | 64 | 66 | 69 | 71 |
| 75 | 77 | 79 | 81 | 83 | 86 |
| 88 | 90 | 92 | 95 | 97 | 99 |

FC-Register

Key entries

TDA

Before Repositioning

| | | | | | | |
|---|---|---|---|---|---|---|
| 1 | 1 | 4 | 5 | 9 | 12 | 14 |
| 17 | 17 | 20 | 23 | 25 | 28 | 31 | 34 |
| 37 | 37 | 39 | 41 | 43 | 45 | 47 |
| 49 | 49 | 51 | 53 | 56 | 58 | 60 |
| 62 | 62 | 64 | 66 | 69 | 71 | 75 |
| 77 | 77 | 79 | 81 | 83 | 86 | 88 |
| 90 | 90 | 92 | 95 | 97 | 99 |

After Repositioning

| | | | | | | |
|---|---|---|---|---|---|---|
| 1 | 1 | 4 | 5 | 9 | 12 | 14 |
| 17 | 17 | 20 | 23 | 25 | 28 | 31 |
| 34 | 34 | 37 | 39 | 41 | 43 | 45 |
| 47 | 47 | 49 | 51 | 53 | 56 | 58 |
| 60 | 60 | 62 | 64 | 66 | 69 | 71 |
| 75 | 75 | 77 | 79 | 81 | 83 | 86 |
| 88 | 88 | 90 | 92 | 95 | 97 | 99 |

Figure 4

FC-Register

Key entries | Row Index entries

TDA

Before Repositioning

| 1 | 4 | 5 | 9 | 12 | 14 | 17 | 20 | 23 |
| 47 | 51 | 53 | 56 | 58 | 61 | 64 | 66 | 69 | 71 | 75 |
| 77 | 81 | 83 | 86 | 88 | 90 | 92 | 95 | 97 | 99 | 101 | 103 | 104 | 107 | 110 | 112 | 115 |
| 25 | 28 | 31 | 34 | 37 | 41 | 43 | 45 |

After Repositioning

| 1 | 4 | 5 | 9 | 12 | 14 | 17 | 20 | 23 | 115 |
| 47 | 51 | 53 | 56 | 58 | 61 | 64 | 66 | 69 | 71 | 75 |
| 77 | 81 | 83 | 86 | 88 | 90 | 92 | 95 | 97 | 99 | 101 | 103 | 104 | 107 | 110 | 112 |
| 25 | 28 | 31 | 34 | 37 | 41 | 43 | 45 |

FC-Register

Key entries | Row Index entries

TDA

Before Rearrangement

| 2 | 4 | 10 | 12 | 16 | 20 | 24 | 28 | 30 | 36 | 44 | 48 | 50 | 52 | 56 |
|---|---|----|----|----|----|----|----|----|----|----|----|----|----|----|
| 60 | 62 | 66 | 70 | 74 | 80 | 88 | 90 | 92 | 94 | 96 | 98 | 100 | 102 | |
| 104 | 106 | 108 | 110 | 112 | 114 | 116 | 118 | 120 | 126 | 128 | 130 | 132 | 134 | 136 |
| 138 | 140 | 142 | 144 | 146 | 148 | 150 | 152 | 154 | 156 | 158 | 160 | 162 | 164 | 166 |
| 168 | 170 | 172 | 174 | 176 | 178 | 180 | 182 | 184 | 186 | 188 | 190 | 192 | 194 | 196 |
| 208 | 210 | 212 | 214 | 216 | 218 | 220 | 226 | 228 | 230 | 232 | 234 | 236 | | |

FC-Register values: 2/0, 60/1, 104/2, 138/3, 168/4, 208/5

After Rearrangement

| 2 | 4 | 10 | 12 | 16 | 20 | 24 | 28 | 30 | 36 | 40 | 44 | 48 | 50 | 52 |
|---|---|----|----|----|----|----|----|----|----|----|----|----|----|----|
| 56 | 60 | 62 | 66 | 70 | 74 | 80 | 88 | 90 | 92 | 94 | 96 | 98 | 100 | 102 |
| 104 | 106 | 108 | 110 | 112 | 114 | 116 | 118 | 120 | 126 | 128 | 130 | 132 | 134 | 136 |
| 138 | 140 | 142 | 144 | 146 | 148 | 150 | 152 | 154 | 156 | 158 | 160 | 162 | 164 | 166 |
| 168 | 170 | 172 | 174 | 176 | 178 | 180 | 182 | 184 | 186 | 188 | 190 | 192 | 194 | 196 |
| 208 | 210 | 212 | 214 | 216 | 218 | 220 | 226 | 228 | 230 | 232 | 234 | 236 | | |

FC-Register values: 2/0, 56/1, 104/2, 138/3, 168/4, 208/5

FC-Register
TDA

Key entries, Row Index entries, Column Index entries

Before Repositioning

After Repositioning

Figure 12b

Before Repositioning

B¹ RAM

|  |  |
|---|---|
| 2 | 0 |
| 62 | 1 |
| 114 | 2 |
| 146 | 3 |
|  |  |
|  |  |

B⁰ RAM

|  |  |  |  |  |  |
|---|---|---|---|---|---|
| 2 | 0 | 22 | 1 | 42 | 2 |
| 62 | 3 | 82 | 4 | 98 | 5 |
| 114 | 6 | 130 | 7 |  |  |
| 146 | 8 | 162 | 9 |  |  |
|  |  |  |  |  |  |
|  |  |  |  |  |  |

TDA

|  |  |  |  |  |  |  |  |  |  |  |
|---|---|---|---|---|---|---|---|---|---|---|
| 0 | 2 | 4 | 6 | 8 | 10 | 12 | 13 | 14 | 16 | 18 | 20 |
| 1 | 22 | 24 | 26 | 28 | 30 | 32 | 34 | 36 | 38 | 40 |  |
| 2 | 42 | 44 | 46 | 48 | 50 | 52 | 54 | 56 | 58 | 60 |  |
| 3 | 62 | 64 | 66 | 68 | 70 | 72 | 74 | 76 | 78 | 80 |  |
| 4 | 82 | 84 | 86 | 88 | 90 | 92 | 94 | 96 |  |  |  |
| 5 | 98 | 100 | 102 | 106 | 106 | 108 | 110 | 112 |  |  |  |
| 6 | 114 | 116 | 118 | 120 | 122 | 124 | 126 | 128 |  |  |  |
| 7 | 130 | 132 | 134 | 136 | 138 | 140 | 142 | 144 |  |  |  |
| 8 | 146 | 148 | 150 | 152 | 154 | 156 | 158 | 160 |  |  |  |
| 9 | 162 | 164 | 166 | 168 | 170 | 172 | 174 | 176 |  |  |  |
| 10 |  |  |  |  |  |  |  |  |  |  |  |
| 11 |  |  |  |  |  |  |  |  |  |  |  |
| 12 |  |  |  |  |  |  |  |  |  |  |  |
| 13 |  |  |  |  |  |  |  |  |  |  |  |
| 14 |  |  |  |  |  |  |  |  |  |  |  |
| 15 |  |  |  |  |  |  |  |  |  |  |  |
| 16 |  |  |  |  |  |  |  |  |  |  |  |
| 17 |  |  |  |  |  |  |  |  |  |  |  |

After Repositioning

B¹ RAM

|  |  |
|---|---|
| 2 | 0 |
| 50 | 1 |
| 82 | 4 |
| 114 | 2 |
| 146 | 3 |
|  |  |

B⁰ RAM

|  |  |  |  |  |  |
|---|---|---|---|---|---|
| 2 | 0 | 18 | 1 | 34 | 2 |
| 50 | 3 | 66 | 10 |  |  |
| 114 | 6 | 130 | 7 |  |  |
| 146 | 8 | 162 | 9 |  |  |
| 82 | 4 | 98 | 5 |  |  |
|  |  |  |  |  |  |

TDA

|  |  |  |  |  |  |  |  |  |  |
|---|---|---|---|---|---|---|---|---|---|
| 0 | 2 | 4 | 6 | 8 | 10 | 12 | 13 | 14 | 16 |
| 1 | 18 | 20 | 22 | 24 | 26 | 28 | 30 | 32 |  |
| 2 | 34 | 36 | 38 | 40 | 42 | 44 | 46 | 48 |  |
| 3 | 50 | 52 | 54 | 56 | 58 | 60 | 62 | 64 |  |
| 4 | 82 | 84 | 86 | 88 | 90 | 92 | 94 | 96 |  |
| 5 | 98 | 100 | 102 | 106 | 106 | 108 | 110 | 112 |  |
| 6 | 114 | 116 | 118 | 120 | 122 | 124 | 126 | 128 |  |
| 7 | 130 | 132 | 134 | 136 | 138 | 140 | 142 | 144 |  |
| 8 | 146 | 148 | 150 | 152 | 154 | 156 | 158 | 160 |  |
| 9 | 162 | 164 | 166 | 168 | 170 | 172 | 174 | 176 |  |
| 10 | 66 | 68 | 70 | 72 | 74 | 76 | 78 | 80 |  |
| 11 |  |  |  |  |  |  |  |  |  |
| 12 |  |  |  |  |  |  |  |  |  |
| 13 |  |  |  |  |  |  |  |  |  |
| 14 |  |  |  |  |  |  |  |  |  |
| 15 |  |  |  |  |  |  |  |  |  |
| 16 |  |  |  |  |  |  |  |  |  |
| 17 |  |  |  |  |  |  |  |  |  |

B¹ RAM

| 2 | 0 |
|---|---|
| 62 | 1 |
| 114 | 2 |
| 146 | 3 |
|  |  |
|  |  |

B⁰ RAM

| 2 | 0 | 22 | 1 | 42 | 2 |
|---|---|----|---|----|---|
| 62 | 3 | 82 | 5 | 98 | 6 |
| 114 | 7 | 130 | 8 |  |  |
| 146 | 10 | 162 | 11 |  |  |
|  |  |  |  |  |  |
|  |  |  |  |  |  |

TDA

|  |  |  |  |  |  |  |  |  |  |  |
|---|---|---|---|---|---|---|---|---|---|---|
| 0 | 2 | 4 | 6 | 8 | 10 | 12 | 14 | 16 | 18 | 20 |
| 1 | 22 | 24 | 26 | 28 | 30 | 32 | 34 | 36 | 38 | 40 |
| 2 | 42 | 44 | 46 | 48 | 50 | 52 | 54 | 56 | 58 | 60 |
| 3 | 62 | 64 | 66 | 68 | 70 | 72 | 74 | 76 | 78 | 80 |
| 4 |  | X |  |  |  |  |  |  |  |  |
| 5 | 82 | 84 | 86 | 88 | 90 | 92 | 94 | 96 |  |  |
| 6 | 98 | 100 | 102 | 106 | 106 | 108 | 110 | 112 |  |  |
| 7 | 114 | 116 | 118 | 120 | 122 | 124 | 126 | 128 |  |  |
| 8 | 130 | 132 | 134 | 136 | 138 | 140 | 142 | 144 |  |  |
| 9 |  |  |  |  | X |  |  |  |  |  |
| 10 | 146 | 148 | 150 | 152 | 154 | 156 | 158 | 160 |  |  |
| 11 | 162 | 164 | 166 | 168 | 170 | 172 | 174 | 176 |  |  |
| 12 |  |  |  |  |  |  |  |  |  |  |
| 13 |  |  |  |  |  |  |  |  |  |  |
| 14 |  |  |  |  |  |  |  |  |  |  |
| 15 |  |  |  |  |  |  |  |  |  |  |
| 16 |  |  |  |  |  |  |  |  |  |  |
| 17 |  |  |  |  |  |  |  |  |  |  |

DATABASE STORAGE AND MAINTENANCE USING ROW INDEX ORDERING

FIELD AND BACKGROUND OF THE INVENTION

The present invention relates to systems and methods of storing and maintaining lists of key entries and the associated data entries thereof in a database, and, more particularly, to a system and method of improved database storage and maintenance using row index ordering.

The present invention discloses novel and efficient methods for storing and maintaining lists of Key entries and their Associated Data (AD) entries in flexible sequential schemes that allow fast Insert and Remove (update) algorithms involving shifts of entries in only a few rows, thereby significantly increasing the update rate and reducing the operating power consumption.

These storage and maintenance methods are significant improvements of the Insert and Remove algorithms presented in two previous inventions patented by HyWire Ltd., entitled "The Implementation of a Content Addressable Memory Using a RAM-Cell Structure" (U.S. patent application Ser. No. 10/229,054) and "RAM-Based Range Content Addressable Memory" (U.S. patent application Ser. No. 10/229,065). These two patents disclosed a method for implementing a Binary CAM and a Range CAM (RCAM), using a RAM structure surrounded by search logic in the RAM periphery, running a fast Search algorithm, and keeping lists of the keys and their associated data in perfect sequence by Insert and Remove algorithms.

The main concepts and principles of operation of the RAM-Based RCAM are very similar to those of the RAM-Based Binary CAM. The main difference is that, whereas the Binary CAM stores an ordered list of single integer keys and a corresponding list of their associated data, the RCAM stores a list of Key entries that represent range boundaries and a list of AD entries that correspond uniquely to these ranges. A key search in a Binary CAM results in an exact match, whereas a key search in an RCAM matches an entire range. The RCAM also stores a list of Associated Boundary Type entries which determine the validity of the corresponding ranges.

The basic concept underlying the approach of the RAM-Based Binary CAM and RCAM is storing and keeping the Key list and Associated Data list (with Associated Boundary Type list for RCAMs) in perfect sequence, as required by the fast search algorithm; these lists are typically arranged in Two-Dimensional Arrays (TDAs), which are readily implementable in conventional RAMs.

The update operation is preceded by a search procedure to determine the "update position", which is the position where the submitted key is to be inserted or removed, provided that these operations are allowed. Key insertion is allowed only if the key is not included in the TDA, whereas key removal is possible only if it is already included in the TDA. The preliminary search procedure is identical for Binary CAMs and RCAMs, and is described in U.S. patent application Ser. No. 10/229,065. In a first step, the TDA row where the inserted/removed key may be located is identified, and subsequently, the precise key location within the TDA row is determined. The row identification is performed in the First Column Register (FC-Register), which stores the Key entries of the TDA first column in ascending sequence, corresponding to the contiguous monotonic order of the TDA Key entries.

The insertion and removal of entries in the TDAs, as presented in the above patents, are lengthy operations, because these entries are stored in contiguous monotonic order, with no empty TDA cells in between. The contiguity of entries in the TDA requires, in the case of ascending order (starting from the low end of the TDA), a forward/backward shift of the entries that are larger than the updated entry. Shifting a large number of entries contained in many rows (or columns) requires many read, shift and write steps, resulting in relatively long update time and significant power consumption.

There is therefore a recognized need for, and it would be highly advantageous to have, a system and method of storing and maintaining key entries in a database that is more efficient than those known heretofore, requires less repositioning of key entries during database updating, and enables updating operations to be performed as a background operation.

SUMMARY OF THE INVENTION

The present invention is a system and method of improved database storage and maintenance using row index ordering.

According to the teachings of the present invention there is provided a computer-implemented method for flexibly storing data in a database so as to allow facile and efficient updating and maintenance of the database, the method including the steps of: (a) providing at least a first array having at least two dimensions, the first array having rows and columns, the first array for storing a first plurality of key entries; (b) arranging the key entries within each of the rows in a monotonic order; (c) providing at least a second array for storing a second plurality of key entries having rows and at least one column, such that the first array and the second array form a hierarchical structure, wherein the second plurality of key entries in the second array represents a higher level of the hierarchical structure with respect to the first plurality of key entries; (d) identifying an update position for performing a database update operation, and (e) performing the database update operation, which includes a rearrangement of a portion of the first plurality of key entries, the portion defined by $$\pi_{avg}/\Sigma$$

wherein $\pi_{avg}$ is an average number of the key entries undergoing rearrangement, and $\Sigma$ is a total number of key entries in the first plurality of key entries, and wherein a ratio defined by $\pi_{avg}/\Sigma$ is less than 0.25.

According to further features in the described preferred embodiments, the identifying of an update position includes identifying a single row among the rows of the first array as a sole row containing the update position.

According to still further features in the described preferred embodiments, the ratio is less than 0.10.

According to still further features in the described preferred embodiments, the ratio is less than 0.05.

According to still further features in the described preferred embodiments, the ratio is less than 0.01.

According to still further features in the described preferred embodiments, a row ratio defined by $\rho_{avg}/\Sigma_\rho$ is less than 0.25, wherein $\rho_{avg}$ is an average number of rows in the first array in which the rearrangement transpires, and $\Sigma_\rho$ is a total number of rows containing the first plurality of key entries.

According to still further features in the described preferred embodiments, the row ratio defined by $\rho_{avg}/\Sigma_\rho$ is less than 0.10.

According to still further features in the described preferred embodiments, the row ratio is less than 0.01.

According to still further features in the described preferred embodiments, the monotonic order includes a cyclic monotonic order.

According to still further features in the described preferred embodiments, the key entries representing the higher level of the hierarchical structure are stored in a column register.

According to still further features in the described preferred embodiments, the database update operation is performed solely between lookups.

According to another aspect of the present invention there is provided a computer-implemented method for flexibly storing data in a database so as to allow facile and efficient updating and maintenance of the database, including the steps of: (a) providing at least a first array having rows and columns for storing a first plurality of key entries; (b) arranging the key entries within each of the rows in a monotonic order; (c) providing at least a second array for storing a second plurality of key entries having rows and at least one column, such that the first array and the second array form a hierarchical structure, wherein the second plurality of key entries in the second array represents a higher level of the hierarchical structure with respect to the first plurality of key entries; (d) identifying an update position for performing a database update operation, and (e) performing the database update operation, which includes a rearrangement of a portion of the first plurality of key entries.

According to still further features in the described preferred embodiments, the method further includes the step of: (f) maintaining the database by: (i) comparing a number of the entries in a particular row of the rows in the first array with a parameter that is at least partially derived from an average number of entries per row, and (ii) if a difference between the number of the entries and the parameter exceeds a predetermined value, then repositioning at least a portion of the entries of that particular row, within the arrays, such that the difference is reduced to be within the predetermined value, while maintaining the monotonic order within the rows of the first array.

According to still further features in the described preferred embodiments, the comparison is performed in a background operation.

According to still further features in the described preferred embodiments, the repositioning of the entries is performed in a background operation.

According to still further features in the described preferred embodiments, the database is fully operational at any stage within a single update operation.

According to still further features in the described preferred embodiments, a threshold fill limit is defined for the key entries within the rows of the first array, and when a particular row of the rows exceeds the threshold fill limit, key entries of the first plurality undergo shifting such that the particular row conforms to the threshold fill limit, while maintaining the monotonic order within the rows of the first array.

According to still further features in the described preferred embodiments, the repositioning is performed such that the monotonic order within the rows includes a cyclic monotonic order.

According to still further features in the described preferred embodiments, the method further includes the step of: (f) providing a third array for storing a third plurality of key entries, the third array belonging to the hierarchical structure, such that the third plurality of key entries represents a higher level of the hierarchical structure with respect to the second plurality of key entries.

According to still further features in the described preferred embodiments, the first array contains at least one empty row devoid of the first plurality of key entries, and a threshold fill limit is defined for the key entries within the rows of the first array, and wherein when a particular row of the rows exceeds the threshold fill limit, a portion of the key entries in the particular row are moved to the empty row, such that the particular row conforms to the threshold fill limit, while maintaining the monotonic order within the rows of the first array.

According to still further features in the described preferred embodiments, the method further includes an array containing a plurality of position information entries, each of the position information entries for indicating a row index for associating a row within the first array with a key entry of the second plurality of key entries.

According to still further features in the described preferred embodiments, the method further includes an array containing a plurality of position information entries, each of the position information entries for indicating a row index of a currently-empty row within the first array.

According to still further features in the described preferred embodiments, the threshold fill limit is a function of the total number of key entries in the first plurality of key entries and a number of rows in the first array.

According to still further features in the described preferred embodiments, the threshold fill limit is a function of the total number of key entries in the first plurality of key entries and a number of rows containing the first plurality of key entries.

According to still further features in the described preferred embodiments, the rearrangement is performed by repositioning at least some of a portion of the first plurality of key entries in at least one row of the rows of the first array, the at least one row being at least partially-filled with at least one of the key entries prior to the rearrangement.

According to still further features in the described preferred embodiments, the repositioning is performed such that the monotonic order within the rows includes a cyclic monotonic order.

According to still further features in the described preferred embodiments, the rearrangement is performed in a background operation.

According to still further features in the described preferred embodiments, at least two of the position information entries contain an identical row index.

According to still further features in the described preferred embodiments, a foreground operation is performed during the rearrangement of the database, and wherein the database remains fully operational during the rearrangement.

According to still further features in the described preferred embodiments, the method further includes an array containing a plurality of position information entries, each of the position information entries for indicating a row index for associating a row within the first array with a key entry of the second plurality of key entries.

According to still further features in the described preferred embodiments, the method further includes the step of: (f) indicating row indices of a plurality of currently-empty rows within the first array using a second plurality of position information entries.

According to still further features in the described preferred embodiments, each of the rows in the first array contains a pre-determined maximum number of cells $M_{max}$ filled by key entries of the first plurality of key entries.

According to still further features in the described preferred embodiments, each of the rows in the first array contains a pre-determined minimum number of cells $M_{min}$ filled by key entries of the first plurality of key entries.

According to still further features in the described preferred embodiments, the method further includes the step of: (f) defining, from a portion of the rows in the first array, a row block containing a plurality of the rows in the first array, each row within the row block containing a pre-determined minimum number of cells $M_{min}$ filled by key entries of the first plurality of key entries, and a pre-determined maximum number of cells $M_{max}$ filled by key entries of the first plurality of key entries.

According to still further features in the described preferred embodiments, the row block contains a pre-determined minimum number of rows $N_{min}$, and a pre-determined maximum number of rows $N_{max}$.

According to still further features in the described preferred embodiments, a row ratio defined by $\rho_{block}/\Sigma_\rho$ is less than 0.25, wherein $\rho_{block}$ is a number of rows in the row block in which the rearrangement transpires and $\Sigma_\rho$ is a total number of rows containing the first plurality of key entries.

According to still further features in the described preferred embodiments, the row ratio is less than 0.10.

According to still further features in the described preferred embodiments, the row ratio is less than 0.01.

According to still further features in the described preferred embodiments, the performing of the database update operation includes inserting at least one key entry into the row block, and wherein the rearrangement transpires solely within the row block.

According to still further features in the described preferred embodiments, the performing of the database update operation includes inserting at least one key entry into the row block, and wherein the rearrangement transpires solely within the row block, such that key entries of the first array and disposed outside of the row block remain in place.

According to still further features in the described preferred embodiments, the performing of the database update operation includes inserting at least one key entry into the row block, and wherein, when all key-entry containing rows in the row block reach $M_{max}$, the rearrangement transpires such that at least one new row within the row block is used for key entries moved from another row within the row block.

According to still further features in the described preferred embodiments, when all key-entry containing rows in the row block reach $M_{max}$, the rearrangement transpires such that the row block contains $N_{max}$ rows containing key entries from the row block.

According to still further features in the described preferred embodiments, the method further includes the step of: (f) specifying, within a given portion of a total key entry storage capacity in the first array, a pre-determined worst-case minimum rate for a rate selected from the group consisting of lookup rate, update rate, and a combination of lookup rate and update rate.

According to still further features in the described preferred embodiments, the pre-determined worst-case minimum rate is the update rate, and wherein the update rate is substantially independent of a size of the database.

According to still further features in the described preferred embodiments, the pre-determined worst-case minimum rate is the update rate, and wherein the update rate is based on a substantially constant number of key entries requiring repositioning.

According to still further features in the described preferred embodiments, the performing of the database update operation includes removing at least one key entry from the row block, such that, when all key-entry containing rows in the row block are reduced to a value of $M_{min}$, the rearrangement transpires such that at least one row in the row block becomes empty with respect to said key entries in the first array.

According to still further features in the described preferred embodiments, when all key-entry containing rows in the particular row block are reduced to a value of $M_{min}$, the rearrangement transpires such that the row block contains $N_{min}$ rows containing key entries from the row block.

According to still further features in the described preferred embodiments, each of the position information entries indicates a row index for associating a row within the first array with a key entry of the second plurality of key entries.

According to still further features in the described preferred embodiments, each of the position information entries indicates a row index of an operative empty row, such that any defective row is unmarked by the second plurality of position information entries.

According to still further features in the described preferred embodiments, the currently-empty rows within the first array are solely operative empty rows, such that any defective row is unmarked by the second plurality of position information entries.

According to still further features in the described preferred embodiments, the method further includes the steps of: (f) providing an additional array containing a plurality of empty row position information entries, and (g) indicating a row index of at least one currently-empty row within the first array using at least one of the empty row position information entries, wherein the at least one currently-empty row is solely an operative empty row.

According to still further features in the described preferred embodiments, the method further includes the step of: (f) providing a third array for storing a third plurality of key entries, the third array belonging to the hierarchical structure, such that the third plurality of key entries represents a higher level of the hierarchical structure with respect to the second plurality of key entries.

According to still further features in the described preferred embodiments, the method further includes the step of: (f) providing n arrays, $n \geq 2$, for storing n pluralities of key entries, the n arrays belonging to the hierarchical structure, such that the n pluralities of key entries represent higher levels of the hierarchical structure with respect to the second plurality of key entries, and wherein each $n_{i-1}$ array of the n arrays represents a lower level of the hierarchical structure with respect to each $n_i$ array.

According to still further features in the described preferred embodiments, the row block is a dynamic row block.

According to yet another aspect of the present invention there is provided a computer-implemented system for flexibly storing data in a database so as to allow facile and efficient updating and maintenance of the database, the system including: (a) at least a first array having at least two dimensions, the first array having rows and columns, the first array for storing a first plurality of key entries; (b) at least a second array for storing a second plurality of key entries having rows and at least one column, such that the first array and the second array form a hierarchical structure, wherein the second plurality of key entries in the second array represents a higher level of the hierarchical structure with respect to the first plurality of key entries; (c) at least an additional array containing a plurality of position information entries for indicating a row index for associating a row within the first array with a key entry of the second plurality of key entries, and (d) processing logic for: (i) arranging the first plurality of key entries within each of the rows in a monotonic order; (ii) identifying an update position for performing a database update operation, and (iii) performing the database update operation by rearrangement of a portion of the first plurality of key entries.

According to further features in the described preferred embodiments, the processing logic is designed and configured for: (iv) maintaining the database by: (A) comparing a number of the entries in a particular row of the rows in the first array with a parameter that is at least partially derived from an average number of entries per row, and (B) if a difference between the number of the entries and the parameter exceeds a predetermined value, then repositioning the entries in the particular row, within the arrays, such that the difference is reduced to be within the predetermined value, while maintaining the monotonic order within the rows of the first array.

According to still further features in the described preferred embodiments, the system further includes: (e) an array containing a plurality of position information entries, each of the position information entries for indicating a row index for associating a row within the first array with a key entry of the second plurality of key entries.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2 shows an example of a TDA in the process of inserting a key entry in the first row, where the TDA is shown immediately after the insertion, before and after repositioning of the entries;

FIG. 3 shows an example of a TDA in the process of inserting a Key entry in the first row in the case that cyclic monotonic order is allowed in each row; the TDA is shown immediately after the insertion, before and after repositioning of the entries;

FIG. 4 shows an example of a TDA in the process of removing a Key entry from the last row, where the TDA is shown immediately after the removal, before and after repositioning of the entries;

FIG. 6 shows an example of a TDA and an FC-Register in the process of inserting the key 103 in a full row, causing the key 115 to overflow and be shifted to a partially filled (first) row; the TDA is shown immediately after the insertion, before and after shifting the key 115 to the first row;

FIG. 7 shows an example of a TDA in the process of removing the key 25 from the first row; the TDA is shown immediately before the removal, and then, after the removal and repositioning of the Key entries, which only involves a backward shift within the first row;

FIG. 8 shows an example of a TDA in the process of inserting the key 40 in the first row; the Key entries are rearranged in the first and second rows after the insertion. The TDA is shown before and after the key rearrangement;

FIG. 9 shows the TDA of FIG. 8 (after the insertion of the key 40) in the process of inserting the key 78 in the second row; the Key entries, arranged in $N_{min}=4$ rows with a maximum of M=15 entries, are repositioned in $N_{max}=5$ rows with a minimum of $M_{min}=12$ entries after the insertion. The TDA is shown before and after the repositioning process;

FIG. 10 shows an example of a TDA in the process of removing the key 14 from the first row; the Key entries are rearranged in the first and second rows after the removal. The TDA is shown before and after the key rearrangement;

FIGS. 12a and 12b illustrate an efficient Insert algorithm that combines the "Fixed Row Size" and "Split Row" methods. FIG. 12a shows the last row split in which 80% of the rows become occupied. FIG. 12b shows the background repositioning process performed using the "Fixed Row Size" method after the insertion of 100 and 102 in the last occupied row (with row index 7);

FIG. 13a shows the process of inserting the key 78 in the second row (indexed 1) and repositioning of entries using the "Fixed Block Size" method; FIG. 13b shows the subsequent background repositioning performed using the "Fixed Row Size" method;

FIG. 19 shows an example of a TDA and two hierarchical blocks in the process of inserting 13 in the first row; the TDA and the hierarchical blocks are shown immediately after the insertion, before and after repositioning of the entries;

FIG. 20 shows an example of a TDA and two hierarchical blocks in the process of removing the Key entry 76 from the fifth row; the TDA and the hierarchical blocks are shown immediately after the removal insertion, before and after repositioning of the entries;

FIG. 21 shows an example of a TDA and two hierarchical blocks, where the TDA has two defective rows (fifth and tenth) and the $B^0$ RAM has one defective row; the Row Index entries in the $B^0$ RAM allows point only to the operative TDA rows by-passing the defective rows;

FIG. 24 shows an example of a G-RAM in the process of removing a Key entry from the fifth extended row; the figure shows the G-RAM immediately after the removal, before and after repositioning of the entries;

FIG. 25 shows an example of the G-RAM depicted in FIG. 23, but in this case, the FC-RAM Key entries have associated Row Index entries pointing to the physical rows of individual RAMs of the G-RAM, allowing a flexible arrangement of the physical rows of individual RAMs;

FIG. 26 shows an example of a G-RAM with two defective rows; the Row Index entries of the FC-Register point only to the operative G-RAM extended rows by-passing the defective extended rows, and FIG. 27 shows an example of the same G-RAM with the same defective rows; in this case, the Row Index entries of the FC-RAM point only to the operative rows of the individual RAMs by-passing the defective rows.

DESCRIPTION OF THE PREFERRED EMBODIMENTS

Figure 1:
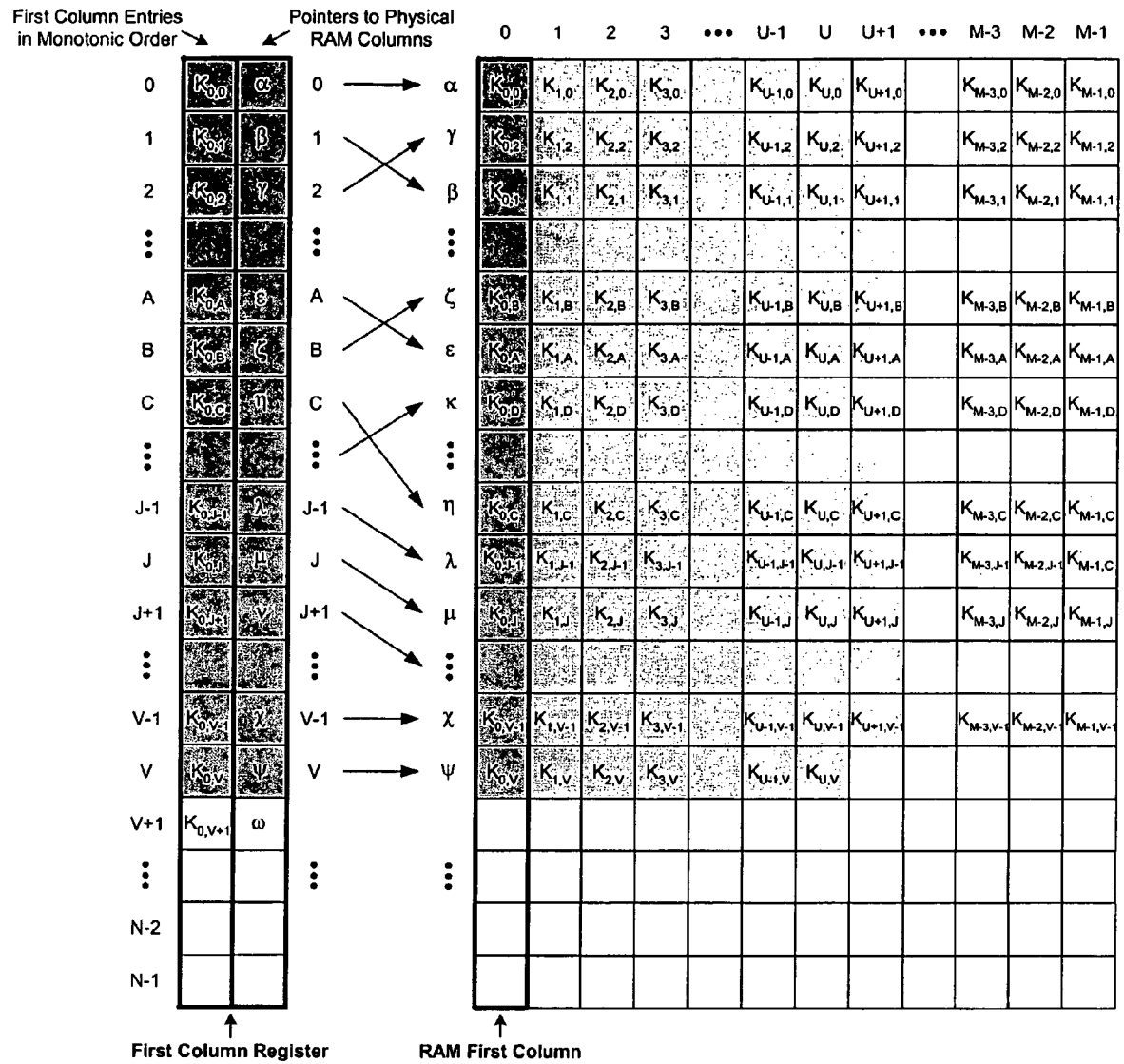
FIG. 1 shows the FC-Register with a list of TDA first column key entries arranged in contiguous ascending order with associated row index entries that point to physical TDA rows containing in their first column the corresponding FC-Register key entries.

The present invention is a system and method of improved database storage and maintenance using row index ordering.

The principles and operation of the system and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

The present invention discloses several new features involving flexible storage schemes that allow fast Insert and Remove (update) operations. The FC-Register may contain, besides the TDA First Column Key entries, associated Row Index entries that point to the physical TDA rows corresponding to the identified Key entries; the row index entries may be alternatively stored in a separate register. These row index pointers determine the row ordering, which is not longer required to be monotonic. Within the individual rows, the Key entries can be ordered monotonically, or more generally in cyclic monotonic order, where the monotonic order is maintained within a row, but the lowest value entry is not necessarily positioned at the beginning of the row; the monotonic order is kept starting at the lowest value entry position (designated "cyclic position") and ending at the highest value entry located preceding the lowest value entry. In this case, a Column Index entry may be used in the FC-Register to indicate the position of the lowest value entry in each row. The utilization of cyclic monotonic order in each row reduces significantly the number of shifts of entries within each row, thereby reducing the database maintenance rate and the power consumption. The TDA Key entries may include index pointers to AD entries, which enable non-monotonic AD entry ordering within a row. If the TDA entries are stored in monotonic order along columns (instead of rows), similar database storage and maintenance schemes can be designed using a First Row Register containing the Key entries of the TDA first row along with Column Index pointers that determine a non-monotonic column ordering.

The varied degrees of freedom in the new storage schemes allow efficient database maintenance operations, which require changes and shifts of entries in only part of the TDA; this results in high maintenance rate, low power consumption, and minor disturbance to the ongoing search operation. A newly inserted entry can be placed in a new row or in an empty cell of the row containing the keys with the nearest value; an entry that is removed from a row can leave an empty cell.

The use of row index pointers that determine the TDA row ordering enables the "repair" and use of RAM devices having defective rows by pre-assigning alternative redundant rows; each defective RAM row is not assigned a row index in the FC-Register, so that the row remains logically inexistent, and its entries are stored instead in an alternative redundant row.

Furthermore, the maintenance operations can be carried out within the context of a specified operation priority, where search operations (lookups) are typically assigned the highest priority, and update operations (insertions/removals) are performed only when lookups are not currently required; these two types of operations are performed as a foreground operation. Key reordering operations, which may include key shifting within one or more rows of an array, key repositioning in different rows, etc., may be performed as a background operation. This means that the reordering operations may take place only during No-Operation (NOP) cycles or intervals between search (at highest priority) and update operations, so that the search process is not blocked (unimpeded) nor substantially delayed, and the update operations are also performed with minimal possible delay. Key shifting required to keep a monotonic order for an update operation may be performed as a foreground operation. The key update and reordering procedures are designed so that the database is always fully operational for search operation. These novel features allow maintenance to be interleaved with search operation, where key search, update, and reordering operations are performed at the highest possible rate according to the specified operation priority mentioned above. Furthermore, the ratio between lookup and update operation intervals can be specified by the user so as to boost the speed of either operation.

Three maintenance algorithms are disclosed herein. The first algorithm, denoted "Fixed Row Size", keeps a nearly fixed number of entries per row, but the maintenance rate decreases continuously as the rows become filled. The second algorithm, denoted "Split Row", allows a high maintenance rate when the storage capacity is filled up to 50%; however, this rate decreases as the rows become filled. The third algorithm, denoted "Fixed Block Size", allows a specified minimum maintenance rate, at the expense of reduced storage capacity. The three algorithms are suitable for hardware implementation.

These maintenance algorithms using Row Index ordering can be extended to a Multi-RAM Binary CAM or RCAM presented in U.S. patent application Ser. No. 10/206,189. A Multi-RAM CAM consists of an ordered group of RAMs that can be regarded as an "extended RAM" and is denoted as "G-RAM" because it includes a number G of RAMs. The entries of the multiple RAMs are arranged in an integrated manner, in ascending or descending order along "extended rows" or "extended columns". If arranged along extended rows, the entries of the first columns of the G RAMs can be stored sequentially in the columns of a First Column RAM, denoted as FC-RAM, that operates similarly to the FC-Register for the RAM-Based CAM. In this case, the FC-RAM may contain, besides the TDA first column Key entries of the TDAs, associated Row Index entries that point to the TDA rows in correspondence to the identified Key entries; alternatively, the row index entries may be stored in a separate RAM. With these row index pointers, the monotonic order of the Key entries is not required throughout the TDAs, but only within the individual TDA rows. A newly inserted entry can be placed in a new TDA row or in an empty cell of the row containing the keys with the nearest value; an entry that is removed from a row can leave an empty cell. The FC-Register may be regarded as a higher hierarchical block of the FC-RAM, which in turn may be seen as a higher hierarchical block of the multiple RAMs; this three-hierarchy setting can be used to implement an efficient three-step search procedure.

To further boost the speed of the steps in the search process in a Single-RAM (or Multi-RAM) CAM, the FC-Register (or first column of the FC-RAM) can be partitioned in increasingly smaller hierarchical blocks according to a numerical system of base B, yielding a Multi-Hierarchy architecture in which the FC-Register entries are stored. In general, a larger number of hierarchies may be advantageous when the FC-Register grows larger. The FC-Register can be partitioned in k hierarchical blocks, a $B^{k-1}$ Register and (k–1) RAMs, $B^{k-2}$ RAM to $B^0$ RAM. The hierarchical arrangement adds latency because it increases the number of steps in a serial search procedure; however, these steps can be performed in a pipelined procedure to achieve a high throughput. If the FC-Register is partitioned in k hierarchical blocks, the serial search procedure consists of k+2 steps, and a (k+2)-step pipelined procedure is used to obtain one search output per clock cycle. If only the small higher-hierarchy blocks are stored in a processor chip and the larger hierarchical blocks are stored in external memories, then the chip size and price can be significantly reduced. A 3-hierarchy arrangement is presented in U.S. patent application Ser. No. 10/206,189 and herein as an example.

In a hierarchical design, only the Key entries of the highest hierarchical block, $B^{k-1}$ Register, must be arranged in monotonic order; this, because each Key entry of this block is associated with a Row Index entry that points to a specific physical row in the next hierarchical block $B^{k-2}$ RAM. The Key entries of this second block are similarly associated with Row Index entries pointing to specific rows in the next hierarchical block, down to $B^0$ RAM, which in turn points to a specific row in a Single-RAM (or Multi-RAM) CAM. Using row index pointers in all these hierarchical levels, provides great flexibility in storage and maintenance of the Single-RAM (or Multi-RAM) entries, because the row ordering of the hierarchical blocks (except the highest hierarchical block) is no longer required to be monotonic, and monotonic order must only be kept is kept within individual rows.

The new maintenance methods can be implemented for all above RAM-Based CAM configurations using a Range Search Engine (RSE) in conjunction with external memory devices that enhance the RSE storage capabilities, as disclosed in a co-pending U.S. Patent Application entitled "Multi-Dimensional Associative Search Engine Having an External Memory" (Ser. No. 10/688,986). In these memory-enhanced configurations, most of the Key entries and their AD entries are stored in the external memory, whereas the Search Logic resides in the RSE. The new method can be implemented as well using any other associative search engine, such as a Binary CAM, Ternary CAM, or an algorithmic search engine.

In Single-RAM Binary CAM and RCAM configurations, the RSE may include an FC-Register and an external RAM may store the Key entries and their AD entries. The Multi-RAM Binary CAM or RCAM configurations can be implemented with an FC-RAM in the RSE and multiple external RAMs that store all the Key entries and the AD entries.

The new maintenance methods enable the "repair" and use of RAM devices with defective rows by pre-assigning alternative redundant rows. Since the physical location of the RAM rows is registered in the Row Index list of the FC-Register, each row that is found to be defective is not assigned a row index, so that it remains logically non-existent and the entries are stored in alternative redundant rows. This repair method allows the use of cheaper RAM devices known to have specific defective rows, and also to continue using RAM devices where part of the rows may become defective during operation, by just redefining the row index list in the FC-Register so it points to the redundant rows, thus significantly improving the wafer yield. The same repair concept can be extended to Multi-RAM CAM devices with defective rows, using an FC-RAM with Row Index entries in Single or Multi-Hierarchy architecture.

The new maintenance methods applied in various Single-RAM and Multi-RAM configurations, using internal or external memory, deal with arrays having logical row ordering (determined by row index pointers) with entries ordered in cyclic monotonic order within the rows. This storage arrangement with logical monotonic order is suitable for Linear Search, which denotes herein the sequential search of contiguous Key entries stored in logically successive rows.

In general, to perform an efficient key search in any specific method, it is necessary to store the Key entries in the memory in a suitable pattern that optimizes this search method by minimizing the number of accesses to the memory. U.S. patent application Ser. No. 10/688,986, assigned to HyWire Ltd., discloses three such search methods—Linear Search, Binary Search and B-Tree Search. The storage and search methods presented referred in particular to Dynamic RAMs (DRAMs), but can be used for other external memory devices, such as Static RAMs (SRAMs), ROMs, EPROMs, $E^2$ROMs, Flash-based, Optical, CCD, Magnetic devices, etc. The database stored in a set of physical DRAMs was logically arranged in a corresponding set of Logic RAMs or TDAs. The arrangements in the TDAs and the physical DRAMs were designed to suit the specific search methods disclosed.

The methods of efficient maintenance algorithms disclosed herein, applied in conjunction with the storage and fast search schemes (Linear Search, Binary Search and B-Tree Search) in external memories presented in U.S. patent application Ser. No. 10/688,986, can lead to new search and maintenance methods in external memories; these methods may allow non-contiguous row ordering, fast search, and efficient Insert and Remove algorithms in either internal and external memories.

Single-RAM Binary CAM and RCAM

The basic architecture, storage and search methods, and Insert and Remove operations for Single-RAM Binary CAM and Range CAM (RCAM) are described in two previous inventions to HyWire Ltd., RAM-Based Binary CAM (U.S. patent application Ser. No. 10/229,054) and RAM-Based RCAM (U.S. patent application Ser. No. 10/229,065). The Two-Dimensional Arrays (TDAs) disclosed are implemented by means of conventional RAMs. The discussion is limited to the case in which the TDA Key entries are stored in contiguous ascending order, the key list starts at the lowest memory array address, and the empty locations block follows the key list at the highest array addresses.

The TDAs presented in both patents consist of M columns and N rows. The rows are sequenced from top to bottom and indexed with an integer j, where $0 \leq j \leq N-1$. The columns are sequenced from left to right and indexed with an integer i, where $0 \leq i \leq M-1$. A key located in column i and row j has an integer value $K_{i,j}$. The lowest key value $K_{0,0}$ resides in row 0 and column 0. The highest key value $K_{U,V}$ resides in row V and column U.

The RAM-Based Binary CAM contains two TDAs, Key TDA and Associated Data TDA. Each Key entry $K_{i,j}$ has a corresponding Associated Data entry $D_{i,j}$. Since the Binary CAM stores an ordered list of single integer keys, a key search in results in an exact match and a straightforward access to the corresponding associated data.

The RAM-Based RCAM includes additionally an Associated Boundary Type TDA, where each Associated Boundary Type entry $M_{i,j}$ corresponds to the Key entry $K_{i,j}$. The RCAM stores a list of Key entries that represent range boundaries, so that a key search results in a matching range, and the retrieval of the associated data and boundary type that corresponds uniquely to this range. The Associated Boundary Type entry determines the validity of the matching range and the associated data.

A search of the submitted key in the TDA can be completed in two steps. The first step identifies the TDA row where the submitted key may be located. This step is identical for Binary CAMs and RCAMs. It is performed by the Row Locator in the First Column Register (FC-Register), which stores the Key entries of the TDA first column in ascending sequence, and may be regarded as a higher hierarchical block of the TDA that allows simultaneous access to the TDA first column keys in a single clock. In the second step, the row identified in the first step is searched for an exact match (for a Binary CAM) or a range match (for an RCAM). This step is different for Binary CAMs and RCAMs, and is performed using similar Column Locators. The two-step Key Search can be performed sequentially, requiring two clocks for execution, or in pipelined mode, that enables search operations at full clock rate.

The insertion and removal of Key entries in the TDAs are lengthy operations, because these entries are stored in contiguous ascending order with no empty TDA cells in between. The contiguity of entries requires a forward/backward shift of all the entries that are larger than the inserted/removed entry. Shifting a large number of entries contained in many rows (or columns) requires many read, shift and write steps, resulting in long Insert/Remove times and significant power consumption.

The key insertion/removal is preceded by a search procedure to determine the position where the submitted key is to be inserted or removed, provided that these operations are allowed. Key insertion is allowed only if the key is not included in the TDA, whereas key removal is possible only if it is already included in the TDA. The preliminary search procedure is identical for Binary CAMs and RCAMs, and similar to the two-step Key Search mentioned above.

FIG. 1 shows the FC-Register with a list of TDA first column Key entries arranged in contiguous ascending order indexed by the integer j in $K_{0,j}$ ($0 \leq j \leq N-1$) and designated by Latin letters (A, B, C, J, V, etc.). The associated Row Index entries, designated by Greek letters ($\alpha$, $\beta$, $\gamma$, $\epsilon$, $\lambda$, etc.) are integers that point to physical TDA rows containing in their first column the corresponding FC-Register Key entries. In this specific example, $\alpha=0$, $\beta=2$, $\gamma=1$, but these row index entries may point to any other TDA rows, as required in the database maintenance process.

Additional degrees of freedom may be allowed within individual rows. For instance, the Key entries may be ordered in cyclic monotonic order, where the monotonic order is maintained, but the lowest value entry is not necessarily positioned at the beginning of the row. In this case, Column Index entries may be required in the FC-Register (not included in the figure) to indicate the position of the lowest value entry in each row. Also, the Key entries may include Associated Data (AD) index pointers, which enable cyclic monotonic AD entry ordering within a row.

Another important feature of the inventive architecture is that the rows may not be necessarily filled. The empty entries in the RAM may be handled in several alternative ways. One alternative is filling these entries with "all ones", based on the specification that no valid Key entry has this value. Another alternative is to fill these entries with "all zeros", based on the specification that a zero value can only be used as the lowest Key entry in the RAM, corresponding to the smallest single integer key in a Binary CAM or to the lowest range boundary in an RCAM. A third alternative is to indicate the number of "valid" Key entries in each row next to the Row Index entry in the FC-Register and disregard the "filling" Key entries of the row.

The search procedure of the submitted key in the TDA can be completed in two steps:

Step 1: Identification of the TDA row where the submitted key may be located. This step is identical for Binary CAMs and RCAMs. The submitted key is compared with the FC-Register Key entries using a Row Locator to find a matching Key entry. The Row Index entry associated with this matching Key entry points to the physical TDA row that may contain the submitted key.

Step 2: Access to the TDA row identified in Step 1 and lookup of the submitted key, to find an exact match (for a Binary CAM) or a range match (for an RCAM). This step is different for Binary CAMs and RCAMs, and is performed using similar Column Locators.

The two-step Key Search can be performed in sequence, requiring two clocks for execution, or in pipelined mode, which enables search result output at full clock rate.

The insertion or removal (updating) of keys is required for keeping the Key TDA entries in a sequence that is appropriate for performing fast lookups. The TDA structure is implemented with a RAM consisting of M w-bit keys or words per row. The M keys of each row can be read and written in one or more steps, depending on several factors, such as the number of keys per row, the length of each key, the type of RAM used (e.g., DRAM, SRAM, etc.), whether the RAM is embedded in the chip or placed externally, etc. Prior to a key update operation, a search procedure determines the position where the submitted key is to be inserted or removed, provided that the update operation is allowed. Key insertion is allowed only if the key is not included in the TDA, whereas key removal is possible only if it is already included in the TDA. The preliminary search procedure is identical for Binary CAMs and RCAMs. U.S. patent application Ser. No. 10/688,986 disclosed efficient accessing and search schemes (Linear Search, Binary Search and B-Tree Search) for external DRAMs; these schemes can be used to minimize the number of accesses to these DRAMs to improve the efficiency of the update operations disclosed herein, when performed in external DRAMs.

Three maintenance algorithms are disclosed. The first algorithm, denoted "Fixed Row Size", keeps a nearly fixed number of entries per row, but the maintenance rate decreases continuously as the TDA becomes filled. The second algorithm, denoted "Split Row", allows fast update rates when the storage capacity is filled up to 50%, but these rates decrease as the rows become filled. The third algorithm, denoted "Fixed Block Size", allows fixed minimum update rates at the expense of reduced storage capacity. It operates with blocks having a fixed number of rows, with a predefined minimum and maximum number of entries per row. The three algorithms can be readily implemented in hardware.

Each of these maintenance algorithms have their advantages and drawbacks, and offer a different tradeoff between storage capacity and maintenance rate. Each maintenance algorithm may operate with a flexible non-contiguous row ordering which can be implemented using an FC-Register (mentioned above); this register contains, along with the TDA First Column Key entries, Row Index entries that point to the physical TDA rows corresponding to the Key entries. The update operations in these three methods can be performed so that the Key entries are kept in cyclic monotonic order within individual rows. The use of cyclic monotonic order in each row reduces significantly the number of shifts of entries within each row, thereby increasing the maintenance rate and reducing the power consumption.

As mentioned above, maintenance operations, which include key update and reordering operations, can be carried out within the context of a specified operation priority, where search operations are typically assigned the highest priority, and update operations take place only when lookups are not currently required; search and update operations are performed in the foreground. Key reordering may include key shifting within one or more rows of an array, key repositioning in different rows, etc., and may be performed in the background, i.e., only during NOP cycles or intervals between search (at the highest priority) and update operations, so that the search process is not blocked (unimpeded) nor substantially delayed, and the update operations are also performed with minimal possible delay. Key shifting required to keep a monotonic order for an update operation may be performed immediately after this operation (and not in the background). The key update and reordering procedures are designed so that the database is always fully operational for search operation. This allows maintenance interleaved with search operation, where key search, update, and reordering operations are performed at the highest possible rate according to a specified operation priority.

The TDA and the surrounding hardware that supports the key update are identical for Binary CAMs and RCAMs. The surrounding hardware may include an FC-Register with row index pointers (FIG. 1), which allows a flexible non-contiguous order of the rows. Each change in the TDA first column during key update requires the update of the FC-Register entries, which may involve simple writes, or insertion/removal of register entries if rows are added or deleted in the TDA. The repositioning procedures for the maintenance operations in the TDA are achieved by sequential read, forward/backward shift and write steps (not shown in the figures).

An Empty Row Register (ER-Register) can be used to track the TDA empty rows; this register consists of Row Index entries pointing to the TDA empty rows. Initially, when the TDA is empty, the ER-Register is filled with entries that correspond to the TDA row numbers (listed in ascending order); on the other hand, the FC-Register is empty. When the TDA empty rows are filled (by insertion), the corresponding FC-Register rows are also filled and the respective Row Index entries listed in the ER-Register are removed. On the other hand, whenever a TDA row is emptied, the corresponding FC-Register row is removed and the respective Row Index entry is inserted in the ER-Register. In this way, the Row Index entries listed in the FC-Register and the ER-Register are always complementary for providing the entire list of the TDA row numbers. Using any means for identifying a filled/empty row, the two registers can be integrated in one to save hardware. This empty row tracking scheme can be efficiently used in the second and third maintenance algorithms disclosed below, in particular when a new row is needed during insertion; then, the ER-Register points to the nearest empty row. The first maintenance algorithm ("Fixed Row Size") starts by sequentially filling the first TDA column; thus, the TDA generally operates with no empty rows and an ER-Register is not necessary.

"Fixed Row Size" Algorithm

Considering a TDA with M columns and N rows, the Insert and Remove (update) operations are performed immediately, together with the necessary shifts of entries. Meanwhile, in the background, the number of entries of the TDA rows is sequentially compared with reference to a predefined maximum difference $\Delta M$. This comparison can be made with a number representing a dynamic average number of entries per row, designated $M_{avg}$, or an integral part of this dynamic average, Int $[M_{avg}]$, achieved by truncation or rounding up. If the difference between the number of entries of any row and a dynamic average number exceeds $\Delta M$, then the entries of this row (and possibly adjacent rows) are repositioned so that the difference is reduced and kept within $\Delta M$ and the number of entries per row is kept nearly fixed. This "row straightening" is performed during NOP intervals between search and update operations, so that the rates of these operations are not hampered.

This algorithm starts from initialization by inserting a zero value in the lowest TDA position, and then sequentially filling the first TDA column. Alternatively, the first TDA column may be initially filled at once with statistically selected entries suited to provide a balanced distribution of entries among the TDA rows. Once the first column is full, the Insert operation proceeds to fill the rows in monotonic order according to the values of the first column entries. The number of entries of the TDA rows is compared in the background with a dynamic average number as indicated above; whenever the number of entries in a row is larger than this number and the difference exceeds $\Delta M$, the entries of this row (and possibly adjacent rows) are repositioned (during NOP intervals) to reduce the difference between the numbers of entries in the rows and the dynamic average within $\Delta M$. The Remove operation proceeds similarly by deleting entries and repositioning the remaining entries whenever a row has fewer entries than a dynamic average number and the difference exceeds $\Delta M$. The algorithm can be alternatively performed by comparing in the background the longest and shortest rows in the TDA, and repositioning the entries whenever the difference exceeds the predefined maximum limit $\Delta M$. The repositioning of TDA the entries in either operation can be performed so to keep a cyclic monotonic order in each row, which reduces the number of shifts of entries within each row; this requires Column Index entries in the FC-Register to indicate the position of the lowest value entry in each row. The small number of shifts in the repositioning procedure is particularly suitable when using external memories because it minimizes the number on accesses to these memories and the bandwidth required, allowing higher-rate operation. As mentioned before, Row Index entries in the FC-Register allow flexible row ordering and empty row handling. In case of monotonic row ordering and no empty rows, Row Index entries are not required.

In general, if ΔM is small (e.g., ΔM=1), the repositioning procedure takes more steps than needed for larger values of ΔM, so there is a greater probability that the repositioning procedure will not be completed before a new update operation takes place. On the other hand, the number of free entries per row is kept nearly equal for all rows, and provides a better chance for a burst of keys to be inserted within individual rows, not requiring consequent extensive repositioning of entries in several rows. If ΔM>1, the number of free entries per row may vary, and an insertion of a burst of keys in a long row may cause an overflow, extensive repositioning of entries and long repositioning time. Thus, a narrow margin ΔM=1 is preferable, even though ΔM>1 may involve less repositioning operations and higher maintenance rate at reduced storage capacity. The insertion of a burst of keys may involve extensive repositioning of entries in several rows (for instance, when the number of entries in a particular row exceeds a specified threshold fill limit). Then, the insertion procedure may take increasingly longer time and the maintenance rate may decrease continuously; then, the entry repositioning may not catch up with the key insertion (due to the lack of NOP cycles or intervals). In these conditions, a minimum maintenance rate cannot be specified.

A typical insertion of a submitted Key entry in the TDA starts with a key search that determines the row and then the column after which the submitted key is inserted, and proceeds with the key insertion in the identified location. At the same time, the number of entries of each row is sequentially compared in the background with a dynamic average number, and if the number of entries of any row is larger than this average exceeding a predefined limit ΔM, then the entries of this row and a group of adjacent rows (ending in a row with less entries than this average) are repositioned to reduce the difference. The algorithm can be alternatively performed by comparing the longest and shortest rows and repositioning the entries whenever the difference exceeds ΔM.

FIG. 2 shows an example of a TDA and FC-Register in the process of inserting a Key entry, such as 5, in the first row. The number of TDA entries per row is M=15, and the maximal allowed difference between the longest and shortest rows is ΔM=1. The figure shows the TDA immediately after the insertion, before and after repositioning of the entries, which takes place in all the rows, except the last. The FC-Register Key entries are updated in correspondence with the TDA entry repositioning after the insertion. Note that in this example the Row Index entries are not included the FC-Register because they are not necessary, as the rows are arranged in monotonic order and there are no empty rows.

Figure 3:
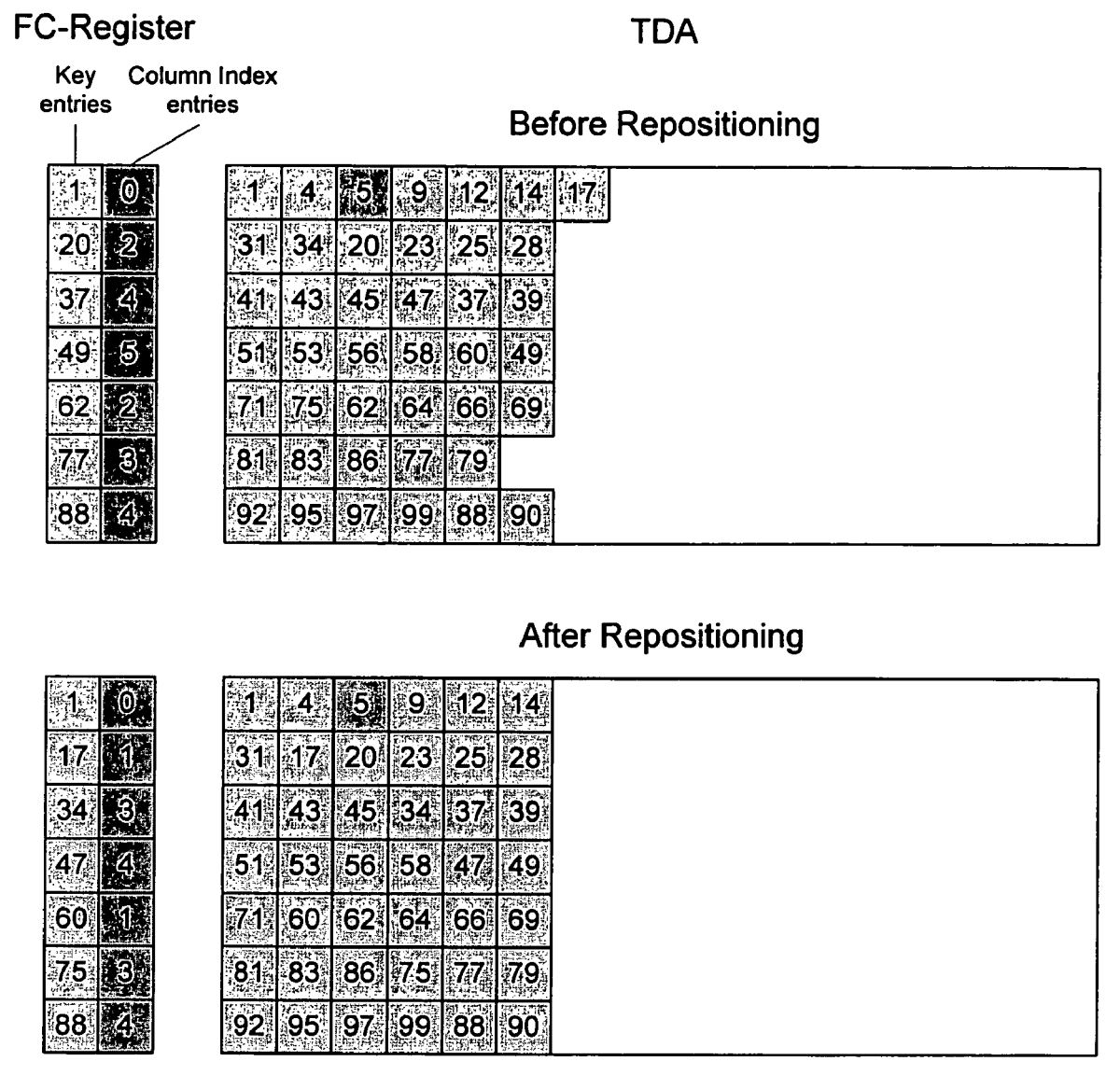

FIG. 3 shows a second example of a TDA and FC-Register in the process of inserting the Key entry 5 in the first row. The number of TDA entries per row is M=15, and ΔM=1, as in the first example. However, in this case, the Key entries are arranged in cyclic monotonic order, where lowest value entry is not necessarily positioned at the beginning of the row, and Column Index entries are included in the FC-Register to indicate the position of the lowest value entry in each row. The figure shows the TDA immediately after the insertion, before and after repositioning of the entries, which takes place in all the rows, except the last. The insertion of 5 between 4 and 9 in the first row involves a forward shift of the larger entries (9 through 17). The repositioning process starts by moving the largest entry (75) of the fifth row that precedes the shortest (sixth) row to the appropriate location (with Column Index 3) of the shortest row (between 68 and 77) causing a forward shift of the larger entries (77 and 79); the repositioning continues in the preceding rows, until the difference between row sizes is reduced within the specified ΔM (=1). In this example, the largest entry (60) of the fourth row moves to the empty cell left by 75 in the fifth row; similarly, the largest entry (47) of the third row moves to the empty cell left by 60, 34 moves from the second row to the empty cell left by 47, and 17 moves from the longest (first) row to the empty cell left by 34.

This example illustrates an important advantage of the use of cyclic monotonic order—it involves a forward shift of entries only in the longest row during the insertion of the submitted key and in the shortest row due to the insertion of a key from the adjacent row at the end of the repositioning process. All the intermediate rows undergo sequential transitions of a sole entry during the repositioning process. The relatively small number of shifts and transitions of entries within each row significantly increases the maintenance rate and reduces the power consumption.

Note that at the end of the repositioning process, the Column Index entries of the longest and shortest rows remain unchanged, whereas the Column Index entries of the rows in between are reduced by 1.

The repositioning process disclosed herein is performed from the shortest row to longest one. FIG. 3 illustrates the case in which the longest row precedes the shortest one and the entry repositioning proceeds upwards. However, when the shortest row precedes the longest one, then the entry repositioning proceeds downwards.

A typical removal of a submitted Key entry from the TDA starts with a key search that determines the row and then the column of the Key entry to be removed; it then proceeds with the removal of the identified key. At the same time, the number of entries of each row is sequentially compared in the background with a dynamic average number, and if the number of entries of any row is smaller than this average exceeding a predefined limit ΔM, then the entries of this row and a group of adjacent rows (ending in a row with more entries than this average) are repositioned to reduce the difference. The algorithm can be alternatively performed by comparing the shortest and longest rows and repositioning the entries whenever the difference exceeds ΔM.

FIG. 4 shows an example of a TDA and FC-Register in the process of removing a Key entry from the last row. The number of TDA entries per row is M=15, and maximal allowed difference between the shortest and longest rows is ΔM=1. The figure shows the TDA immediately after the removal, before and after repositioning of the entries, which takes place in all the rows, except the first. The FC-Register entries are updated reflecting the TDA entry repositioning after the removal. As in FIG. 2 above (for Insert operation), the Row Index entries are not included the FC-Register because they are not necessary. Cyclic monotonic ordering applied in Remove operation is similar to that used in Insert operation (see FIG. 3) and is not exemplified herein; the entry repositioning proceeds from the shortest row to the longest one.

"Split Row" Algorithm

In the "Split Row" Algorithm, the Insert and Remove operations are conducted in a TDA with M columns and N rows at a high rate while the TDA is filled up to 50% of its storage capacity, but this rate decreases as the rows become filled.

This algorithm starts from initialization by inserting a zero value in the lowest TDA key position, and then filling sequentially the first TDA row. After this row becomes filled (or alternatively, when the number of entries of this row exceeds a specified threshold fill limit), upon the next insertion, it splits into two halves and the Key entries of its second half are shifted to a second row. The insert operation proceeds in these two rows, until one of them is filled (or exceeds a specified threshold fill limit) and split in half into a third row upon the next insertion. This procedure is repeated at a high rate until only one row remains empty, and its first half is filled with Key entries resulting from filling and splitting any other row. Then, the first halves of all the TDA rows are filled, some rows beyond 50%, totaling at least 50% (or less if a threshold fill limit is specified) of the storage capacity. From this point, all further insertions are sequentially performed in each row at increasingly slower rates, because the filling of any additional row involves the shifts of one or more entire rows. On the other hand, all the remove operations are performed at a high rate because they only involve shifts within individual rows. Row splitting during insert operations requires tracking the position of the row that contains the shifted Key entries, because the ascending row ordering is not necessarily maintained. An FC-Register with associated Row Index entries may be used to track the row position. The insert rate may be kept high after all the TDA rows are partially filled (and even when part of the TDA rows are totally filled) by shifting the largest Key entry of a filled row undergoing an insertion to another (partially filled) row and adding a new Row Index entry to the FC-Register for the shifted Key entry. In this alternative procedure the number of FC-Register rows exceeds the number of TDA rows. The Key entries in the TDA rows can be then reordered in the background so that each Row Index entry points to a single row and the number of the FC-Register rows are reduced to match the number of TDA rows.

A typical fast insertion of a submitted Key entry in the TDA starts with a key search that determines the row and then the column after which the submitted key is inserted, as long as the TDA still has empty rows. If a new Key entry is inserted in a partially filled row, no further step is required. However, if this Key entry is inserted in a full row, this row is split in half and the Key entries of its second half are shifted to an empty row.

Figure 5:
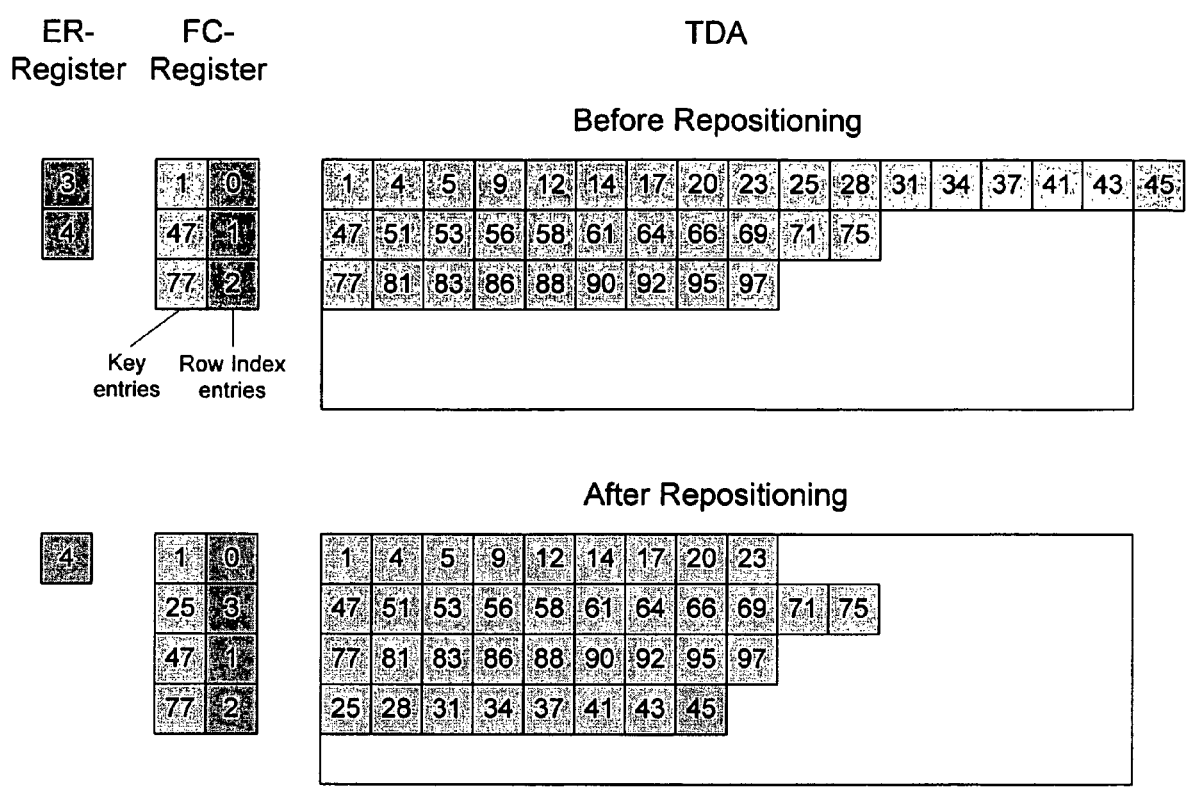
FIG. 5 shows an example of a TDA in the process of inserting a Key entry in a full (first) row; the TDA is shown immediately after the insertion, before and after the split of the first row and shift of Key entries to an empty (fourth) row.

FIG. 5 shows an example of a TDA and an FC-Register in the process of inserting a Key entry in a full (first) row; the figure shows the TDA immediately after the insertion, before and after the split of the first row and shift of Key entries to an empty (fourth) row. This row is selected as the nearest empty row using the ER-Register shown in the figure. The FC-Register and ER-Register are updated in correspondence with the TDA entry repositioning after the insertion.

FIG. 6 shows an example of a TDA and an FC-Register in the process of inserting the key 103 in a full row, causing the key 115 to overflow and be shifted to a partially filled (first) row; the figure shows the TDA immediately after the insertion, before and after shifting the key 115 to the first row. This shift is reflected in the FC-Register by the addition of a new Row Index entry at the register end, so the number of FC-Register rows exceeds that of the TDA rows. The Key entries in the TDA rows can then be reordered in a background operation so that each Row Index entry points to a single row and the number of the FC-Register rows are reduced to match the number of TDA rows; this reordering is not shown in the figure.

A typical removal of a submitted Key entry from the TDA starts with a key search that determines the row and then the column of the Key entry to be removed. The remove operation is always performed at a high rate because it only involves shifts of Key entries within individual rows.

Figure 7:
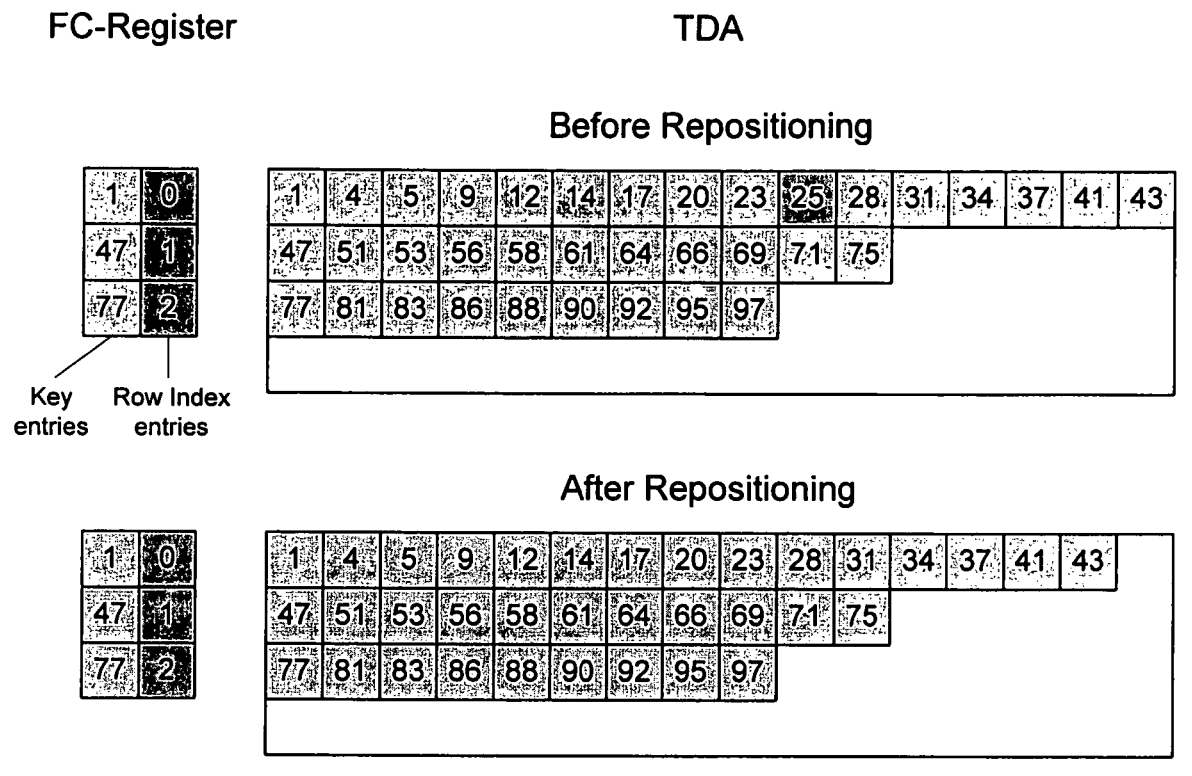

FIG. 7 shows an example of a TDA in the process of removing the key 25 from the first row; the figure shows the TDA immediately before the removal, and then, after the removal and repositioning of the Key entries, which only involves a backward shift within the first row. Since TDA entry repositioning is not required after the removal, the FC-Register entries remain unchanged.

"Fixed Block Size" Algorithm

The "Fixed Row Size" and "Split Row" algorithms described above have the drawback that the worst-case maintenance rate cannot be specified; they involve repositioning procedures that take increasingly longer time and the maintenance rate decreases continuously. The "Fixed Block Size" algorithm ensures a specified worst-case low limit for the maintenance rate and a maximum number of rearranged entries (within a block); this holds as long as a given factor of the total TDA storage capacity is not exceeded (and thus a number of TDA rows remain empty).

Considering a TDA with M columns and N rows, each Insert or Remove (update) operation in this algorithm is conducted within a block of rows having a specified length (number of rows) ranging between a minimum $N_{min}$ (before reposition of entries during an insertion, or after reposition during a removal) and a maximum $N_{max}$ (before reposition of entries during a removal, or after reposition during an insertion). The row block is dynamic (i.e., not fixed to a particular row or group of rows) and is determined for each operation by a preceding search procedure that identifies the update position. The update position may be located in any row of the block, but is preferably specified (and exemplified) as the first row of the block. The number of entries in each row of a block ranges from a maximum $M_{max}$ to a minimum $M_{min}$; when $M_{max}$ is exceeded during an insertion or $M_{min}$ is exceeded during a removal in any of the block rows, the block entries are rearranged without changing the total number B of entries in the block (counted before the update operation). During an Insert operation, when the number of entries in any of the initial $N_{min}$ block rows exceeds $M_{max}$, the block entries are rearranged in these rows until all the rows are filled to $M_{max}$; then, upon any subsequent insertion, the block entries in the $N_{min}$ rows are repositioned in $N_{max}$ rows (using remaining empty rows)—the number of entries in each row decreases, but not below $M_{min}$. On the other hand, during a Remove operation, when the number of entries in any of the initial $N_{max}$ block rows decreases below $M_{min}$, the block entries are rearranged in these rows until all the rows are reduced to $M_{min}$ entries; then, any subsequent removal causes repositioning of entries in $N_{min}$ rows (leaving new empty rows)—the number of entries in each row increases, but not above $M_{max}$. The repositioning process may start either before or after the update operation (or in a background operation), as programmed.

The repositioning of block entries arranged in $N_{min}$ rows into a larger number of $N_{max}$ rows during insertion can be regarded as a split of entries; then, the "Split Row" algorithm can be viewed as a special case of the "Fixed Block Size" algorithm, where $N_{min}=1$ and $N_{max}=2$.

The ratio $R=N_{min}/N_{max}$ represents a capacity reduction factor; it determines the maximum number of entries that can be stored in the TDA and still ensure a worst-case low limits for the lookup and update rates. If the TDA is filled beyond this capacity ratio, the "Fixed Block Size" algorithm cannot be applied and the insertion rate drops with the increasing number of entries. As long as the TDA is filled within the capacity ratio, a defined lookup rate determines the worst-case low limit for the update rate, and alternatively, a defined update rate determines the worst-case low limit for the lookup rate.

The simplest and preferred case for implementation is that in which the algorithm is aimed to keep an equal number of entries per row after repositioning; then, the number of entries per row varies from a maximum $M_{max}=B/N_{min}$, which usually covers the entire row (i.e., $M_{max}=M$), to a minimum $M_{min}=B/N_{max}$ during insertion, or from a minimum $M_{min}$ to a maximum $M_{max}$ during removal. The capacity reduction factor R can be defined in this case also in terms of the number of entries per row: $R=N_{min}/N_{max}=M_{min}/M_{max}$. In general, the number of entries may not equal in all the rows within a block after repositioning (i.e., when $M_{min}=B/N_{max}=N_{min} \cdot M_{max}/N_{max}$ is not an integer during insertion); however, this case is more difficult to handle and less preferable.

The repositioning procedures take a limited number of steps due to the predefined number of rows in a block, ensuring fixed minimum update rates. These rates hold as long as the TDA is filled up to the factor $R=N_{min}/N_{max}$ of its storage capacity, because then the TDA still includes empty rows. When the TDA is filled exceeding this capacity, empty rows may not remain and the maintenance rates may decrease. As long as the TDA does not exceed this capacity, each repositioning during removal generates a new empty row that can be used in successive Insert operations. Note that the number of entries in the last row (only) may exceed the allowed range ($M_{min}$ to $M_{max}$).

In general, there is a tradeoff between storage capacity and maintenance rate. An increase in R toward 100% storage capacity involves larger $N_{min}$ and $N_{max}$ integers; then, more repositioning steps are required and the maintenance rate decreases. Similarly, a decrease in R and storage capacity leads to fewer repositioning steps and faster maintenance.

The first row of a block for consideration is determined in each case by the search procedure prior to the key update. In the method presented herein, the count of $N_{min}$ rows for insertion (before repositioning) and the count of $N_{max}$ rows for removal (before repositioning) proceeds downwards. A similar method could be implemented with the count proceeding upwards for the key update.

The use of an FC-Register, which contains TDA First Column Key entries and associated Row Index entries that point to the physical TDA rows corresponding to the Key entries, allows non-contiguous row ordering. Then, newly added block rows (due to repositioning) during insertion can be located in empty TDA rows, and newly emptied block rows (due to repositioning) during removal can be left in place; this minimizes shifting of the TDA entries. The rearrangement of block entries (without repositioning) in more than one row during TDA update requires updating of the FC-Register Key entries. The repositioning of block entries requires, besides updating of the FC-Register Key entries, insertion of new FC-Register rows during insertion of entries in the TDA, and removal of FC-Register rows during removal of TDA entries.

Figure 9:
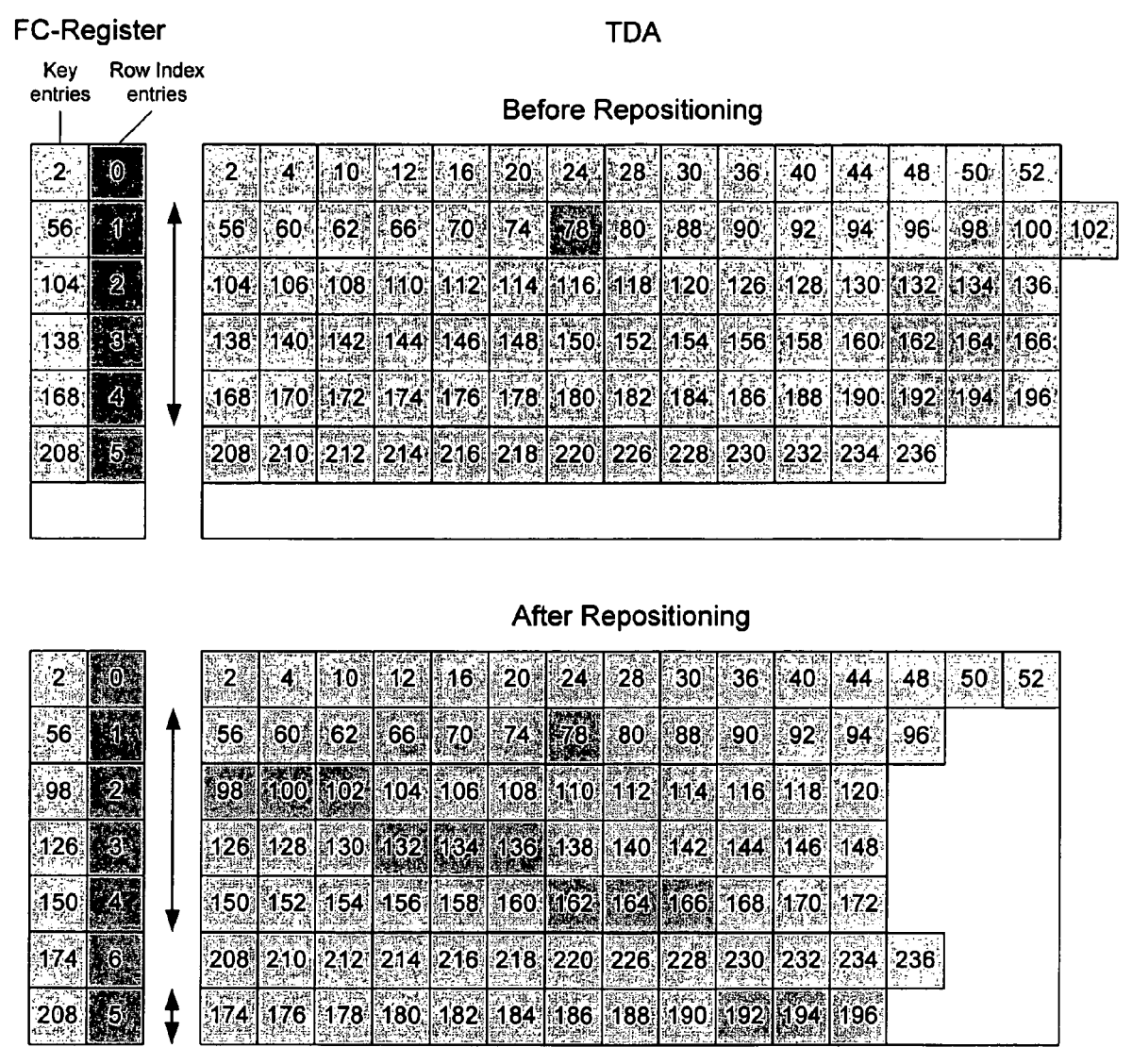

A typical insertion of a submitted Key entry in the TDA starts with a key search which determines the first row of a block, and proceeds within this block with $N_{min}$ rows. The submitted keys are sequentially inserted and the block entries are rearranged until all the $N_{min}$ rows of the block become filled (as exemplified in FIG. 8). The repositioning process in the block may start either before a new key is inserted in a filled block or after the insertion (as shown in FIG. 9), causing an overflow in the first row of the block; then, the Key entries of the $N_{min}$ filled rows ($M_{max}=M$) are repositioned in $N_{max}$ rows, where the number of entries cannot decrease below $M_{min}$, and the total number B of entries in the block (counted before the insertion) remains unchanged. After this repositioning procedure, the next insertion can be performed within this or any other block.

FIG. 8 shows an example of a TDA in the process of inserting the key 40 in the first row (indexed 0). The block involved in the insertion contains $N_{min}=4$ rows (counted downwards and indexed 0 to 3) with a maximum of M=15 entries; the last two rows in the TDA (indexed 4 and 5) do not belong to the block involved in the operation. After the insertion, the Key entries are rearranged in the first and second rows only, because the second row is not filled, and no repositioning in added rows is needed. Note that the FC-Register Key entry in the second row requires updating.

FIG. 9 shows the TDA of FIG. 8 (after the insertion of the key 40) in the process of inserting the key 78 in the second row (indexed 1). Now, a full block is involved in the insertion, having a total number of B=60 entries arranged in $N_{min}=4$ rows (counted downwards and indexed 1 to 4) with a maximum of M=15 entries. The insertion of the key 78 causes an overflow in the second row and requires repositioning in $N_{max}=5$ rows with a minimum of $M_{min}=12$ entries. The capacity reduction factor in this repositioning is R=⅘ (80%). The TDA is shown when the repositioning process starts immediately after the new key is inserted (this process could start before the new key is inserted, but this case is not shown). The entries of the block fifth row are repositioned in the TDA seventh row (indexed 6); this saves the shifting of the TDA sixth row entries (which do not belong to the block). This empty row is selected using the ER-Register (not shown in the figure). The repositioning process requires the insertion of a new row in the FC-Register (with a Row Index entry pointing to the TDA seventh row) and the update of several Key entries.

Figure 10:
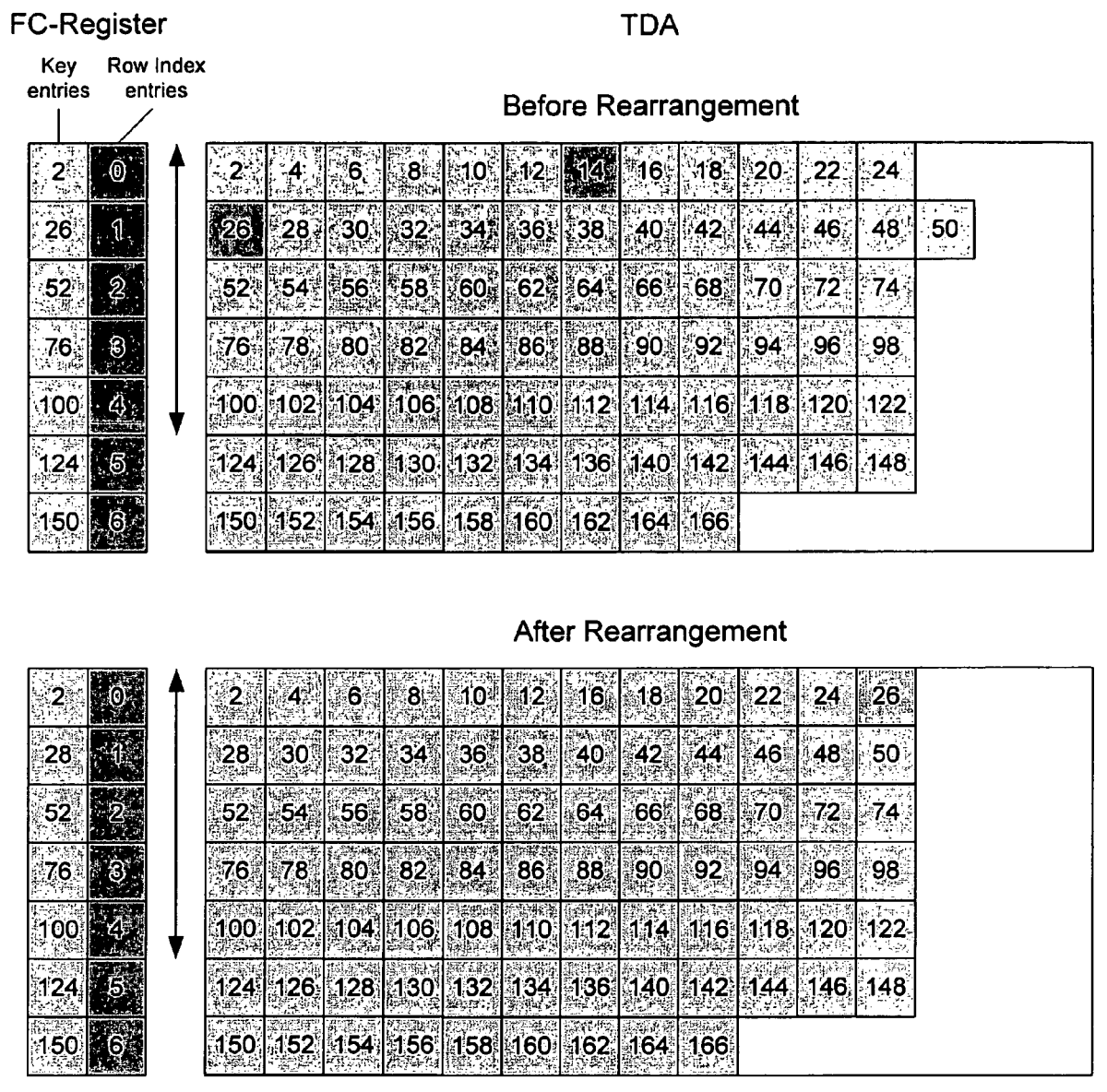
Figure 11:
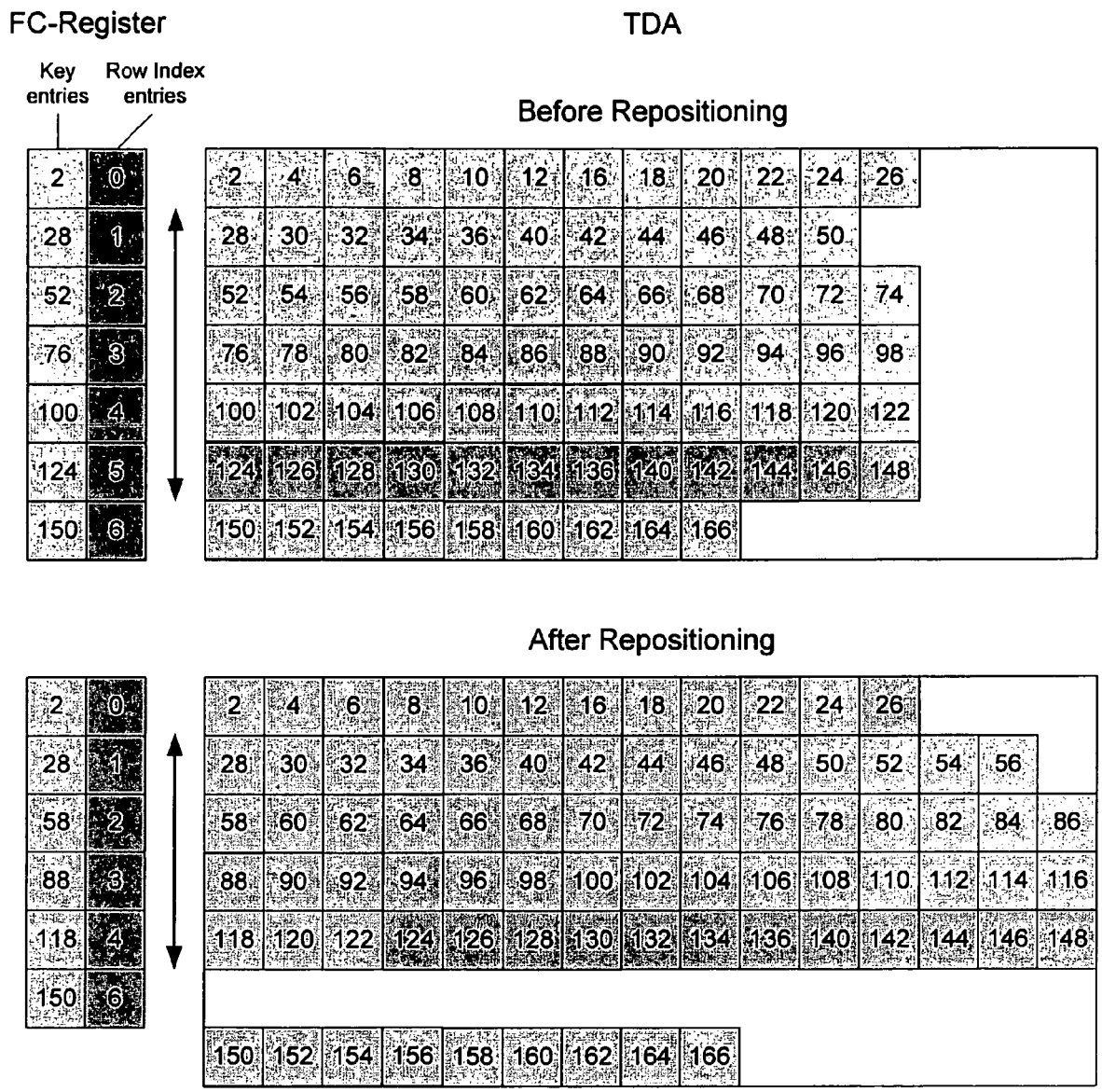
FIG. 11 shows the TDA of FIG. 10 (after the removal of the key 14) in the process of removing the key 38 from the second row; the Key entries, arranged in $N_{max}=5$ rows with a minimum of $M_{min}=12$ entries, are repositioned in $N_{min}=4$ rows with a maximum of M=15 entries after the removal. The TDA is shown before and after the repositioning process.

A typical removal of a submitted Key entry from the TDA starts with a key search which determines the first row of a block, and proceeds within this block with $N_{max}$ rows. The submitted keys are sequentially removed and the remaining keys in the block entries are rearranged until all the $N_{max}$ rows of the block decrease to $M_{min}$ (as depicted in FIG. 10). The repositioning process in the block may start either before a key is removed or after the removal (as shown in FIG. 11); then, the Key entries in the $N_{max}$ partially filled rows are repositioned in $N_{min}$ rows with a maximum of $M_{max}=M$ entries, and the total number B of entries in the block (counted before the insertion) remains unchanged. After this repositioning procedure, the next removal can be performed within this or any other block.

FIG. 10 shows an example of a TDA in the process of removing the key 14 from the first row (indexed 0). The block involved in the removal contains $N_{max}=5$ rows (counted downwards and indexed 0 to 4) with a minimum of $M_{min}=12$ entries; the last two rows in the TDA (indexed 5 and 6) do not belong to the block involved in the operation. After the removal, the Key entries are rearranged in the first and second rows only, because the second row has more than $M_{min}=12$ entries; no repositioning in fewer rows is needed. The FC-Register Key entry in the second row requires updating.

FIG. 11 shows the TDA of FIG. 10 (after the removal of the key 14) in the process of removing the key 38 from the second row (indexed 1). Now, the block involved in the insertion has a total number of B=60 entries arranged in $N_{max}=5$ rows (counted downwards and indexed 1 to 5) with a minimum of $M_{min}=12$ entries. The removal of the key 38 causes an "underflow" in the second row and requires repositioning in $N_{min}=4$ rows with a maximum of M=15 entries. The capacity reduction factor in this repositioning is R=⅘ (80%). The TDA is shown when the repositioning process starts immediately after the key 38 is removed (this process could start before the key is removed, but this case is not shown). The block sixth row (TDA seventh row indexed 6) is left empty (because the capacity is reduced below the reduction factor $R=N_{min}/N_{max}$); this saves the shifting of the TDA sixth row entries (which do not belong to the block). The new empty row is inserted in the ER-Register (not shown in the figure). The repositioning process requires the removal of a FC-Register row (corresponding to the empty TDA sixth row indexed 5) and the update of several Key entries.

Combining the Maintenance Algorithms

Each of the three maintenance algorithms disclosed above has advantages and drawbacks, and offer a different tradeoff between storage capacity and maintenance rate. Each of them can operate with a flexible non-contiguous row ordering implemented using Row Index entries in the FC-Register that point to the physical TDA rows corresponding to the Key entries; these rows do not have to be completely filled. The Key entries can be kept in cyclic monotonic order within individual rows during Insert and Remove (updating) operations using Column Index entries. The use of cyclic monotonic order in each row reduces significantly the number of shifts of entries within each row, which increases the maintenance rate and reduces the power consumption. The update operations are subject to a specified operation priority, where search operations are typically assigned the highest priority, and update operations are performed only when lookups are not currently required. Key reordering operations may be performed in the background, i.e., only during NOP cycles or intervals between search (at highest priority) and update operations, so that the search process is not blocked (unimpeded) nor substantially delayed, and the update operations are performed with minimal possible delay. The key update and reordering procedures are performed so that the database is always fully operational for search operation. This allows maintenance interleaved with search operation, where key search, update, and reordering operations are performed at the highest possible rate according to specified operation priority mentioned above. A suitable combination of different algorithms with non-contiguous row ordering and cyclic monotonic order in each row can be applied to enhance the update operation efficiency.

In the "Fixed Row Size" algorithm, the number of entries per row is kept nearly fixed, within a predefined maximal allowed margin of $\Delta M$ entries between the number of entries of longest or shortest row and a dynamic average number of entries per row, as defined above. The nearly fixed row size is achieved by background repositioning of entries in different rows following the insertion or removal of single keys or bursts of keys. As described hereinabove, the algorithm starts by filling completely the first TDA column. Then, the Insert operation proceeds by filling the rows in monotonic order according to the first column entries; whenever the longest row exceeds the dynamic average by $\Delta M$ entries, the entries of the TDA rows are repositioned (during NOP intervals) to reduce the difference between the number of entries in the rows and the dynamic average within $\Delta M$. The Remove operation proceeds similarly, by deleting entries and repositioning the remaining entries whenever the shortest row has $\Delta M$ fewer entries than the dynamic average and the difference exceeds $\Delta M$. The algorithm can be alternatively performed, by comparing, in the background, the longest and shortest rows in the TDA and repositioning the entries whenever the difference exceeds $\Delta M$. The repositioning of the TDA entries in any update operation is performed so to keep a monotonic order or preferably a cyclic monotonic order in each row, which reduces the number of shifts of entries within each row; cyclic monotonic order requires Column Index entries in the FC-Register to indicate the position of the lowest value entry in each row. The main advantage of this algorithm resides in the relatively small number of shifts of entries required for repositioning and the performance of the repositioning in the background. The main drawback is that the minimum maintenance rate cannot be specified, and during high-rate key insertion, such as the case of a burst of keys, the background repositioning process may not catch up with the ongoing insertion, and the insertion process may be delayed.

In the "Split Row" algorithm, the TDA rows are sequentially filled by insertion, and when any row becomes completely filled, it splits into two halves and the Key entries of its second half are shifted to a new row. This algorithm uses flexible row ordering designated by Row Index entries included in the FC-Register. The insert operation proceeds at a high rate as long as there are empty rows left in the TDA; at this point, the first halves of all the TDA rows are filled, some rows beyond 50%, totaling at least 50% of the storage capacity. Then, all further insertions are performed at increasingly slower rates, because the filling of any additional row involves the shifts of one or more entire rows; these insertions and shifts are performed immediately. The remove operations are always performed at a high rate because they only involve shifts within individual rows. This algorithm is very efficient as long as the TDA has empty rows left, and then it becomes disadvantageous.

The "Fixed Block Size" algorithm is conducted within a block of rows having a specified length (number of rows) ranging between a minimum $N_{min}$ and a maximum $N_{max}$. The number of entries in each row of a block ranges from a maximum $M_{max}$ to a minimum $M_{min}$; when $M_{max}$ is exceeded during an insertion or $M_{min}$ is exceeded during a removal in any of the block rows, the block entries are rearranged without changing the total number B of entries in the block (counted before the insertion/removal). During an Insert operation, when the number of entries in any of the initial $N_{min}$ block rows exceeds $M_{max}$, the block entries are rearranged in these rows until all the rows are filled to $M_{max}$; then, upon any subsequent insertion, the block entries are repositioned in $N_{max}$ rows (using remaining empty rows)—the number of entries in each row decreases, but not below $M_{min}$. On the other hand, during a Remove operation, when the number of entries in any of the initial $N_{max}$ block rows decreases below $M_{min}$, the block entries are rearranged in these rows until all the rows are reduced to $M_{min}$ entries; then, any subsequent removal causes repositioning of entries in $N_{min}$ rows (leaving new empty rows)—the number of entries in each row increases, but not above $M_{max}$. The ratio $R=N_{min}/N_{max}$ represents a capacity reduction factor. In the simplest and preferred implementation, the algorithm is aimed to keep an equal number of entries per row after repositioning; then, the number of entries per row varies from a maximum $M_{max}=B/N_{min}$, which usually covers the entire row (i.e., $M_{max}=M$), to a minimum $M_{min}=B/N_{max}$ during insertion, or from a minimum $M_{min}$ to a maximum $M_{max}$ during removal. The capacity reduction factor R can be defined in this case also in terms of the number of entries per row: $R=N_{min}/N_{max}=M_{min}/M_{max}$. The main advantage of the "Fixed Block Size" algorithm is that it ensures a specified worst-case lower limit for the maintenance rate and a maximum number of rearranged entries (within a block); this holds as long as the factor $R=N_{min}/N_{max}$ of the total TDA storage capacity is not exceeded (and thus a number of TDA rows remain empty). Then the repositioning procedures take a limited number of steps due to the predefined number of rows in a block, ensuring fixed minimum Insert and Remove rates. When the TDA is filled exceeding this capacity, empty rows may not remain and the maintenance rates may decrease. This algorithm can be easily tested and its results can be easily verified as long as empty rows remain and the entry repositioning proceeds properly.

Figure 12A:
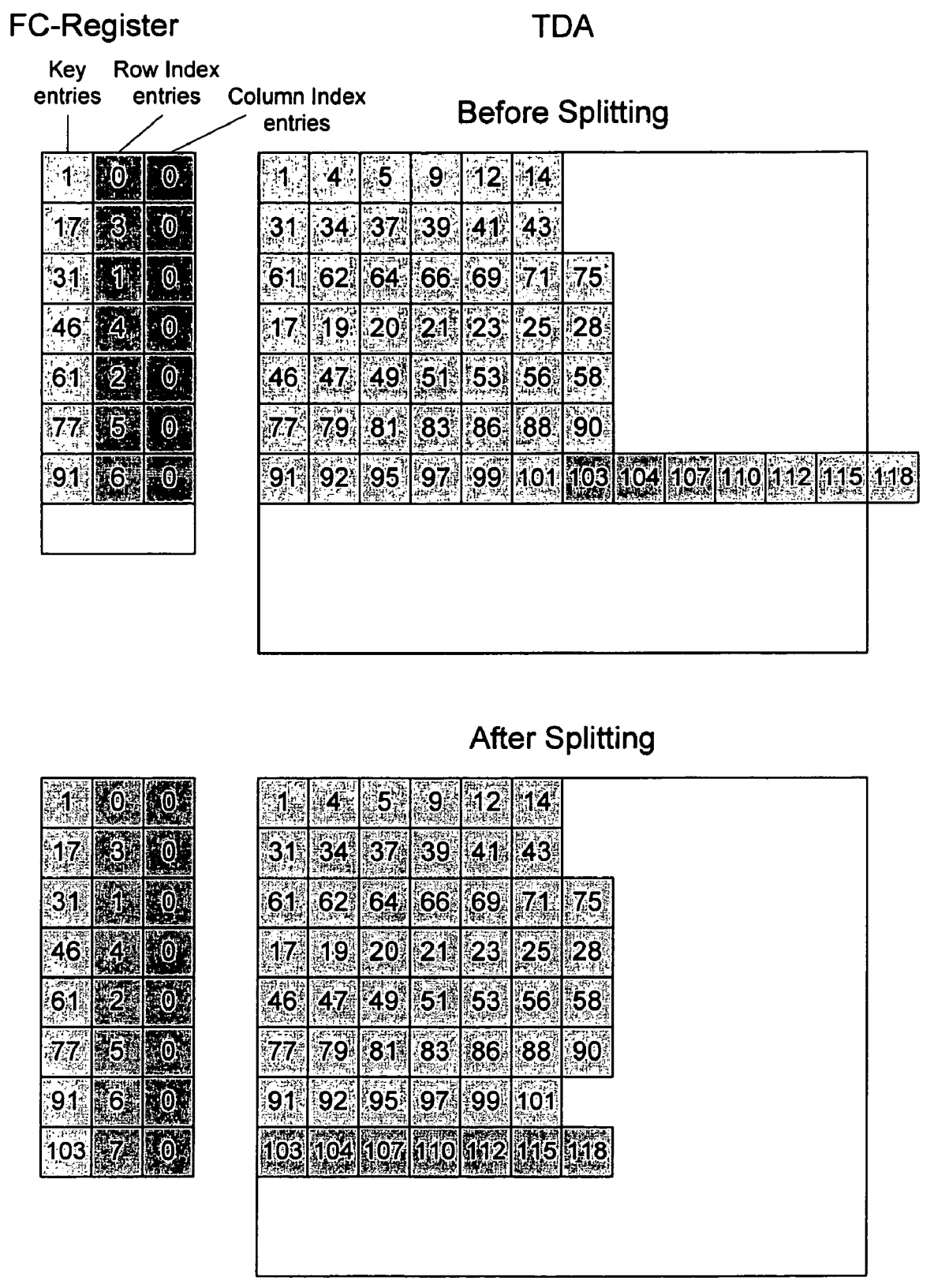

An example of an efficient Insert algorithm that combines the "Fixed Row Size" and "Split Row" methods is illustrated in FIGS. 12a and 12b. This combined algorithm starts using the "Split Row" method, where the Key entries are inserted in monotonic order. When any row becomes completely filled, it splits into two halves, and the Key entries of its second half are shifted to a new row, which is flexibly located in the TDA, using Row Index entries to point the row locations. This row splitting proceeds until a specified number of rows are occupied, for instance 80% of the TDA rows, in order to leave 20% of the rows empty. Once 80% of the TDA rows are occupied, the "Fixed Row Size" method is used to perform immediate Key entry insertions and background entry repositioning, keeping a cyclic monotonic order in each row. The entries are repositioned whenever the longest row exceeds the shortest one by $\Delta M$. The Column Index entries in the FC-Register are used to indicate the position of the lowest value entry in each row. FIG. 12a shows the last row split in which 80% of the rows become occupied. At this stage, the Key entries are arranged in monotonic order and the Column Index entries are all 0's indicating this condition. On the other hand, non-monotonic Row Index column point to flexible row locations in the TDA. FIG. 12b shows the background repositioning process performed after the immediate insertion of 100 and 102 in the last occupied row (with row index 7). The repositioning is aimed in this example to reduce the difference between the longest row (indexed 7) and the nearest shortest row (starting with 31—row index 3) within $\Delta M=1$; the three intermediate rows involved in the repositioning start with the entries 46 (with row index 2), 61 (indexed 1) and 77 (indexed 5). The insertion of 100 between 99 and 101 in the last occupied row involves a forward shift of 101; the insertion of 102 at the end requires no shift. Since, in this case, the shortest row precedes the longest one, the repositioning process proceeds downwards (from the lower to the higher key values). It starts by moving 46 (the smallest entry of the row indexed 2) to the end of the row that starts with 31 (indexed 3) requiring no entry shift; it continues by moving 61 to the empty cell left by 46. Similarly, 77 (the smallest entry of the row indexed 5) moves to the empty cell left by 61, and 91 (the smallest entry of the row indexed 6) moves to the empty cell left by 77.

Note that, in this example, the use of cyclic monotonic order involves a forward shift of entries only in the longest (last) row during the insertion of the submitted keys; the repositioning process involves sequential transitions of a sole entry in the intermediate rows and no shift in the shortest row. The Key entries of the FC-Register corresponding to the three intermediate TDA rows in the repositioning process change to the next higher values in these rows due to translation of the lowest entries to the succeeding rows. The Column Index entries of the longest and shortest rows remain unchanged, whereas the Column Index entries of the rows in between increase by 1.

The background entry repositioning illustrated in FIG. 12b can be performed as long as the immediate key insertion takes place at a rate that allows the repositioning process to catch up with it; otherwise, a row split process will takes place, as allowed due to the empty rows left for this purpose.

Figure 13A:
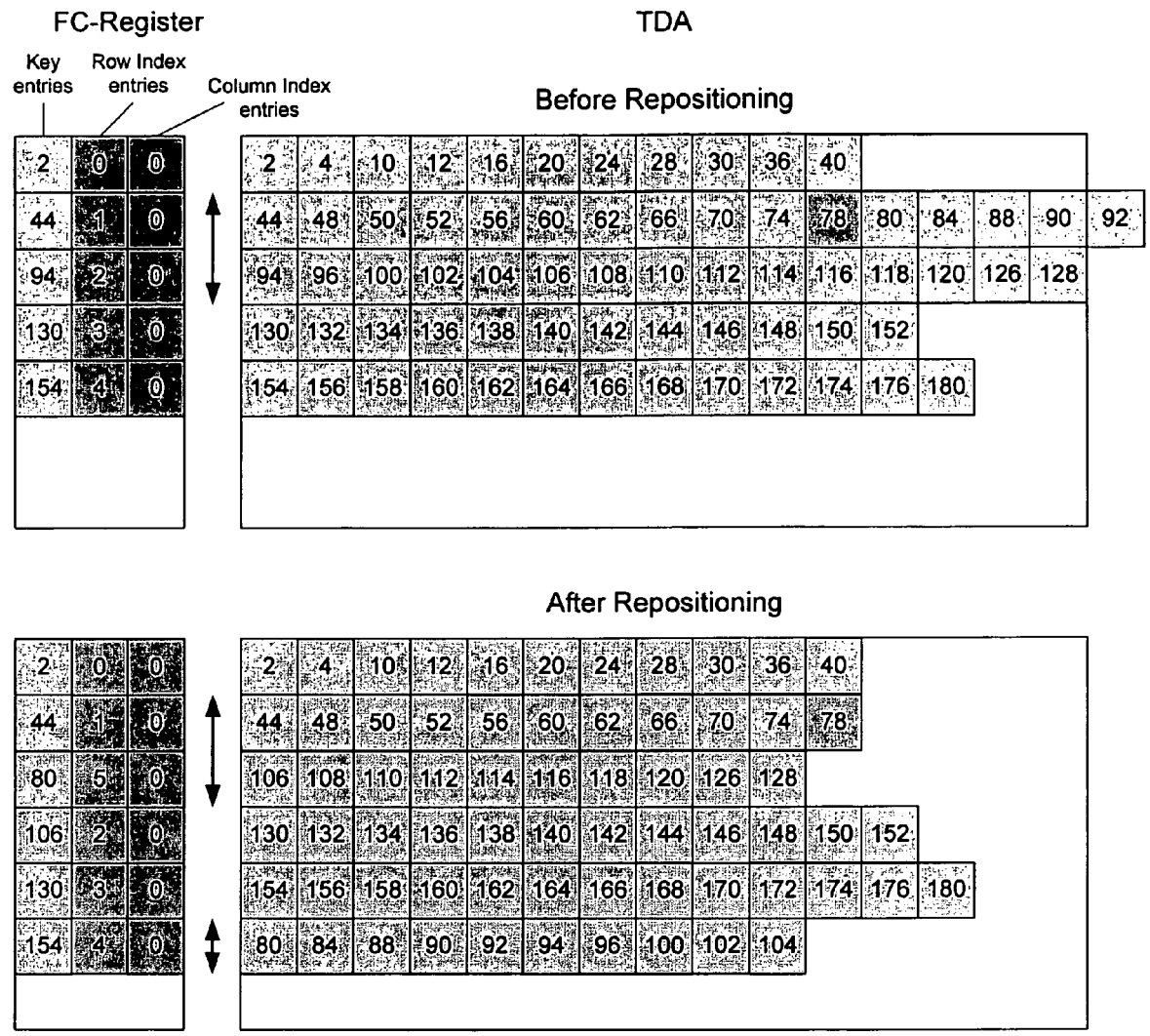
FIGS. 13a and 13b illustrate an efficient Insert algorithm that combines the "Fixed Row Size" and "Split Row" methods.
Figure 13B:
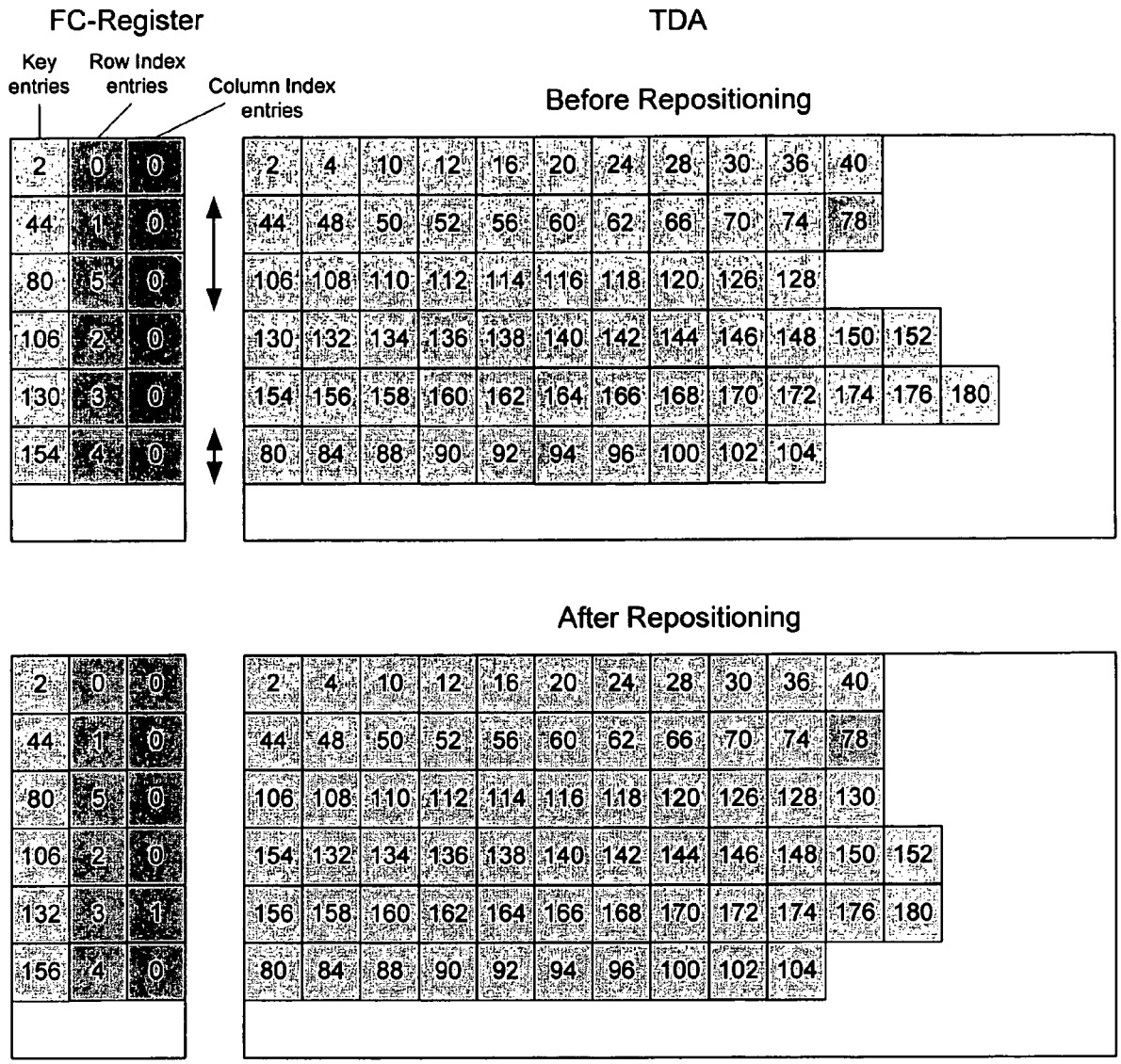

An example of an efficient Insert algorithm that combines the "Fixed Row Size" and "Fixed Block Size" methods is illustrated in FIGS. 13a and 13b. The combined algorithm starts using the "Fixed Block Size" method, where the Key entries are inserted in monotonic order within a block having a minimum number of $N_{min}$ rows. When the number of entries in any of the block rows exceeds $M_{max}$, the block entries are rearranged in these rows until all the rows are filled to $M_{max}$; then, upon any subsequent insertion, the block entries in the $N_{min}$ rows are repositioned in $N_{max}$ rows (using remaining empty rows)—the number of entries in each row decreases, but not below $M_{min}$. The total number B of entries in the block (counted before the insertion) does not change. The block rows can be flexibly located in non-contiguous order using Row Index entries in the FC-Register to point to the row locations. The "Fixed Row Size" method is then used in a background operation for entry repositioning, specifying a suitable maximum difference $\Delta M$ between row sizes. The entries are repositioned in a cyclic monotonic order in each row whenever the longest row exceeds the shortest one by $\Delta M$. Column Index entries are included in the FC-Register to indicate the position of the lowest value entry in each row. The background entry repositioning can be performed as long as the immediate key insertion takes place at a rate that allows catching up with it; otherwise, the block entries in the $N_{min}$ rows will be repositioned in $N_{max}$ rows according to the "Fixed Block Size" method.

FIG. 13a shows the process of inserting the key 78 in the second row (indexed 1) and repositioning of entries using the "Fixed Block Size" method. The block involved in the insertion has a total number of B=30 entries arranged in $N_{min}=2$ rows (counted downwards and indexed 1 and 2) with a maximum of M=15 entries. The insertion of the key 78 causes an overflow in the second row and requires repositioning in $N_{max}=3$ rows with a minimum of $M_{min}=10$ entries. The capacity reduction factor in this repositioning is R=⅔ (66.6%). The TDA is shown when the repositioning process starts immediately after the new key is inserted. The "extra" entries of the block second row are repositioned in the TDA sixth row (indexed 5); this saves the shifting of the TDA entries of the fourth and fifth rows (which do not belong to the block). The repositioning process requires the insertion of a new row in the FC-Register (with a Row Index entry pointing to the TDA sixth row) and the updating of several Key entries.

FIG. 13b shows the subsequent background repositioning performed using the "Fixed Row Size" method. The repositioning is aimed in this example to reduce the difference between the longest row (indexed 3) and the nearest shortest row (starting with 106—row index 5) within $\Delta M=2$; the intermediate row involved in the repositioning starts with the entry 130 (with row index 2). The repositioning process proceeds downwards (from the lower to the higher key values). It starts by moving 130 (the smallest entry of the row indexed 2) to the end of the row that starts with 106 (indexed 3) requiring no entry shift, and continues by moving 154 to the empty cell left by 106. The use of cyclic monotonic order involves a forward shift of entries only in the longest (last) row; the repositioning process involves sequential transitions of a sole entry in the intermediate row and no shift in the shortest row. The Key entries of the FC-Register corresponding to the intermediate TDA row changes to the next higher value due to translation of the lowest entry to the succeeding row. The Column Index entries of the longest and shortest rows remain unchanged, whereas the Column Index entry of the intermediate row increases by 1.

Row Repair by Redundancy

The new architecture, where the TDA operates with an FC-Register having Row Index entries, enables the "repair" and use of RAM devices with defective rows by pre-assigning alternative redundant rows. Since the Row Index entries of the FC-Register point to the RAM physical rows, each RAM row that is found to be defective is not assigned a row index in the FC-Register, so that the row remains logically inexistent and no entries are physically stored in it, but in an alternative redundant row. This repair method allows the use of cheaper RAM devices known to have specific defective rows detected in a preliminary Built-In Self Test (BIST), and also continue to use RAM devices where part of the rows may become defective during operation, by just redefining the row index list in the FC-Register so it points to the redundant rows, thus significantly improving the wafer yield.

This repair concept can be used for an embedded or an external RAM, and can also be extended to Multi-RAM CAM devices with defective rows, using an FC-RAM in a Single or Multi-Hierarchy architecture.

The repair scheme operates with processing means that determine the minimal number of redundant rows required to ensure that enough redundant rows are provided to replace the defective rows. A small memory device can be used to register the defective RAM rows detected in the BIST. As in the maintenance algorithms disclosed above, an Empty Row Register (ER-Register) can be used to track the operative RAM empty rows, where the RAM row numbers listed in this register initially correspond to the Row Index entries of the FC-Register. However, in this repair scheme, all the defective RAM rows detected in the BIST are removed upon initialization from the ER-Register and from the FC-Register; thus, these defective rows are always by-passed and remain unused.

Figure 14:
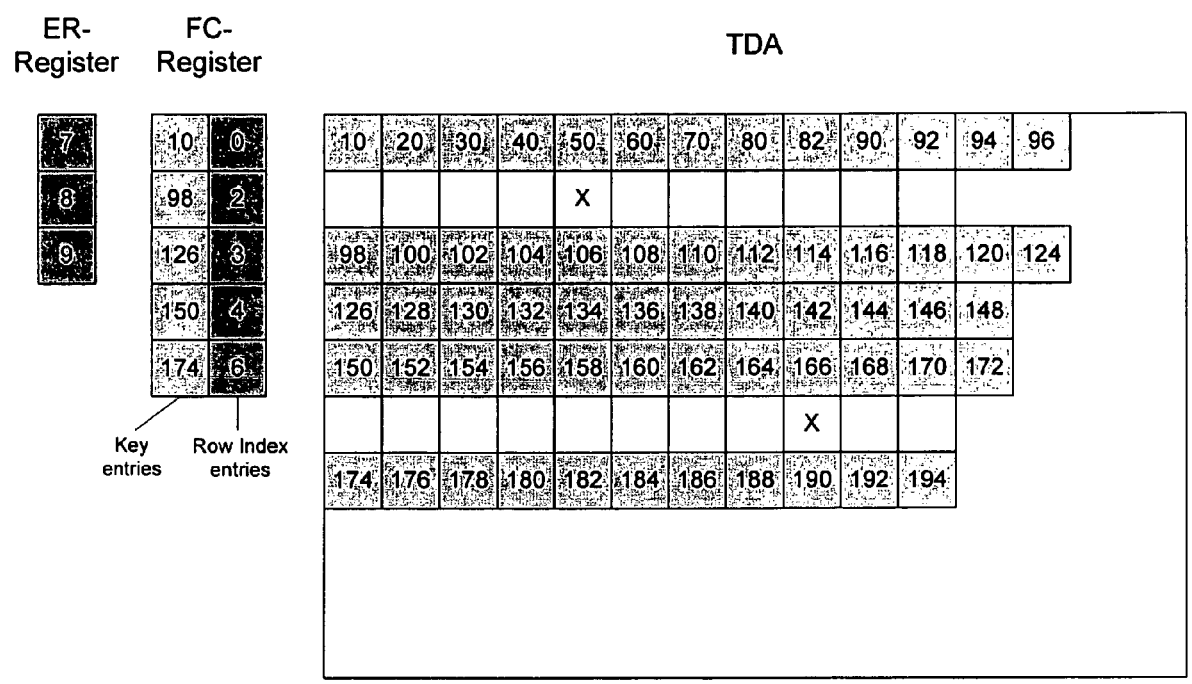
FIG. 14 shows an example of a TDA with two (second and sixth) defective rows; the Row Index entries of the FC-Register point only to the operative (not defective) RAM rows by-passing the defective rows.

FIG. 14 shows an example of a RAM with ten rows, two (the second and sixth) being defective. The Row Index entries of the FC-Register point only to the operative partially filled rows, whereas the ER-Register entries point to the operative empty rows, and the defective rows are by-passed.

Maintenance Interleaved with Search Operation

As described above, the maintenance operations can be carried out within the context of a specified operation priority, where search operations are typically assigned the highest priority, and update operations (insertions/removals) are performed only when lookups are not currently required. Key reordering operations (including key shifting and key repositioning) may be performed in the background, i.e., only during NOP cycles or intervals between search (at highest priority) and update operations, so that the search process is not blocked (unimpeded) nor substantially delayed, and the update operations are performed with minimal possible delay. The key update and reordering procedures are designed so that the database is always fully operational for search operation. These novel features allow maintenance interleaved with search operation, where key search, update, and reordering operations are performed at the highest possible rate according to specified operation priority mentioned above. Furthermore, the ratio between lookup and update operation intervals can be specified by the user to boost the speed of either operation.

One efficient interleaved update procedure consists in copying the rows of Key entries involved in the update operations to other rows in the memory (in the same RAM or another RAM in case of a Multi-RAM CAM), perform the insertions and removals (and necessary shifts) in the duplicated rows using one of the three maintenance algorithms disclosed hereinabove, and, when completed, change the Row Index entries of the FC-Register so they point to the updated rows and disregard the original rows. The ER-Register is used to keep track of the RAM empty and "irrelevant" rows; the irrelevant rows are disregarded by the FC-Register Row Index entries, so they are logically inexistent and their contents are superfluous.

Figure 15A:
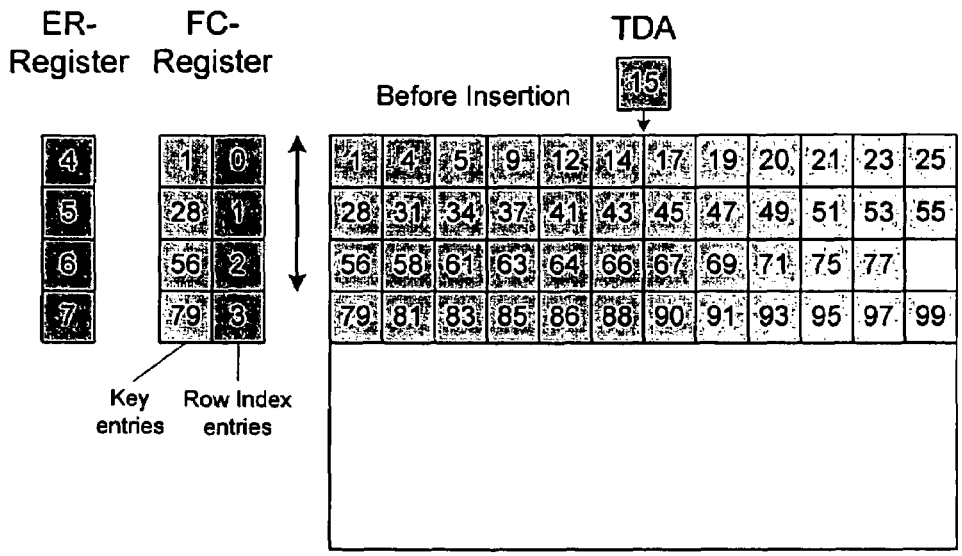
FIGS. 15a and 15b show an example of several steps in the process of inserting the key 15 in the first row of a RAM and updating the FC-Register in a manner suitable for interleaved maintenance using the "Fixed Block Size" algorithm.
Figure 15A:
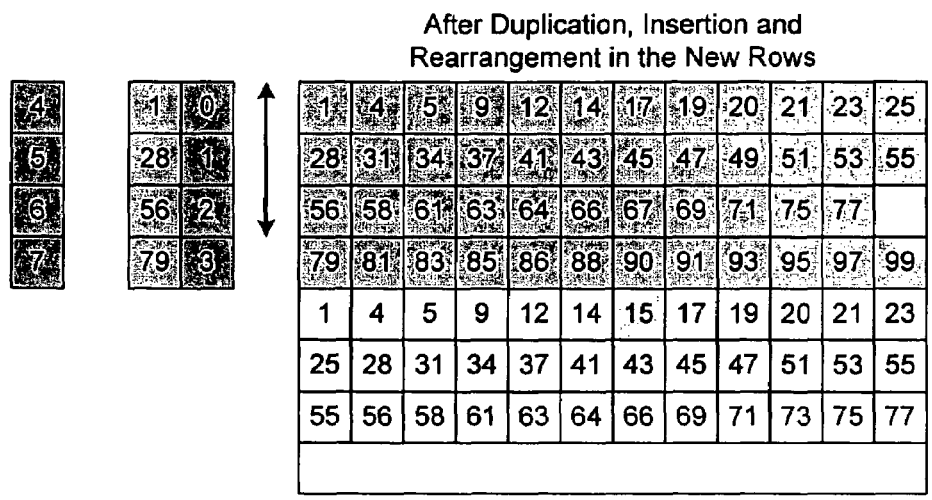
Figure 15A:
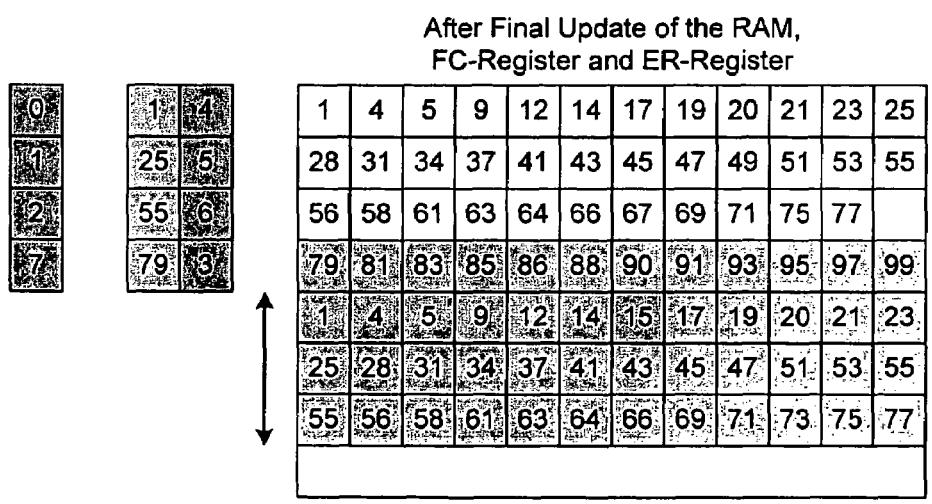

FIG. 15a shows an example of a RAM in the process of inserting the key 15 in the first row (indexed 0) suitable for interleaved maintenance using the "Fixed Block Size" algorithm described hereinabove. The block involved in the insertion contains $N_{min}=3$ rows (counted downwards and indexed 0 to 2) with a maximum of M=10 entries; the last four rows in the RAM (indexed 4 to 7) are empty, as recorded in the ER-Register.

The three rows (indexed 0 to 2) involved in the insertion are copied to the empty rows indexed 4 to 7 and the necessary rearrangements of the Key entries are performed in the duplicated rows. After the duplication and insertion of the key 15 in the row indexed 4, only the Key entries in the three rows indexed 4 to 6 require rearrangement because the row indexed 6 is not filled; thus, no repositioning in additional rows is needed. In this stage (shown in the figure), the RAM contains the original and copied rows, and the FC-Register and ER-Register still contain their original entries. The rows indexed 4 to 6 are not shaded to indicate that they are so far disregarded by the FC-Register.

Figure 15B:
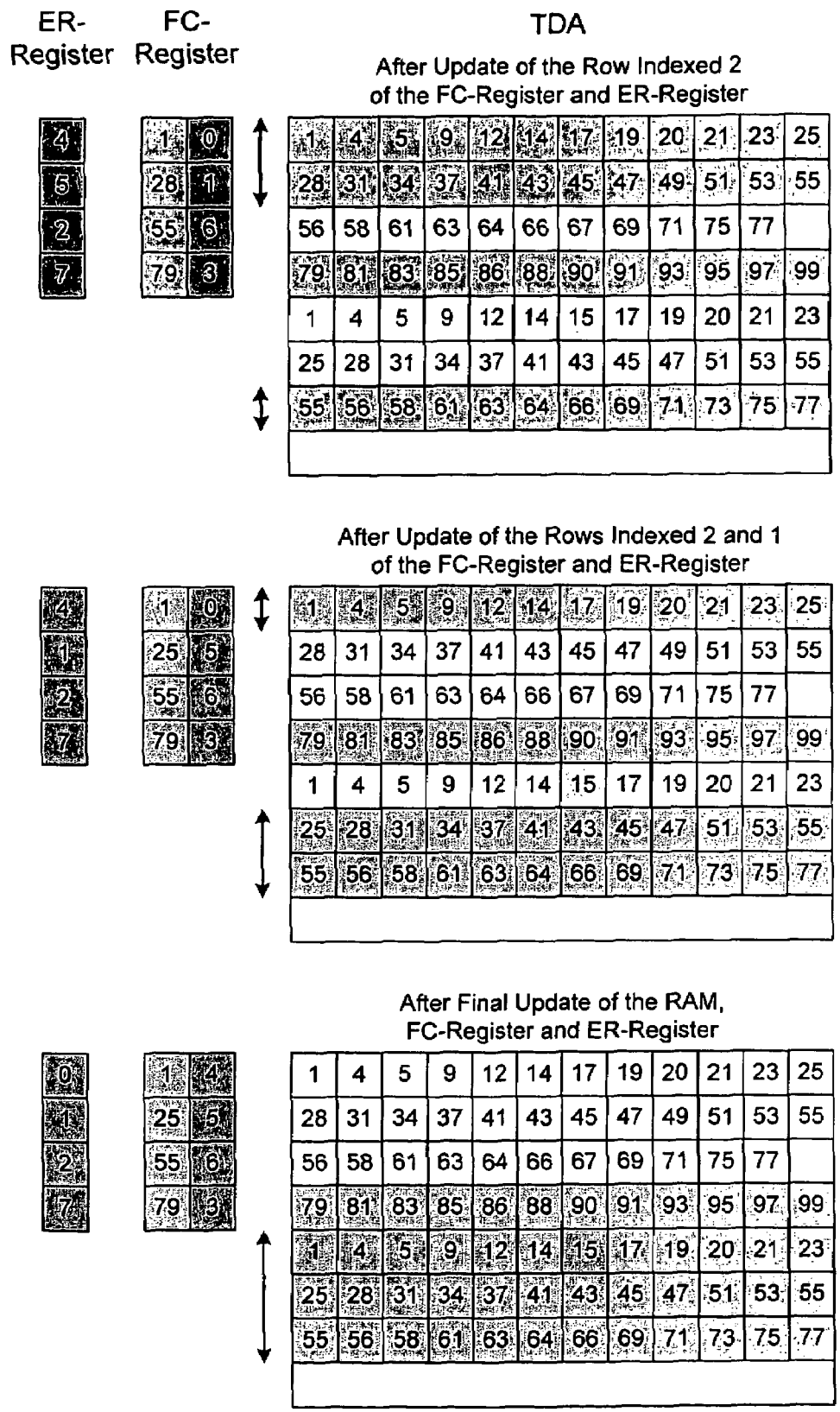

Then, the Key entries and row index entries in the FC-Register are updated in three steps (see FIG. 15b) in correspondence with the RAM first column entries starting from the RAM last row (and the row indexed 2 of the FC-Register) in descending order of the rearranged key values; this ensures that the FC-Register Row Index entry always points to the appropriate RAM row. The ER-Register entries can also be updated in the same order as the FC-Register. The two figures show the final updated condition of the three devices, where the Key entries in the RAM first three rows (indexed 0 to 2) are disregarded (not shaded). All the steps of Insert procedure take place during NOP cycles between the different operations of the search process.

Single-RAM Multi-Hierarchy Architecture

The concept of Multi-Hierarchy Architecture was presented in the U.S. patent application on Multi-RAM Binary CAM or RCAM (Ser. No. 10/206,189), where the first column of the FC-RAM was partitioned in increasingly smaller hierarchical blocks according to a numerical system of base B. A general hierachical structure consists of k hierarchical blocks, a $B^{k-1}$ Register and (k−1) RAMs, $B^{k-1}$ RAM to $B^0$ RAM. In the case of a single RAM, the FC-Register is similarly partitioned into k hierarchical blocks.

Figure 16:
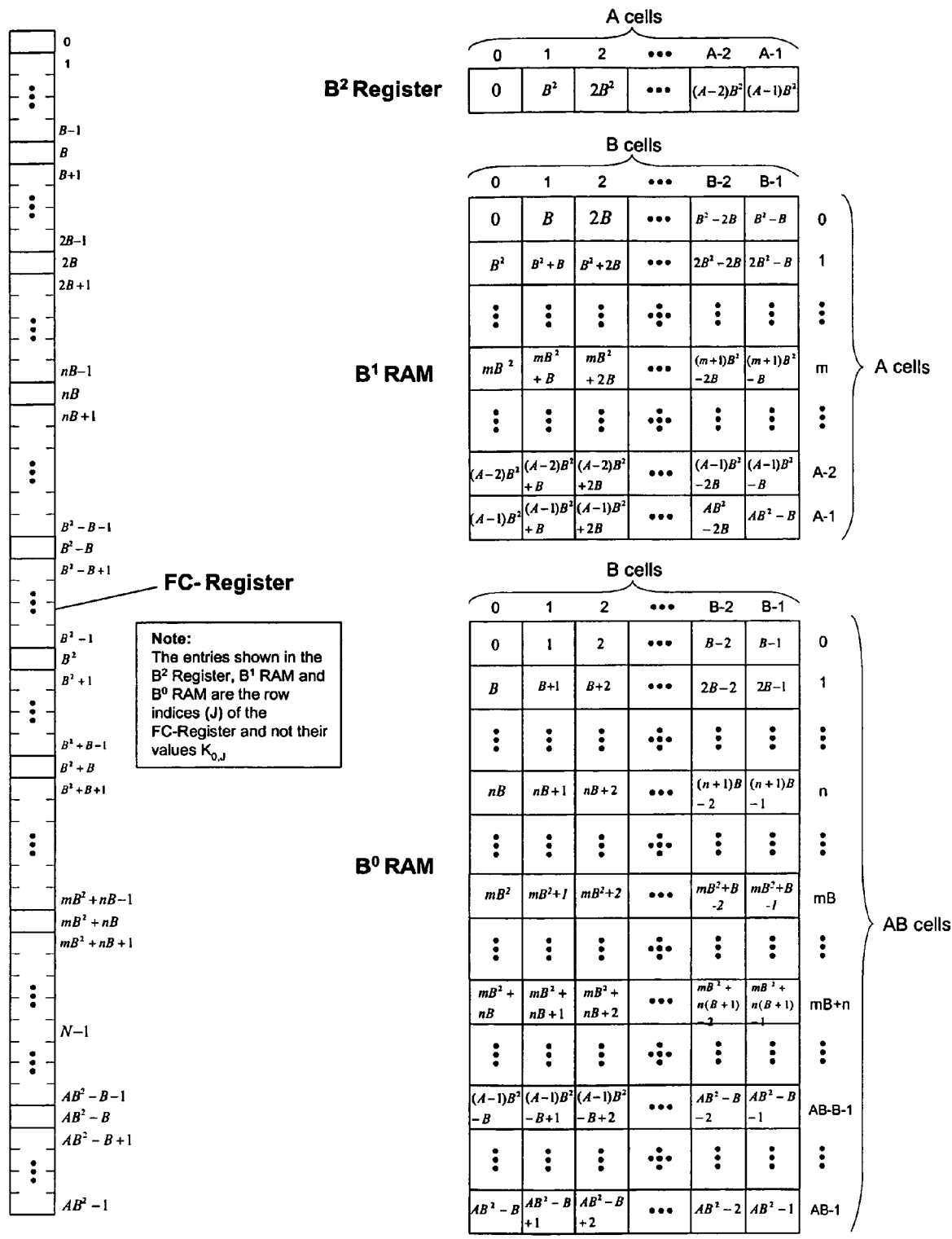
FIG. 16 shows an example of partitioning of the FC-Register into three hierarchical blocks, $B^2$ Register, $B^1$ RAM and $B^0$ RAM.

FIG. 16 shows an example of partitioning of the FC-Register into three hierarchical blocks, $B^2$ Register, $B^1$ RAM and $B^0$ RAM, similar to the partitioning of the FC-RAM first column presented in U.S. patent application Ser. No. 10/206, 189. The FC-Register contains $A \cdot B^2$ Key entries, where the number A is selected to meet the condition $A \cdot B^2 \geq N$, so that the three storing devices contain all the first column entries. If $A \cdot B^2 > N$, some of the last entries of the $B^0$ RAM remain empty. It should be noted that the entries shown in the $B^2$ Register, $B^1$ RAM and $B^0$ RAM in FIG. 16 are the row indices (J) of the FC-Register entries, and not their values $K_{0,J}$.

The partitioning process is performed in recursive mappings of a one-dimensional first column array into RAMs with the same entries. In the first step, the FC-Register first column is mapped into a RAM (denoted as $B^0$ RAM) with AB rows and B columns (see FIG. 16), so that all the entries whose row indices are multiples of B are arranged in its first column; $B^0$ RAM may be stored without its first column to save storage space. This first column is mapped into the next-hierarchy block (denoted as $B^1$ RAM) with A rows and B columns, so that all the entries whose row indices are multiples of $B^1$ are arranged in its first column. These first column entries are stored in the next-hierarchy block (highest-hierarchy block in this case), which is a one-dimensional register with A cells, denoted as $B^2$ Register.

Thus, the $B^2$ Register contains all the first column entries whose row indices are multiples of $B^2$, i.e., $K_{0,J}$, where $J=m \cdot B^2$, $0 \leq m \leq A-1$. The $B^1$ RAM has A rows and B columns, and stores all the entries whose row indices are multiples of B, i.e., $K_{0,J}$, where $J=n \cdot B$, $0 \leq n \leq A \cdot B-1$. The lowest-hierarchy block $B^0$ RAM stores all the entries of the FC-Register in A·B rows and B columns. As in the FC-Register, the last entries of the $B^2$ Register, $B^1$ RAM and $B^0$ RAM may remain empty.

In general, when the FC-Register first column is large and is partitioned in k hierarchical blocks, the serial search procedure consists of k+1 steps. The use of increasingly smaller hierarchical blocks speeds up the search steps but adds latency because it increases the number of steps in a serial search procedure; however, these k+1 steps can be performed in a pipelined procedure to achieve a high throughput.

A key search in the TDA starts with a search in the hierarchical blocks, specifically in the highest-hierarchy block, the $B^{k-1}$ Register, using a Row Locator to locate the largest Key entry that is smaller than (or equal to) the submitted key; this Key entry points to a specific row in the next-hierarchy block, the $B^{k-2}$ RAM. Then, the submitted key is searched in the specific row of this RAM using a Column Locator to locate the largest Key entry that is smaller than (or equal to) the submitted key; this points to a specific row in the $B^{k-3}$ RAM. Similar search procedures are then performed in the subsequent hierarchical blocks down to the $B^0$ RAM. The matching Key entry in this last RAM points to a specific FC-Register entry and TDA row.

In the 3-hierarchy example shown in FIG. 16, the key search starts with a search in the $B^2$ Register, to locate the largest Key entry that is smaller than (or equal to) the submitted key; this Key entry points to a specific row in the $B^1$ RAM. Then, the submitted key is searched in the specific row of this RAM to locate the largest Key entry that is smaller than (or equal to) the submitted key; this points to a specific row in the $B^0$ RAM. A similar search procedure is then performed in the $B^0$ RAM. The matching Key entry in this RAM points to a specific FC-Register entry and TDA row.

The search procedure in the TDA row is identical to that described for the single-hierarchy architecture, where the matching Key entry leads to a specific row in the TDA, and then, the submitted key is searched in this row to find an exact match (for a Binary CAM) or a range match (for an RCAM).

A key insertion or removal in the TDA starts with a search in the hierarchical blocks, following an identical procedure to that used for lookups, described above. This search points to a specific FC-Register entry and TDA row. Then, the search proceeds in this TDA row, to determine whether the key exactly matches a Key entry. In case of an exact match, the submitted key can be removed but not inserted; otherwise, the submitted key can be inserted after the largest Key entry that is smaller than this key.

Novel Single-RAM Multi-Hierarchy Architecture

The Single-RAM Multi-Hierarchy architecture of the present invention also consists of one TDA and k hierarchical blocks resulting from partitioning the FC-Register according to a numerical system of base B. However, in this design the Key entries in the hierarchical blocks are stored along with associated Row Index entries that point to the FC-Register entries; these row index pointers allow a flexible non-contiguous arrangement of the FC-Register and the TDA rows.

When Row Index entries are used, only the Key entries of the highest-hierarchy block, $B^{k-1}$ Register, requires listing in contiguous monotonic order. The rows of all the subsequent hierarchical blocks can be arranged in non-contiguous order. By means of the Row Index entries associated with its Key entries, the $B^{k-1}$ Register determines the row ordering of the subsequent block, the $B^{k-2}$ RAM, so that the rows of this block can be arranged in a non-contiguous order. Similarly, the Key entries of the $B^{k-2}$ RAM and the subsequent hierarchical blocks down to the $B^1$ RAM may be stored with associated Row Index entries pointing to the physical rows of the succeeding hierarchical blocks. This arrangement allows "independent" row ordering in each hierarchy. The Row Index entries of the $B^0$ RAM point to the FC-Register entries and the corresponding TDA rows. If, additionally, the FC-Register RAM has Row Index entries, then the TDA rows can be arranged in a flexible non-contiguous order.

Figure 17:
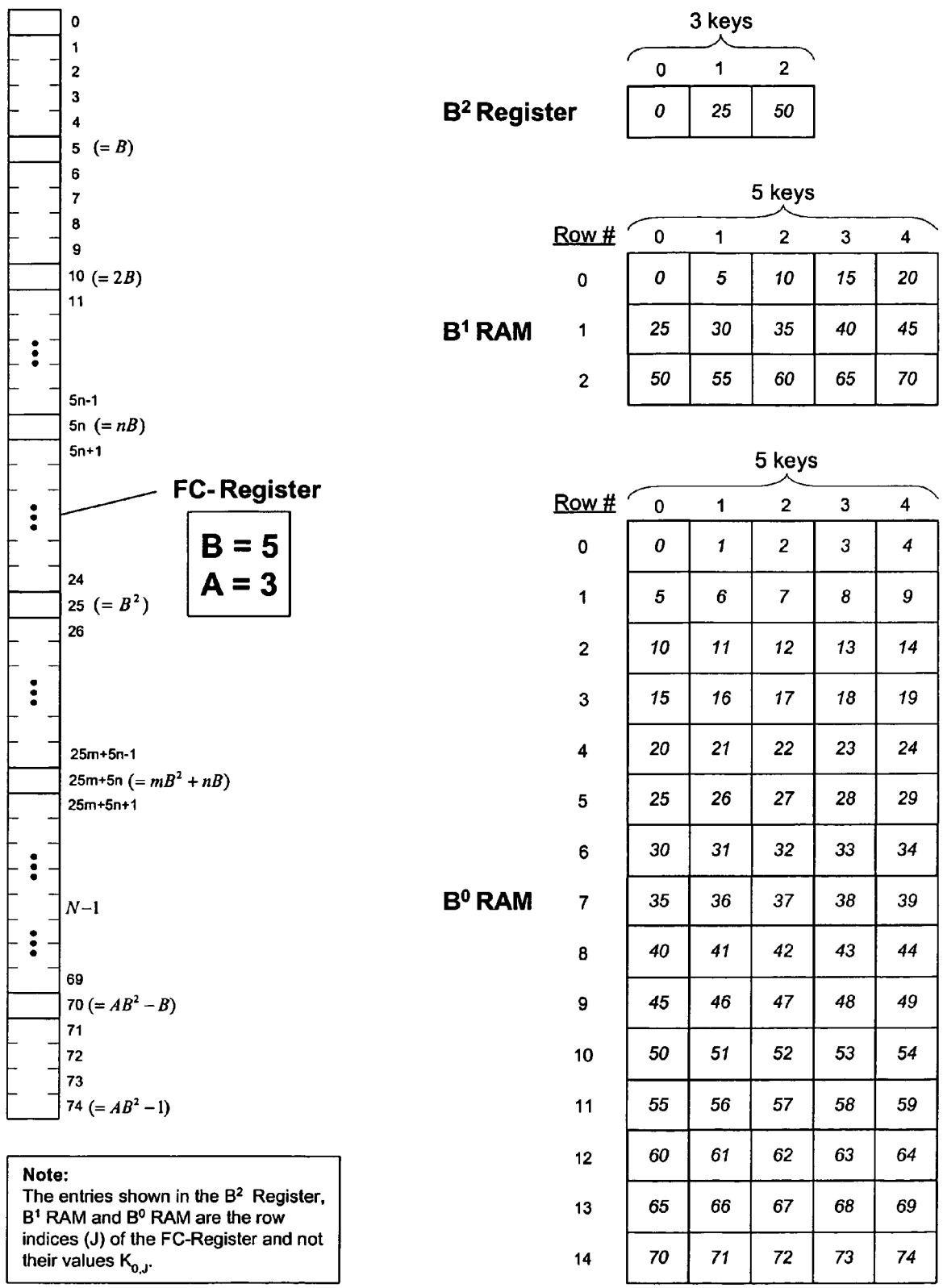
FIG. 17 shows a particular case of the example of the FC-Register partitioned into three hierarchical blocks, $B^2$ Register, $B^1$ RAM and $B^0$ RAM, depicted in FIG. 16; the FC-Register consists of 75 entries and the numerical base for the partition is 5 (B=5, A=3)

FIG. 17 shows a particular case of the example of the FC-Register partitioned into three hierarchical blocks, $B^2$ Register, $B^1$ RAM and $B^0$ RAM, depicted in FIG. 16. In this example, the FC-Register consists of 75 entries and the numerical base for the partition is 5 (B=5, A=3).

Figure 18:
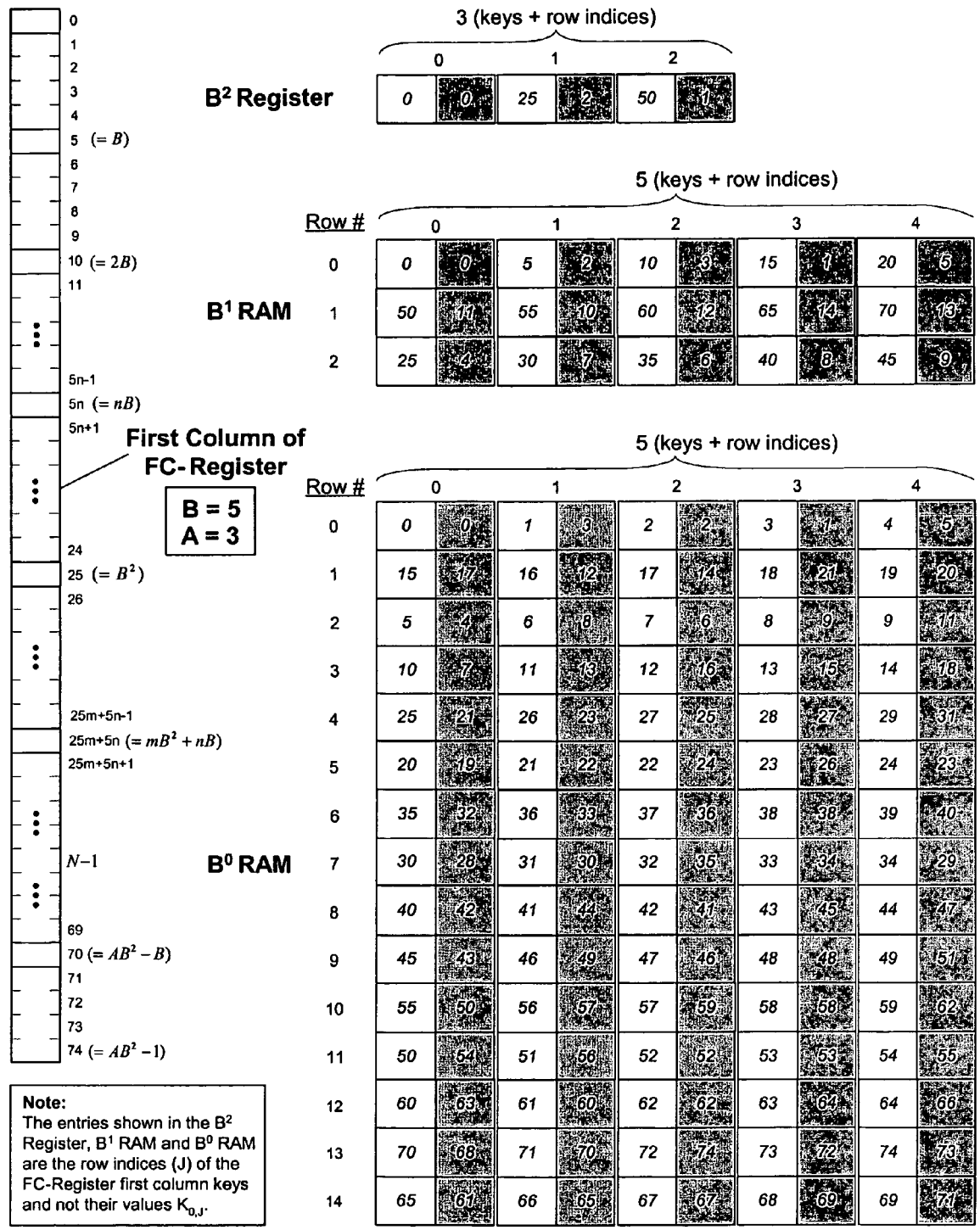
FIG. 18 shows a similar partitioning where the three hierarchical blocks have Row Index entries associated with their Key entries, allowing the rows of all the hierarchical blocks (except the highest-hierarchy $B^2$ Register) to be arranged in a flexible non-contiguous order.

FIG. 18 shows a similar partitioning where the three hierarchical blocks have Row Index entries associated with their Key entries, allowing the rows of all the hierarchical blocks (except the highest-hierarchy $B^2$ Register) to be arranged in a flexible non-contiguous order.

Multi-Hierarchy Search Procedure

A sequential search of the submitted key in a TDA is performed with an FC-Register. When the FC-Register is partitioned in k hierarchical blocks, the serial Search procedure consists of k+1 steps. The use of multiple increasingly smaller hierarchical blocks speeds up the search steps but adds latency because it increases the number of steps in a serial Search procedure; however, these k+1 steps can be performed in a pipelined procedure to achieve a high throughput.

Referring to the example with three hierarchical blocks, $B^2$ Register, $B^1$ RAM and $B^0$ RAM, shown in FIG. 18 for the FC-Register, a sequential search of the submitted key can be completed in four steps; all these steps, except the last one, are identical for Binary CAMs and RCAMs.

Step 1: Identification of the Key entry in $B^2$ Register after which the submitted key may be located by means of a Row Locator; the Row Index entry associated with the identified Key entry points to a specific physical row in the $B^1$ RAM.

Step 2: Access to the $B^1$ RAM row identified in Step 1 and identification of the Key entry after which the submitted key may be located (using a Column Locator); the Row Index entry associated with the identified Key entry points to a specific physical row in the $B^0$ RAM.

Step 3: Access to the $B^0$ RAM row identified in Step 2 and identification of the Key entry after which the submitted key may be located (using a Column Locator); the Row Index entry associated with the identified Key entry points to a specific FC-Register entry and TDA row.

Step 4: Access to the TDA row identified in Step 3 and lookup of the submitted key, to find an exact match (for a Binary CAM) or a range match (for an RCAM). This step is different for Binary CAMs and RCAMs, and is performed using similar Column Locators.

The four-step Key Search can be performed in sequence, requiring four clocks for execution, or in pipelined mode, which enables search result output at full clock rate.

Multi-Hierarchy Insert and Remove Operations

The insertion or removal (updating) of keys is required for keeping the Key entries of the TDA, the FC-Register and the k hierarchical blocks for the FC-Register in a sequence that is appropriate for performing fast lookups.

Prior to a key update operation, a search procedure determines the position where the submitted key is to be inserted or removed, provided that the update operation is allowed. Key insertion is allowed only if the key is not included in the TDA, whereas key removal is possible only if it is already included in the TDA. The preliminary search procedure consists of k+1 steps is identical for Single-RAM Binary CAMs and RCAMs. Referring to the example with three hierarchical blocks, $B^2$ Register, $B^1$ RAM and $B^0$ RAM, shown in FIG. 16 for the FC-Register, the preliminary search procedure of the submitted key can be completed in four steps.

The three maintenance algorithms disclosed for Single-RAM Architecture ("Fixed Row Size", "Split Row" and "Fixed Block Size") can be used in Multi-Hierarchy Architecture by applying the same principles of operation, i.e., flexible non-contiguous row ordering implemented with an FC-Register and k hierarchical blocks, each containing, along with the Key entries of the FC-Register, associated Row Index entries that point to the physical TDA rows. Only the highest-hierarchy block, $B^{k-1}$ Register, requires listing in contiguous monotonic order. Each change in the FC-Register during key insertion/removal requires updating of the k hierarchical blocks; the updates in these blocks may involve simple writes, or insertion/removal of register entries if entries are added or deleted in the FC-Register. The Insert and Remove operations in the three methods can be performed so that the Key entries are kept in cyclic monotonic order within individual rows.

Figure 20:
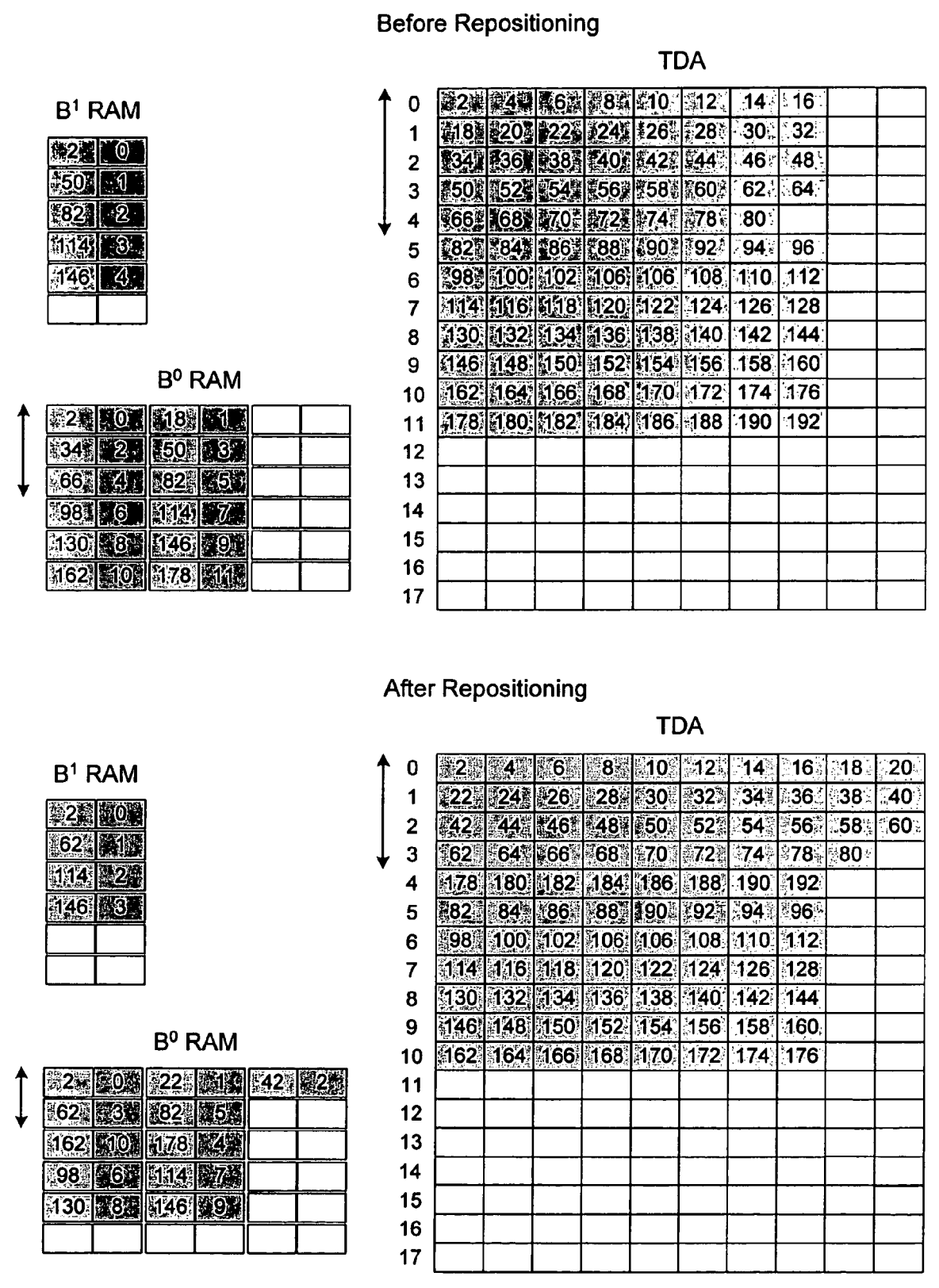

FIGS. 19 and 20 show examples of Insert and Remove operations in Multi-Hierarchy Architecture, which may be seen as extensions of the "Fixed Block Size" algorithms depicted in FIGS. 9 and 11, respectively, for Single-RAM Architecture, where the FC-Register and its hierarchical blocks contain Row Index entries.

FIG. 19 shows an example of a TDA and two hierarchical blocks in the process of inserting 13 in the first row; the figure shows the TDA and the hierarchical blocks immediately after the insertion, before and after repositioning of the entries. The number of entries per row in the TDA is reduced from a maximum of $M_{max}=M=10$ entries in $N_{min}=4$ rows to a minimum of $M_{min}=8$ entries in $N_{max}=5$ rows. The count of $N_{min}$ filled rows proceeds downwards. The capacity reduction factor is R=⅘ (80%). The use of Row Index entries in the $B^0$ RAM allows flexible row ordering in the TDA, so that the new row resulting from the reduction of the number of entries per row is stored at the end, minimizing the repositioning of the succeeding entries. Similarly, the number of entries per row in the $B^0$ RAM is reduced from a maximum of $M_{max}=M=3$ entries in $N_{min}=4$ rows to a minimum of $M_{min}=2$ entries in $N_{max}=5$ rows. The capacity reduction factor is in this case R=⅔ (66.7%). The use of Row Index entries in the $B^1$ RAM allows flexible row ordering in the $B^0$ RAM, so that the new row resulting from the reduction of the number of entries per row is stored at the end minimizing the shift of the succeeding entries.

FIG. 20 shows an example of a TDA and two hierarchical blocks in the process of removing the Key entry 76 from the fifth row; the figure shows the TDA and the hierarchical blocks immediately after the removal insertion, before and after repositioning of the entries. The number of entries per row in the TDA is increased from a minimum of $M_{min}=8$ entries in $N_{max}=5$ rows to a maximum of $M_{max}=M=10$ entries in $N_{min}=4$ rows. The count of $N_{max}$ rows proceeds downwards. The use of Row Index entries in the $B^0$ RAM allows flexible row ordering in the TDA; the last row is moved to occupy the row that becomes empty due to reduction of the number of rows, minimizing the shift of entries in the TDA without leaving intermediate empty rows. Similarly, the number of entries per row in the $B^0$ RAM is increased from a minimum of $M_{min}=2$ entries in $N_{max}=5$ rows to a maximum of $M_{max}=M=3$ entries in $N_{min}=4$ rows. The use of Row Index entries in the $B^1$ RAM allows flexible row ordering in the $B^0$ RAM; the last row is moved to occupy the intermediate empty row, minimizing the shift of entries in the TDA.

Multi-Hierarchy Row Repair

The repair of defective rows in a TDA can be extended to Multi-Hierarchy Architecture by pre-assigning redundant rows in the TDA, the FC-Register and the k hierarchical blocks, in a scheme similar to that used for Single-Hierarchy Architecture.

In the Multi-Hierarchy Architecture, the FC-Register is partitioned in k hierarchical blocks according to a numerical system of base B. Only the Key entries of the highest-hierarchy block ($B^{k-1}$ Register) require listing in contiguous monotonic order. The Key entries in the first columns of the subsequent (k−1) hierarchical RAMs are stored with associated Row Index entries. The rows of each of these subsequent hierarchical blocks can be arranged in non-contiguous order, determined by the Row Index entries of the preceding higher-hierarchy block. This arrangement allows "independent" row ordering in each hierarchy. The FC-Register entries and the TDA rows are arranged in a non-contiguous flexible order determined by the hierarchical RAMs.

If a defective row is detected in the TDA in the preliminary BIST, this row is not assigned a row index in the FC-Register; the row index list is redefined so it points instead to a redundant row. In this way, the defective row remains logically inexistent and the entries are stored in an alternative redundant row. Similarly, if a defective row is detected in any of the hierarchical RAMs in the preliminary BIST, this row is not assigned a row index in the preceding hierarchical RAM, and the row index list is redefined pointing instead to a redundant row so that the entries are stored in redundant rows.

The row repair in Single-RAM Multi-Hierarchy Architecture can be implemented with similar hardware as that used for a single RAM, i.e., a FIFO for storing the Row Index entries of the FC-Register corresponding to the numbers of the defective TDA rows detected in the BIST, and an Empty Row Counter for tracking and registering the number of the first empty row and the number of the new empty row to be filled with the lowest row number listed in the FIFO. If the row is operative (not defective), it is not listed in the FIFO; the row numbers registered in the counter and the FIFO do not match, the row is filled, the row number is registered in the Row Index list of the FC-Register, and the counter is advanced to the next empty row number. However, if the row is defective, the row numbers listed in the counter and the FIFO match, the defective row is by-passed, the row number is not registered in the Row Index list of the FC-Register, the counter is advanced, and the FIFO passes to the next empty row number. This hardware arrangement can be used for each hierarchical RAM of the FC-Register.

FIG. 21 shows an example of a TDA and two hierarchical blocks, where the TDA has two defective rows (fifth and tenth) and the $B^0$ RAM has one defective row. The Row Index entries in the $B^0$ RAM allow pointing solely to the operative TDA rows by-passing the defective rows. The fifth and tenth TDA rows are effectively disabled.

Multi-RAM Binary CAM and RCAM

The basic architectures, storage and search methods, and Insert and Remove operations for the Multi-RAM Binary CAM and RCAM are presented in U.S. patent application Ser. No. 10/206,189. A Multi-RAM Binary CAM or RCAM includes an ordered group of RAMs, where g denotes the serial number of the RAMs and G the total number ($0 \leq g \leq G-1$). This group is regarded as an "extended RAM" and denoted as "G-RAM".

The discussion herein is limited to the case in which the RAMs composing the G-RAM are lined in a row along the X-axis. The Key entries are stored in contiguous ascending order along the extended rows of the G-RAM and the key list starts at the lowest extended memory array address.

The extended RAM or G-RAM is composed of G·M columns by N rows with integrated key indexing. The extended rows are sequenced from top to bottom and indexed with an integer J, where $0 \leq J \leq N-1$. The columns are sequenced from left to right and indexed with an integer I, where $0 \leq I \leq G \cdot M-1$. A key located in column I and extended row J has an integer value $K_{I,J}$. The lowest key value $K_{0,0}$ resides in the extended row 0 and column 0. The highest key value $K_{U,V}$ resides in the extended row V and column U.

The Multi-RAM Binary CAM contains two extended RAMs or G-RAMs, a Key G-RAM and an Associated Data G-RAM. Each Key entry $K_{I,J}$ of the Key G-RAM has a corresponding Associated Data entry $D_{I,J}$ in the Associated Data G-RAM. Since the Binary CAM stores an ordered list of single integer keys, a key search in results in an exact match and a straightforward access to the corresponding associated data.

The Multi-RAM RCAM includes additionally an Associated Boundary Type G-RAM, where each Associated Boundary Type entry $M_{I,J}$ corresponds to the Key entry $K_{I,J}$. The RCAM stores a list of Key entries that represent range boundaries, so that a key search results in a matching range, and the retrieval of the associated data and boundary type that corresponds uniquely to this range. The associated boundary type determines the validity of the matching range and the associated data.

Single-Hierarchy Architecture

Figure 22:
FIG. 22 shows the first columns of the multiple RAMs composing the G-RAM can be arranged in sequential columns in an integrated First Column RAM (FC-RAM) of N rows and G columns.

The first columns of the multiple RAMs composing the G-RAM can be arranged in sequential columns in an integrated First Column RAM (FC-RAM) of N rows and G columns, as shown in FIG. 22. A generic column g of the FC-RAM contains the first column entries of RAM # g in the G-RAM. Thus, the first column of the FC-RAM contains the same entries as the first column of RAM #0. The rows of the FC-RAM list the first column entries with common indices of the multiple RAMs along a Z-axis.

A key search in the G-RAM starts with a search in the FC-RAM, using one Row Locator and one Column Locator, to locate the largest Key entry that is smaller than (or equal to) the submitted key, which points to a specific row of a specific RAM # g. Then, the submitted key is searched in this row of RAM # g, to find an exact match (for a Binary CAM) or a range match (for an RCAM).

A key insertion or removal in the G-RAM starts with a search in the FC-RAM, to locate the largest Key entry that is smaller than (or equal to) the submitted key, which points to a specific row in RAM # g. Then, the search proceeds in this row of RAM # g, to determine whether the key exactly matches a Key entry. In case of an exact match, the submitted key can be removed but not inserted; otherwise, the submitted key can be inserted after the largest Key entry that is smaller than this key.

An implementation that provides more efficient storage when the FC-RAM is used, omits all the Key entries in the first columns of the multiple RAMs (already included in the FC-RAM) from these RAMs, saving storage space of G·N cells. This scheme requires a corresponding arrangement in the Associated Data G-RAM and Associated Boundary Type G-RAM (for an RCAM), using FC-RAMs for these two G-RAMs, and omitting the Key entries already included in these FC-RAMs from the individual RAMs. The Search, Insert and Remove procedures must be adapted to suit these arrangements.

Multi-Hierarchy Architecture

The first column of the FC-RAM can be partitioned in increasingly smaller hierarchical blocks according to a numerical system of base B. A general hierarchical structure consists of k hierarchical blocks. FIG. 16 shows an example of partitioning in three hierarchical blocks: $B^2$ Register, $B^1$ RAM and $B^0$ RAM.

In general, when the first column of the FC-RAM is large and is partitioned in k hierarchical blocks, the serial Search procedure consists of k+2 steps. The use of multiple increasingly smaller hierarchical blocks speeds up the search steps but adds latency because it increases the number of steps in a serial Search procedure; however, these k+2 steps can be performed in a pipelined procedure to achieve a high throughput.

A key search in the G-RAM starts with a search in the hierarchical blocks, specifically in the highest-hierarchy block, the $B^{k-1}$ Register, using a Row Locator to locate the largest Key entry that is smaller than (or equal to) the submitted key; this Key entry points to a specific row in the next-hierarchy block, the $B^{k-2}$ RAM. Then, the submitted key is searched in the specific row of this RAM using a Column Locator to locate the largest Key entry that is smaller than (or equal to) the submitted key; this points to a specific row in the $B^{k-3}$ RAM. Similar search procedures are then performed in the subsequent hierarchical blocks down to the $B^0$ RAM. The matching Key entry in this last RAM points to a specific row in the FC-RAM.

In the 3-hierarchy example shown in FIG. 16, the key search starts with a search in the $B^2$ Register, to locate the largest Key entry that is smaller than (or equal to) the submitted key; this Key entry points to a specific row in the $B^1$ RAM. Then, the submitted key is searched in the specific row of this RAM to locate the largest Key entry that is smaller than (or equal to) the submitted key; this points to a specific row in the $B^0$ RAM. A similar search procedure is then performed in the $B^0$ RAM. The matching Key entry in this RAM points to a specific row in the FC-RAM.

The search procedure in the FC-RAM row is identical to that described for the single-hierarchy architecture, where the matching Key entry leads to a specific row in RAM # g; and then, the submitted key is searched in this row in RAM # g, to find an exact match (for a Binary CAM) or a range match (for an RCAM).

A key insertion or removal in the G-RAM starts with a search in the in the hierarchical blocks, following an identical procedure to that used for lookups, described above. This search points to a specific row in the FC-RAM. The search procedure in the FC-RAM leads to a specific row in RAM # g. Then, the search proceeds in this row of RAM # g, to determine whether the key exactly matches a Key entry. In case of an exact match, the submitted key can be removed but not inserted; otherwise, the submitted key can be inserted after the largest Key entry that is smaller than this key.

Novel Multi-RAM Architecture

The discussion herein refers to Multi-RAM Architecture and is limited to the case in which the RAMs composing the G-RAM are lined in a row along the X-axis. The G-RAM consists of G·M columns and N rows with integrated key indexing. The extended rows are sequenced from top to bottom and indexed with an integer J, where $0 \leq J \leq N-1$. The columns are sequenced from left to right and indexed with an integer I, where $0 \leq I \leq G \cdot M - 1$. The Key entries are stored in ascending order along the extended rows of the G-RAM, and the key list starts at the lowest extended memory array address.

Single-Hierarchy Architecture

In the Single-Hierarchy configuration, a key located in column I and extended row J has an integer value $K_{I,J}$. If the G-RAM cells are denoted as $C_{I,J}$, are indexed (I,J) and ordered according to their location in the G-RAM, then any $K_{I,J}$ is located in the cell $C_{I,J}$ with the same index. The Key entries in the first columns of the multiple RAMs composing the G-RAM can be arranged in sequential columns in an integrated FC-RAM having N rows and G columns, as shown in FIG. 22. The FC-RAM serves as a starting point for key search for lookup and maintenance purposes.

The new Single-Hierarchy architecture is also built around a G-RAM consisting of G·M columns and N rows. However, the G-RAM extended rows can be arranged in non-contiguous order.

The Key entries of the FC-RAM first column can be stored in contiguous monotonic order in an FC-Register along with associated Row Index entries that point to the physical FC-RAM rows in correspondence to the FC-Register Key entries. Then, the ordering of the physical G-RAM extended rows correspond to that of the non-contiguous physical FC-RAM rows. The FC-RAM Key entries may also have associated Row Index entries pointing to the physical rows of the individual RAMs of the G-RAM. These row index pointers allow a flexible arrangement of the physical rows of individual RAMs that are not in direct correspondence with the physical FC-RAM rows.

Single-Hierarchy Search Procedure

A sequential search of the submitted key in a G-RAM is performed with an FC-RAM and the associated FC-Register, and can be completed in three steps:

Step 1: Identification of the row in the FC-RAM corresponding to the G-RAM extended row where the submitted key may be located. The submitted key is compared with the FC-Register Key entries using a Row Locator to find a matching Key entry. The Row Index entry associated with this matching Key entry points to the physical FC-RAM row. This step is identical for Binary CAMs and RCAMs.

Step 2: Access to the physical row of the FC-RAM identified in Step 1 and identification of the Key entry after which the submitted key may be located (using a Column Locator); this Key entry points to a specific row in RAM # g where the submitted key may be located. This step is identical for Binary CAMs and RCAMs.

Step 3: Access to the specific row in RAM # g identified in Step 2 and lookup of the submitted key, to find an exact match (for a Binary CAM) or a range match (for an RCAM). This step is different for Binary CAMs and RCAMs, and is performed using similar Column Locators.

The three-step Key Search can be performed in sequence, requiring three clocks for execution, or in pipelined mode, that enables search result output at full clock rate.

Single-Hierarchy Insert and Remove Operations

The insertion or removal of keys is required for keeping the Key entries of the G-RAM, the FC-RAM and the FC-Register in a sequence that is appropriate for performing fast lookups.

Prior to a key update operation, a search procedure determines the position where the submitted key is to be inserted or removed, provided that the update operation is allowed. Key insertion is allowed only if the key is not included in the G-RAM, whereas key removal is possible only if it is already included in the G-RAM. The preliminary search procedure is identical for Multi-RAM Binary CAMs and RCAMs.

The Key entries of the FC-RAM first column are stored in contiguous monotonic order in an FC-Register along with associated Row Index entries that point to the physical FC-RAM rows.

The three maintenance algorithms disclosed for Single-RAM Architecture ("Fixed Row Size", "Split Row" and "Fixed Block Size") can be used in Multi-RAM Single-Hierarchy Architecture by applying the same principles of operation, i.e., flexible non-contiguous row ordering optionally implemented with an FC-Register; this register contains, along with the First Column Key entries of the FC-RAM, associated Row Index entries that point to the physical FC-RAM rows corresponding to the Key entries. Each change in the first column of the FC-RAM during a key insertion/removal in the multiple RAMs requires updating of the FC-Register, which may involve simple writes, or insertion/removal of register entries if rows are added or deleted in the FC-RAM.

The FC-RAM Key entries may also have associated Row Index entries pointing to the physical rows of the individual RAMs of the G-RAM. These row index pointers allow a flexible arrangement of the physical rows of individual RAMs that are not in direct correspondence with the physical FC-RAM rows. In this scheme, each change in the first column of each individual RAM during a key insertion/removal in the multiple RAMs requires updating of the FC-RAM, which may involve simple writes, or insertion/removal of register entries if rows are added or deleted in the individual RAMs.

Figure 23:
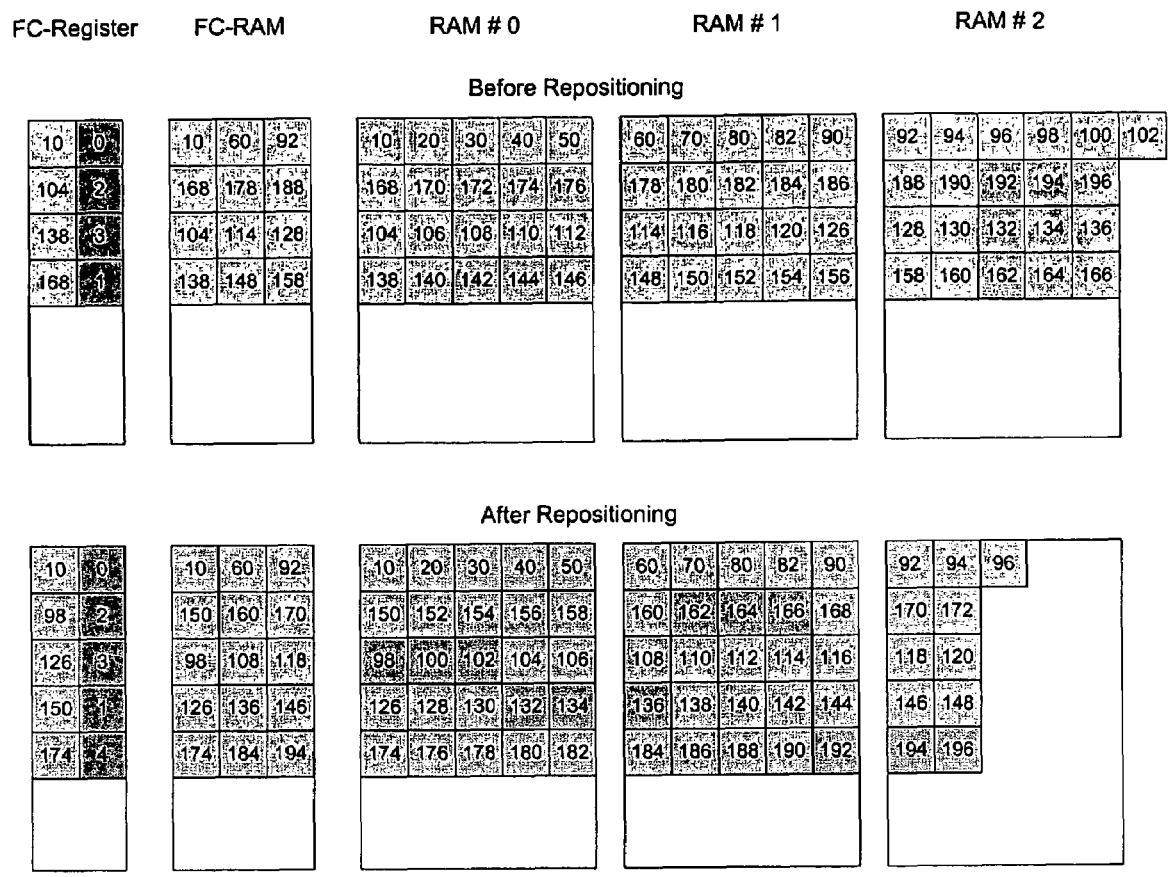
FIG. 23 shows an example of a G-RAM in the process of inserting a Key entry in the first extended row; the figure shows the G-RAM immediately after the insertion, before and after repositioning of the entries.
Figure 24:
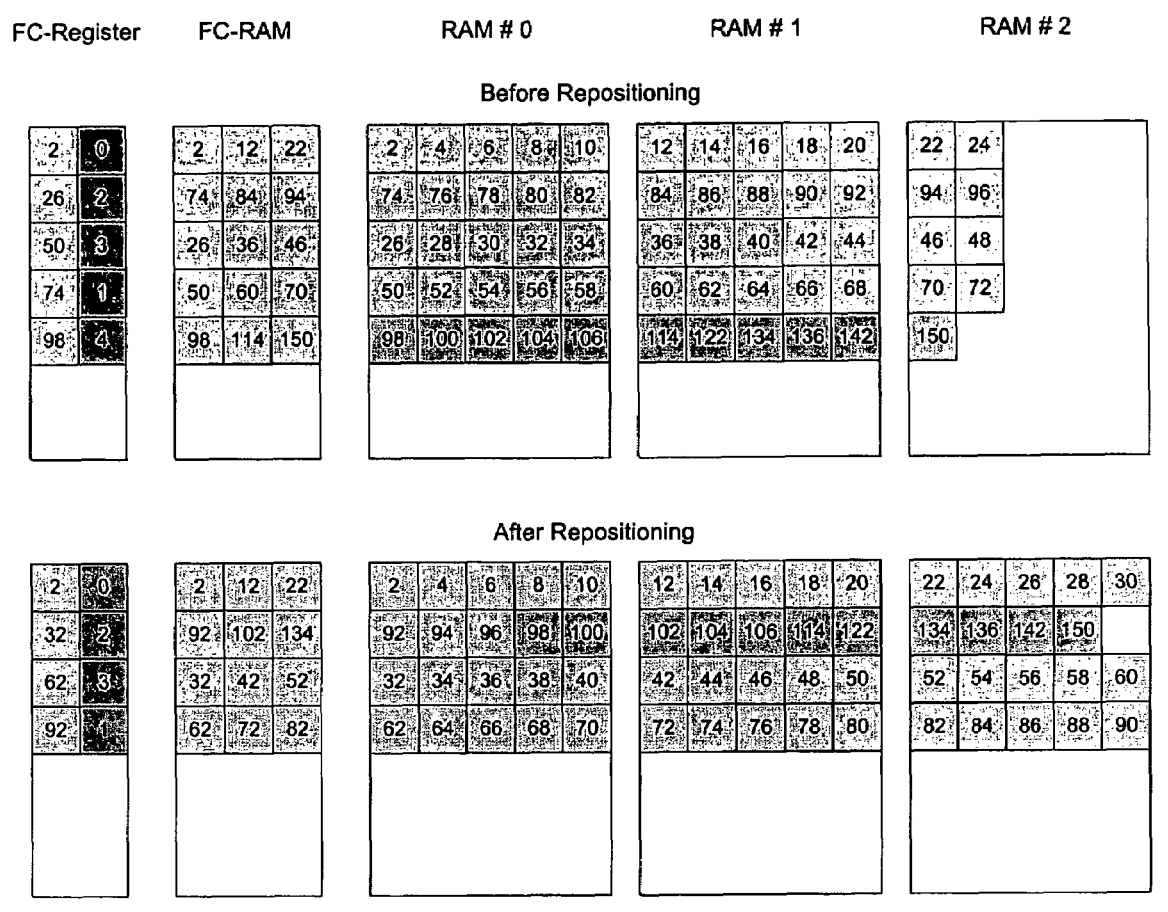

FIGS. 23 and 24 show examples of Insert and Remove operations in a G-RAM, which may be seen as extensions of the "Fixed Block Size" algorithms depicted in FIGS. 9 and 11, respectively, for Single-RAM Architecture where the FC-Register contains Row Index entries.

FIG. 23 shows an example of a G-RAM in the process of inserting a Key entry in the first extended row; the figure shows the G-RAM immediately after the insertion, before and after repositioning of the entries. The number of entries per extended row is reduced from a maximum of $M_{max}=M=15$ entries in $N_{min}=4$ rows to a minimum of $M_{min}=12$ entries in $N_{max}=5$ rows. The count of $N_{min}$ filled rows proceeds downwards. The capacity reduction factor is R=⅘ (80%). The G-RAM operates with an FC-RAM and an FC-Register whose Row Index entries point to the FC-RAM rows and to the G-RAM extended rows, which are arranged in non-contiguous order. The Key entries are kept in monotonic order within the individual extended rows.

FIG. 24 shows an example of a G-RAM in the process of removing a Key entry from the fifth extended row; the figure shows the G-RAM immediately after the removal, before and after repositioning of the entries. The number of entries per extended row is increased from a minimum of $M_{min}=12$ entries in $N_{max}=5$ rows to a maximum of $M_{max}=M=15$ entries in $N_{min}=4$ rows. The count of $N_{max}$ rows proceeds downwards. The Row Index entries of the FC-Register point to the FC-RAM rows and to the G-RAM extended rows, which are arranged in non-contiguous order. The Key entries are kept in monotonic order within the individual extended rows.

Figures 25, 26:
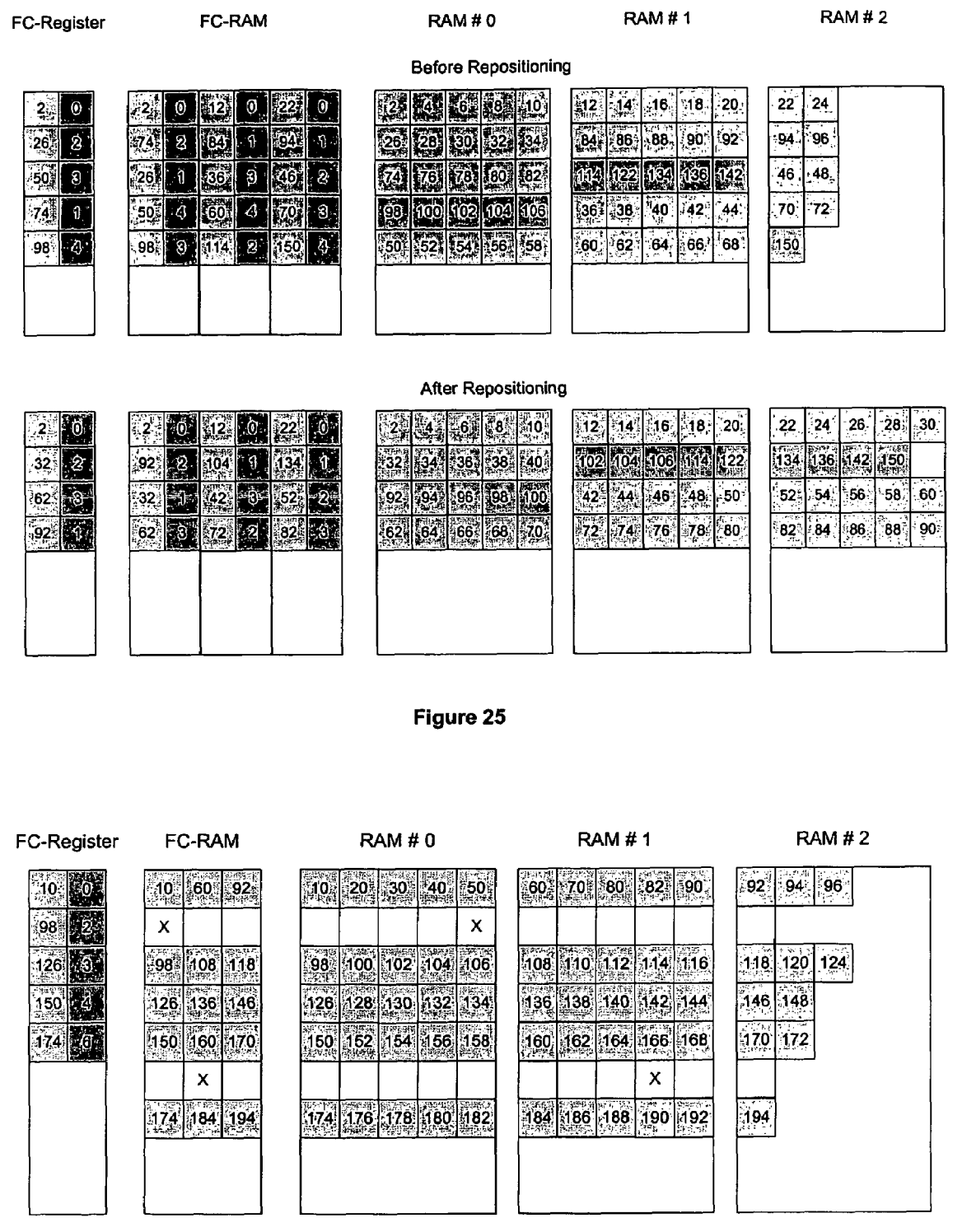

FIG. 25 shows an example of the G-RAM depicted in FIG. 24, but in this case, the FC-RAM Key entries have associated Row Index entries pointing to the physical rows of individual RAMs of the G-RAM, allowing a flexible arrangement of the physical rows of individual RAMs.

Single-Hierarchy Row Repair

Defective extended rows in a G-RAM can be "repaired" pre-assigning redundant extended rows in Multi-RAM configuration, in a scheme similar to that used for a single RAM.

In Multi-RAM configuration, an FC-Register stores the Key entries of the FC-RAM first column in contiguous monotonic order along with associated Row Index entries that point to the physical FC-RAM rows in correspondence to the FC-Register Key entries. Then, the ordering of the physical G-RAM extended rows correspond to that of the non-contiguous physical FC-RAM rows. The FC-RAM Key entries may also have associated Row Index entries pointing to the physical rows of the individual RAMs of the G-RAM. These row index pointers allow a flexible arrangement of the physical rows of individual RAMs.

If the FC-RAM does not have Row Index entries, then the row ordering of individual RAMs is common to the extended row ordering of the G-RAM, and is determined by Row Index entries of the FC-Register. Then, if a defective row is detected in any of the multiple RAMs in the preliminary BIST, this row is not assigned a row index in the FC-Register, which redefines the row index list so it points instead to a redundant row. In this way, the extended row of the G-RAM corresponding to the RAM row that is found to be defective is not assigned a row index in the FC-Register, so that it remains logically inexistent and the entries are stored in a redundant extended row. This scheme does not allow the use of operative (not defective) rows of individual RAMs if they share the same extended row with a defective row of another RAM.

The row repair in Multi-RAM Single-Hierarchy Architecture can be implemented with similar hardware as that used for a single RAM, i.e., a FIFO for storing the Row Index entries of the FC-Register corresponding to the numbers of the defective extended rows detected in the BIST, and an Empty Row Counter for tracking and registering the number of the first empty extended row and the number of the new empty extended row to be filled with the lowest row number listed in the FIFO. If the extended row is operative, it is not listed in the FIFO; the row numbers registered in the counter and the FIFO do not match, the row is filled, the row number is registered in the Row Index list of the FC-Register, and the counter is advanced to the next empty row number. However, if the extended row is defective, the row numbers listed in the counter and the FIFO match, the defective row is by-passed, the row number is not registered in the Row Index list of the FC-Register, the counter is advanced, and the FIFO passes to the next empty row number.

FIG. 26 shows an example of a G-RAM with two defective rows (second row in RAM #0 and sixth row in RAM #1). The Row Index entries of the FC-Register point only to the operative G-RAM extended rows by-passing the defective extended rows. The entire second and sixth extended rows of the G-RAM are disabled, including some operative rows of individual RAMs because they belong to these extended rows.

If the FC-RAM has Row Index entries pointing to the physical rows of the individual RAMs of the G-RAM, a flexible ordering of the physical rows of individual RAMs is allowed, which is different from that of the FC-RAM rows. Then, if a defective row is detected in any of the multiple RAMs, the number of this row must be replaced by the number of a redundant row in an individual RAM in the Row Index list of the FC-RAM. This scheme only disables the defective rows of individual RAMs, while allowing the use of operative rows of other RAMs, even if they share the same extended row with a defective row. It also allows the repair of defective rows in the FC-RAM, by pre-assigning redundant rows and redefining the Row Index list in the FC-Register so it points to these redundant rows instead of the defective rows.

The hardware used for row repair in this case must handle the Row Index entries of the FC-RAM, e.g., a FIFO for storing the Row Index entries of the FC-RAM corresponding to the numbers of the defective rows detected in the individual RAMs by the BIST, and an Empty Row Counter for tracking and registering the numbers of the first empty rows in the individual RAMs and the numbers of the new empty rows to be filled with the lowest row numbers listed in the FIFO. If a row is operative, it is not listed in the FIFO; the row numbers registered in the counter and the FIFO do not match, the row is filled, the row number is registered in the Row Index list of the FC-Register, and the counter is advanced to the next empty row number. However, if a row is defective, the row numbers listed in the counter and the FIFO match, the defective row is by-passed, the row number is not registered in the Row Index list of the FC-Register, the counter is advanced, and the FIFO passes to the next empty row number.

Figure 27:
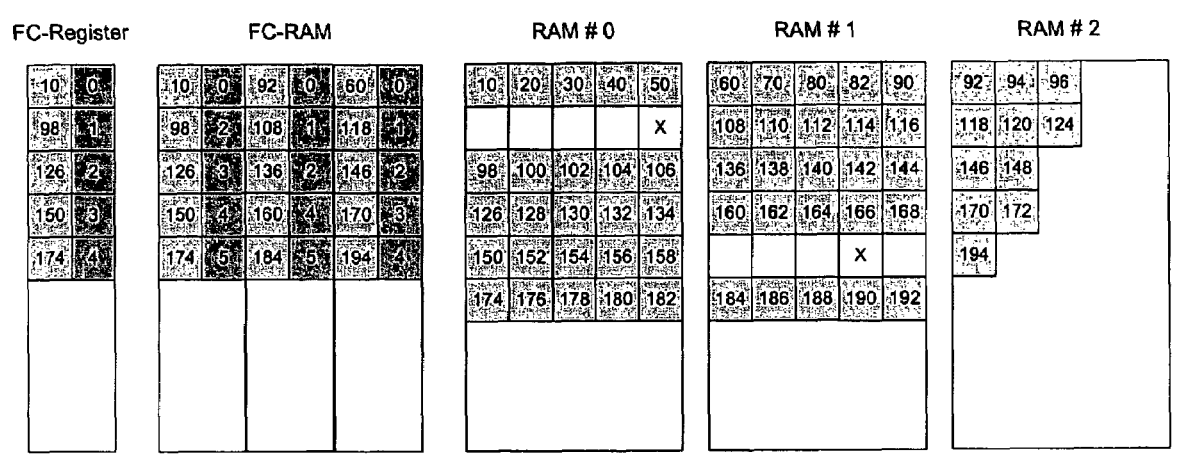

FIG. 27 shows an example of the same G-RAM with the same defective rows. However, in this case, the Row Index entries of the FC-RAM point only to the operative rows of the individual RAMs by-passing the defective rows. This scheme only disables the defective second row of RAM #0 and sixth row of RAM #1; all the other rows of individual RAMs can be used, even if they share the same extended row with a defective row.

Multi-Hierarchy Architecture

In Multi-Hierarchy configuration, the FC-Register is partitioned in hierarchical blocks according to a numerical system of base B. A general hierachical structure consists of k hierarchical blocks, a $B^{k-1}$ Register and (k–1) RAMs, $B^{k-2}$ RAM to $B^0$ RAM. FIG. 16 shows an example of partitioning in three hierarchical blocks, $B^2$ Register, $B^1$ RAM and $B^0$ RAM.

The new Multi-Hierarchy architecture also consists of G RAMs and k hierarchical blocks resulting from partitioning the FC-Register according to a numerical system of base B. However, in this design the Key entries in the hierarchical blocks are stored along with associated Row Index entries that point to the FC-RAM rows; these row index pointers allow a flexible non-contiguous arrangement of the FC-RAM rows and the extended G-RAM rows.

The FC-Register is partitioned into hierarchical blocks according to a numerical system of base B. A general hierarchical structure consists of k hierarchical blocks, a $B^{k-1}$ Register and (k–1) RAMs, $B^{k-2}$ RAM to $B^0$ RAM. Only the Key entries of the highest-hierarchy block, $B^{k-1}$ Register, require listing in contiguous monotonic order. The rows of all the subsequent hierarchical blocks can be arranged in non-contiguous order. By means of the Row Index entries associated with its Key entries, the $B_{k-1}$ Register determines the row ordering of the subsequent block, the $B^{k-2}$ RAM, so that the rows of this block can be arranged in a non-contiguous order.

Similarly, the Key entries of the $B^{k-2}$ RAM and the subsequent hierarchical blocks down to the $B^1$ RAM are stored with associated Row Index entries pointing to the physical rows of the succeeding hierarchical blocks. This arrangement allows "independent" row ordering in each hierarchy. The Row Index entries of the $B^0$ RAM point to the physical FC-RAM rows and the corresponding extended G-RAM rows. If, additionally, the FC-RAM has Row Index entries, then the rows of the individual RAMs can be arranged in a flexible non-contiguous order.

Multi-Hierarchy Search Procedure

A sequential search of the submitted key in a G-RAM is performed with an FC-RAM and the associated FC-Register. When the FC-Register is large and is partitioned in k hierarchical blocks, the serial Search procedure consists of k+2 steps. The increasing number of hierarchical blocks speeds up the search steps but adds latency because it increases the number of steps in a serial Search procedure; however, these k+2 steps can be performed in a pipelined procedure to achieve a high throughput.

Referring to the example with three hierarchical blocks, $B^2$ Register, $B^1$ RAM and $B^0$ RAM, shown in FIG. 16 for the FC-Register, a sequential search of the submitted key can be completed in five steps; all these steps, except the last one, are identical for Binary CAMs and RCAMs.

Step 1: Identification of the Key entry in $B^2$ Register after which the submitted key may be located by means of a Row Locator; the Row Index entry associated with the identified Key entry points to a specific physical row in the $B^1$ RAM.

Step 2: Access to the $B^1$ RAM row identified in Step 1 and identification of the Key entry after which the submitted key may be located (using a Column Locator); the Row Index entry associated with the identified Key entry points to a specific physical row in the $B^0$ RAM.

Step 3: Access to the $B^0$ RAM row identified in Step 2 and identification of the Key entry after which the submitted key may be located (using a Column Locator); the Row Index entry associated with the identified Key entry points to a specific physical row in the FC-Register and the FC-RAM.

Step 4: Access to the row of the FC-RAM identified in Step 3 and identification of the Key entry after which the submitted key may be located (using a Column Locator); the Row Index entry associated with this Key entry points to a specific row in RAM # g.

Step 5: Access to the specific row in RAM # g identified in Step 4 and lookup of the submitted key, to find an exact match (for a Binary CAM) or a range match (for an RCAM). This step is different for Binary CAMs and RCAMs, and is performed using similar Column Locators.

The five-step Key Search can be performed in sequence, requiring five clocks for execution, or in pipelined mode, which enables search result output at full clock rate.

Multi-Hierarchy Insert and Remove Operations

The insertion or removal of keys is required for keeping the Key entries of the G-RAM, the FC-RAM, the FC-Register and the k hierarchical blocks for the FC-Register in a sequence that is appropriate for performing fast lookups.

Prior to key update operation, a search procedure determines the position where the submitted key is to be inserted or removed, provided that the update operation is allowed. Key insertion is allowed only if the key is not included in the G-RAM, whereas key removal is possible only if it is already included in the G-RAM. The preliminary search procedure consists of k+2 steps is identical for Multi-RAM Binary CAMs and RCAMs. Referring to the example with three hierarchical blocks, $B^2$ Register, $B^1$ RAM and $B^0$ RAM, shown in FIG. 16 for the FC-Register, the preliminary search procedure of the submitted key can be completed in five steps.

The three maintenance algorithms disclosed for Single-RAM Architecture ("Fixed Row Size", "Split Row" and "Fixed Block Size") can be used in Multi-RAM Multi-Hierarchy Architecture by applying the same principles of operation, i.e., flexible non-contiguous row ordering optionally implemented with an FC-RAM, an FC-Register and k hierarchical blocks, each containing, along with the Key entries of the FC-Register, associated Row Index entries that point to the physical FC-RAM rows corresponding to the Key entries. Only the highest-hierarchy block, $B^{k-1}$ Register, requires listing in contiguous monotonic order. Each change in the FC-Register during key insertion/removal requires updating of the k hierarchical blocks; these changes may involve simple writes, or insertion/removal of register entries if entries are added or deleted in the FC-Register.

Multi-Hierarchy Row Repair

The defective extended rows in a G-RAM in Multi-Hierarchy Architecture can be "repaired" by pre-assigning redundant extended rows as in Single-Hierarchy Architecture.

In the Multi-Hierarchy Architecture, the FC-Register associated with the FC-RAM is partitioned in k hierarchical blocks according to a numerical system of base B. Only the Key entries of the highest-hierarchy block ($B^{k-1}$ Register) require listing in contiguous monotonic order. The Key entries in the first columns of the subsequent (k−1) hierarchical RAMs are stored with associated Row Index entries. The rows of each of these subsequent hierarchical blocks can be arranged in non-contiguous order, determined by the Row Index entries of the preceding higher-hierarchy block. This arrangement allows "independent" row ordering in each hierarchy.

The FC-RAM rows are stored in an order determined by the hierarchical RAMs. Thus, the ordering of the G-RAM extended rows correspond to that of the non-contiguous FC-RAM rows; then, flexible row ordering of individual RAMs is not possible. The FC-RAM Key entries may also have associated Row Index entries pointing to the physical rows of the individual RAMs of the G-RAM. These row index pointers allow a flexible arrangement of the physical rows of individual RAMs.

If a defective row is detected in any of the multiple RAMs in the preliminary BIST, and the row ordering of individual RAMs is common to the extended row ordering of the G-RAM (the FC-RAM does not have Row Index entries), then this row is not assigned a row index in the FC-Register; the row index list is redefined so it points instead to a redundant row. Thus, this row remains logically inexistent and is disabled together with the corresponding rows of all the other RAMs sharing the same extended row.

If the FC-RAM has Row Index entries pointing to the physical rows of the individual RAMs of the G-RAM, a flexible ordering of the physical rows of individual RAMs is allowed. Then, if a defective row is detected in any of the multiple RAMs, only this row is disabled and not the entire extended row.

Similarly, if a defective row is detected in any of the hierarchical RAMs in the preliminary BIST, then this row is not assigned a row index in the preceding RAM; the row index list in this RAM is redefined so it points instead to a redundant row. In this way, the rows of any RAM that are found to be defective are not assigned a row index in the preceding RAM, so that they remain logically inexistent and the entries are stored in alternative redundant rows.

As used herein in the specification and in the claims section that follows, the term "row" refers to a first line of cells in an array, and the term "column" refers to a second line of cells in an array, the second line of cells being disposed in perpendicular fashion to the first line of cells. For the sake of convenience, all rows are horizontal in the Figures provided herein, and all the columns are vertical.

As used herein in the specification and in the claims section that follows, the term "monotonic order" and the like refers to a row (or column) in an array in which the key entries are in ascending order or in descending order. This can be achieved in various ways, as demonstrated hereinabove. The term "monotonic order" specifically includes rows having a cyclic monotonic order.

As used herein in the specification and in the claims section that follows, the term "cyclic monotonic order" refers to a specific case of monotonic order in which ascending or descending order is maintained within a row (or column), but the lowest value entry is not positioned at the beginning of a row; the monotonic order is kept starting at the lowest value entry position (designated "cyclic position") and ending at the highest value entry, which is located in a position preceding the lowest value entry, e.g., 9, 15, 69, 81, 2, 4, 7, or 23, 105, 222, 611, 8, 14. When a cyclic monotonic order is maintained within a row, a Column Index entry may be used to indicate the position of the lowest value entry in the row.

As used herein in the specification and in the claims section that follows, the term "update operation" refers to an insertion of an entry into an array (such as a TDA) or the removal of an entry from the array. If an update operation is performed on a higher hierarchical block of an array (such as a First Column Register for a TDA), such an update operation may involve an insertion, a removal, or a change of value of an entry by a simple write operation.

As used herein in the specification and in the claims section that follows, the term "update position" refers to the position where the submitted key is to be inserted into an array, in the case of an insertion, or to the position where the submitted key is to be removed from an array, in the case of a removal.

As used herein in the specification and in the claims section that follows, the term "threshold fill limit" refers to an upper fill limit for a particular insert operation, the upper fill limit being a function of a dynamic average number of entries per row, designated $M_{avg}$, or an integral part of this dynamic average, Int $[M_{avg}]$, achieved by truncation or by rounding up, or other functions of $M_{avg}$.

As used herein in the specification and in the claims section that follows, the term "operation priority" refers to a specified hierarchy of priorities among operations, in which search (lookup) operations are typically assigned the highest priority, followed by update operations (insertions/removals), which are performed only when lookups do not take place, and in which key reordering operations, which may include key shifting within one or more rows of an array, key repositioning in different rows, etc., are assigned the lowest priority and are performed only when lookup update operations are not performed. This hierarchy of operation priorities ensures non-blocking (unimpeded) search operation.

As used herein in the specification and in the claims section that follows, the term "foreground operation" refers to an operation having one of the two higher priorities, i.e., a lookup operation or an update operation, which is subject to the hierarchy of priorities specified above. Depending on the specific maintenance algorithm being used, key shifting required to maintain a monotonic order in the array of key entries during an update operation may also be considered as a foreground operation.

As used herein in the specification and in the claims section that follows, the term "background operation" refers to key reordering operations, which are assigned a relatively low priority and are performed only during no-operation (NOP) cycles or intervals between lookup or update operations.

As used herein in the specification and in the claims section that follows, the term "maintenance interleaved with a search operation" refers to the performance of at least one maintenance operation in the midst of search operations (having a higher priority) by means of key update and reordering procedures designed to maintain the database always "fully operational" for search operation, such that the portion or rows of the database where the search operation takes place is updated and the search procedure yields a correct result, in accordance with last update.

As used herein in the specification and in the claims section that follows, the term "row block" refers to a designated set of rows in which an update operation is to be performed, each row in the block having a number of entries ranging from a maximum $M_{max}$ to a minimum $M_{min}$. Preferably, the row block also has a specified length (i.e., number of rows) ranging between a minimum $N_{min}$ and a maximum $N_{max}$. When $M_{max}$ is exceeded during an insertion or $M_{min}$ is exceeded during a removal in any of the rows within the row block, the key entries within the row block are rearranged without changing the total number (B) of entries in the block (the number being counted before the insertion or removal).

The row block is dynamic (i.e., not fixed to a particular row or group of rows) and is determined for each operation by a preceding search procedure that identifies the update position.

As used herein in the specification and in the claims section that follows, the term "portion", with respect to a row block in an array, refers to a fraction less than 0.5, the fraction being defined either in terms of rows or key entries. In terms of rows, the fraction is defined as:

$$\rho_{block}/\Sigma_\rho$$

wherein $\rho_{block}$ is the number of rows in the row block, and $\Sigma_\rho$ is the total number of rows containing key entries in the array having the row block. In terms of key entries, the fraction is defined as:

$$\pi_{block}/\Sigma$$

wherein $\pi_{block}$ is the number of key entries in the row block, and $\Sigma$ is the total number of key entries in the array having the row block. Typically, the fraction is less than 0.25, more typically, less than 0.1, and most typically, less than 0.01.

As used herein in the specification and in the claims section that follows, the term "average", with respect to a number of key entries ($\pi_{avg}$) or a number of rows ($\rho_{avg}$) undergoing rearrangement in an array, refers to a statistical average, assuming that the insertion and removal of key entries in the array are substantially random, that the update points for insertion and removal fraction are also substantially random, and that all key entries after the update point are shifted. In such a system, the ratios $\pi_{avg}/\Sigma$ and $\rho_{avg}/\Sigma_\rho$ ($\Sigma$ and $\Sigma_\rho$ being defined hereinabove) equal 0.5.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, and in particular, U.S. patent application Ser. Nos. 10/206,189, 10/229,054, 10/229,065 and 10/688,986, are herein incorporated in their entirety by reference into the specification, to the same extent as if each individual publication, patent or patent application was specifically and individually indicated to be incorporated herein by reference.

In addition, citation or identification of any reference in this application shall not be construed as an admission that such reference is available as prior art to the present invention.

What is claimed is:

1. A computer-implemented method for flexibly storing data in a database so as to allow facile and efficient updating and maintenance of the database, the method comprising the steps of:
   (a) providing a computer-implemented memory including at least a first array having at least two dimensions, said first array having rows and columns, said first array to store a first plurality of key entries;
   (b) arranging said key entries, using a processor, within each of said rows in a monotonic order to produce the database, the database storing said key entries in said monotonic order;
   (c) providing at least a second array, within said memory, to store a second plurality of key entries having rows and at least one column, wherein said first array and said second array form a hierarchical structure, wherein said second plurality of key entries in said second array represents a higher level of said hierarchical structure with respect to said first plurality of key entries;
   (d) identifying an update position within said hierarchical structure, using said processor, to perform a database update operation in said database, and
   (e) performing, using said processor, said database update operation, which includes a rearrangement of a portion of said first plurality of key entries, to produce an updated database in which said key entries within said first array are arranged in said monotonic order, said portion defined by $$\pi_{avg}/\Sigma$$

wherein:
$\pi_{avg}$ is an average number of said key entries undergoing rearrangement, and
$\Sigma$ is a total number of key entries in said first plurality of key entries,
and wherein a ratio defined by $\pi_{avg}/\Sigma$ is less than 0.25.

2. The method of claim 1, wherein said identifying an update position includes identifying a single row among said rows of said first array as a sole row containing said update position.

3. The method of claim 1, wherein said ratio is less than 0.10.

4. The method of claim 1, wherein said ratio is less than 0.05.

5. The method of claim 1, wherein said ratio is less than 0.01.

6. The method of claim 1, wherein said monotonic order includes a cyclic monotonic order.

7. The method of claim 1, wherein said key entries representing said higher level of said hierarchical structure are stored in a column register.

8. The method of claim 1, wherein said database update operation is performed solely between lookups.

9. The method of claim 1, wherein:
$\rho_{avg}$ is an average number of rows in said first array in which said rearrangement transpires;
$\Sigma_\rho$ is a total number of rows containing said first plurality of key entries,
and wherein a row ratio defined by $\rho_{avg}/\Sigma_\rho$ is less than 0.25.

10. The method of claim 9, wherein said row ratio is less than 0.10.

11. The method of claim 9, wherein said row ratio is less than 0.01.

12. A computer-implemented method for flexibly storing data in a database so as to allow facile and efficient updating and maintenance of the database, the method comprising the steps of:
   (a) providing a computer-implemented memory including at least a first array having at least two dimensions, said first array having rows and columns, said first array to store a first plurality of key entries;
   (b) arranging said key entries, using a processor, within each of said rows in a monotonic order to produce the database, the database storing said key entries in said monotonic order;
   (c) providing, within said memory:
      at least a second array to store a second plurality of key entries having rows and at least one column, wherein said first array and said second array form a hierarchical structure, wherein said second plurality of key entries in said second array represents a higher level of said hierarchical structure with respect to said first plurality of key entries;
      and at least an additional array containing a plurality of position information entries adapted to indicate a row index to associate a row within said first array with a key entry of said second plurality of key entries;
   (d) identifying an update position within said hierarchical structure, using said processor, to perform a database update operation, and
   (e) performing, using said processor, said database update operation, which includes a rearrangement of a portion of said first plurality of key entries, to produce an updated database in which said key entries within said first array are arranged in said monotonic order.

13. The method of claim 12, further comprising the step of:
   (f) providing a third array to store a third plurality of key entries, said third array belonging to said hierarchical structure, wherein said third plurality of key entries represents a higher level of said hierarchical structure with respect to said second plurality of key entries.

14. The method of claim 12, wherein said first array contains at least one empty row devoid of said first plurality of key entries, and wherein a threshold fill limit is defined for said key entries within said rows of said first array, and wherein when a particular row of said rows exceeds said threshold fill limit, a portion of said key entries in said particular row are moved to said empty row, wherein said particular row conforms to said threshold fill limit, while maintaining said monotonic order within said rows of said first array.

15. The method of claim 14, further including an array containing a plurality of position information entries, each of said position information entries adapted to indicate a row index of a currently-empty row within said first array.

16. The method of claim 14, wherein said threshold fill limit is a function of said total number of key entries in said first plurality of key entries and a number of rows in said first array.

17. The method of claim 14, wherein said threshold fill limit is a function of said total number of key entries in said first plurality of key entries and a number of rows containing said first plurality of key entries.

18. The method of claim 12, wherein said rearrangement is performed by repositioning at least some of said portion of said first plurality of key entries in at least one row of said rows of said first array, said at least one row being at least partially-filled with at least one of said key entries prior to said rearrangement.

19. The method of claim 14, wherein said repositioning is performed wherein said monotonic order within said rows includes a cyclic monotonic order.

20. The method of claim 14, wherein said rearrangement is performed in a background operation.

21. The method of claim 12, wherein at least two of said position information entries contain an identical row index.

22. The method of claim 12, wherein said monotonic order includes a cyclic monotonic order.

23. The method of claim 12, further comprising the step of:
(f) indicating row indices of a plurality of currently-empty rows within said first array using a second plurality of position information entries.

24. The method of claim 23, wherein said currently-empty rows within said first array are solely operative empty rows, wherein any defective row is unmarked by said second plurality of position information entries.

25. The method of claim 12, wherein each of said rows in said first array contains a pre-determined maximum number of cells $M_{max}$ filled by key entries of said first plurality of key entries.

26. The method of claim 12, wherein each of said rows in said first array contains a pre-determined minimum number of cells $M_{min}$ filled by key entries of said first plurality of key entries.

27. The method of claim 12, further comprising the step of:
(f) defining, from a portion of said rows in said first array, a row block containing a plurality of said rows in said first array, each row within said row block containing a pre-determined minimum number of cells $M_{min}$ filled by key entries of said first plurality of key entries, and a pre-determined maximum number of cells $M_{max}$ filled by key entries of said first plurality of key entries.

28. The method of claim 27, wherein said row block contains a pre-determined minimum number of rows $N_{min}$, and a pre-determined maximum number of rows $N_{max}$.

29. The method of claim 28, wherein:
$\rho_{block}$ is a number of rows in said row block in which said rearrangement transpires;
$\Sigma_\rho$ is a total number of rows containing said first plurality of key entries,
and wherein a row ratio defined by $\rho_{block}/\Sigma_\rho$ is less than 0.25.

30. The method of claim 29, wherein said row ratio is less than 0.10.

31. The method of claim 29, wherein said row ratio is less than 0.01.

32. The method of claim 29, wherein said performing said database update operation includes inserting at least one key entry into said row block, and wherein said rearrangement transpires solely within said row block.

33. The method of claim 29, wherein said performing said database update operation includes inserting at least one key entry into said row block, and wherein said rearrangement transpires solely within said row block, wherein key entries of said first array and disposed outside of said row block remain in place.

34. The method of claim 29, wherein said performing said database update operation includes inserting at least one key entry into said row block, and wherein, when all key-entry containing rows in said row block reach $M_{max}$, said rearrangement transpires wherein at least one new row within said row block is used for key entries moved from another row within said row block.

35. The method of claim 34, wherein when all key-entry containing rows in said row block reach $M_{max}$, said rearrangement transpires wherein said row block contains $N_{max}$ rows containing key entries from said row block.

36. The method of claim 27, wherein said performing said database update operation includes removing at least one key entry from said row block, wherein, when all key-entry containing rows in said row block are reduced to a value of $M_{min}$, said rearrangement transpires wherein at least one row in said row block becomes empty with respect to said key entries in said first array.

37. The method of claim 36, wherein when all key-entry containing rows in said particular row block are reduced to a value of $M_{min}$, said rearrangement transpires wherein said row block contains $N_{min}$ rows containing key entries from said row block.

38. The method of claim 12, further comprising the step of:
(f) specifying, within a given portion of a total key entry storage capacity in said first array, a pre-determined worst-case minimum rate for a rate selected from the group consisting of lookup rate, update rate, and a combination of lookup rate and update rate.

39. The method of claim 38, wherein said pre-determined worst-case minimum rate is said update rate, and wherein said update rate is substantially independent of a size of the database.

40. The method of claim 38, wherein said pre-determined worst-case minimum rate is said update rate, and wherein said update rate is based on a substantially constant number of key entries requiring repositioning.

41. The method of claim 12, wherein each of said position information entries indicates a row index to associate a row within said first array with a key entry of said second plurality of key entries.

42. The method of claim 12, wherein each of said position information entries indicates a row index of an operative empty row, wherein any defective row is unmarked by said second plurality of position information entries.

43. The method of claim 27, wherein said rearrangement is performed in a background operation.

44. The method of claim 12, further comprising the steps of:
(f) providing an additional array containing a plurality of empty row position information entries, and
(g) indicating a row index of at least one currently-empty row within said first array using at least one of said empty row position information entries,
wherein said at least one currently-empty row is solely an operative empty row.

45. The method of claim 12, further comprising the step of:
(f) providing n arrays, $n \geq 2$, to store n pluralities of key entries, said n arrays belonging to said hierarchical structure, wherein said n pluralities of key entries represent higher levels of said hierarchical structure with respect to said second plurality of key entries, and wherein each $n_{i-1}$ array of said n arrays represents a lower level of said hierarchical structure with respect to each $n_i$ array.

46. The method of claim 27, wherein said row block is a dynamic row block.

47. The method of claim 14, wherein a foreground operation is performed during said rearrangement of the database, and wherein the database remains fully operational during said rearrangement.

48. The method of claim 12, further comprising the step of:
(f) maintaining the database by:
(i) comparing a number of said entries in a particular row of said rows in said first array with a parameter that is at least partially derived from an average number of entries per row, and
(ii) if a difference between said number of said entries and said parameter exceeds a predetermined value, then repositioning, within said arrays, at least a portion of said entries in said particular row, wherein at said difference is reduced to be within said predetermined value, while maintaining said monotonic order within said rows of said first array.

49. The method of claim 48, wherein said comparing is performed in a background operation.

50. The method of claim 48, wherein said repositioning of said entries is performed in a background operation.

51. The method of claim 48, wherein a foreground operation is performed during said maintaining of the database, and wherein the database remains fully operational during said maintaining of the database.

52. The method of claim 48, wherein the database is fully operational at any stage within a single update operation.

53. The method of claim 48, wherein a threshold fill limit is defined for said key entries within said rows of said first array, and wherein when a particular row of said rows exceeds said threshold fill limit, key entries of said first plurality undergo shifting wherein said particular row conforms to said threshold fill limit, while maintaining said monotonic order within said rows of said first array.

54. The method of claim 48, wherein said repositioning is performed wherein said monotonic order within said rows includes a cyclic monotonic order.

55. The method of claim 48, further comprising the step of:
(f) providing a third array to store a third plurality of key entries, said third array belonging to said hierarchical structure, wherein said third plurality of key entries represents a higher level of said hierarchical structure with respect to said second plurality of key entries.

56. A computer-implemented system for flexibly storing data in a database so as to allow facile and efficient updating and maintenance of the database, the system comprising:
(a) a memory having:
(i) at least a first array having at least two dimensions, said first array having rows and columns, said first array to store a first plurality of key entries;
(ii) at least a second array to store a second plurality of key entries having rows and at least one column, wherein said first array and said second array form a hierarchical structure, wherein said second plurality of key entries in said second array represents a higher level of said hierarchical structure with respect to said first plurality of key entries;
(iii) at least an additional array containing a plurality of position information entries adapted to indicate a row index to associate a row within said first array with a key entry of said second plurality of key entries, and
(b) a processor having processing logic adapted to:
(i) arrange said first plurality of key entries within each of said rows in a monotonic order;
(ii) identify an update position within said hierarchical structure to perform a database update operation, and
(iii) perform said database update operation by rearrangement of a portion of said first plurality of key entries to produce an updated database in which said key entries within said first array are arranged in said monotonic order.

57. The system of claim 56, wherein said processing logic is designed and configured to:
(iv) maintain the database by:
(A) comparing a number of said entries in a particular row of said rows in said first array with a parameter that is at least partially derived from an average number of entries per row, and
(B) if a difference between said number of said entries and said parameter exceeds a predetermined value, then repositioning said entries in said particular row, within said arrays, wherein said difference is reduced to be within said predetermined value, while maintaining said monotonic order within said rows of said first array.

58. The system of claim 56, further comprising an array containing a plurality of position information entries, each of said position information entries adapted to indicate a row index of a currently-empty row within said first array.

59. The system of claim 56, further comprising a column register adapted to store said second plurality of key entries.

60. The system of claim 56, wherein said first array contains at least one empty row devoid of said first plurality of key entries, and wherein a threshold fill limit is defined for said key entries within said rows of said first array, said processor having processing logic further adapted to move a portion of said key entries in said particular row to said empty row, when a particular row of said rows exceeds said threshold fill limit wherein said particular row conforms to said threshold fill limit, while maintaining said monotonic order within said rows of said first array.

* * * * *

UNITED STATES PATENT AND TRADEMARK OFFICE
CERTIFICATE OF CORRECTION

PATENT NO. : 7,627,616 B2 Page 1 of 1
APPLICATION NO. : 10/928257
DATED : December 1, 2009
INVENTOR(S) : Moshe Hershkovich et al.

It is certified that error appears in the above-identified patent and that said Letters Patent is hereby corrected as shown below:

On the Title Page

Assignee Item (73) should be corrected as follows:
change
--Hywire Ltb., Netanya (IL)-- to

"Hywire Ltd., Netanya (IL)"

Signed and Sealed this

Twenty-third Day of February, 2010

David J. Kappos
*Director of the United States Patent and Trademark Office*